May 14, 1968 P. M. THOMAS ET AL 3,382,640
BRICK LAYING MACHINE
Filed Aug. 1, 1963 38 Sheets-Sheet 1
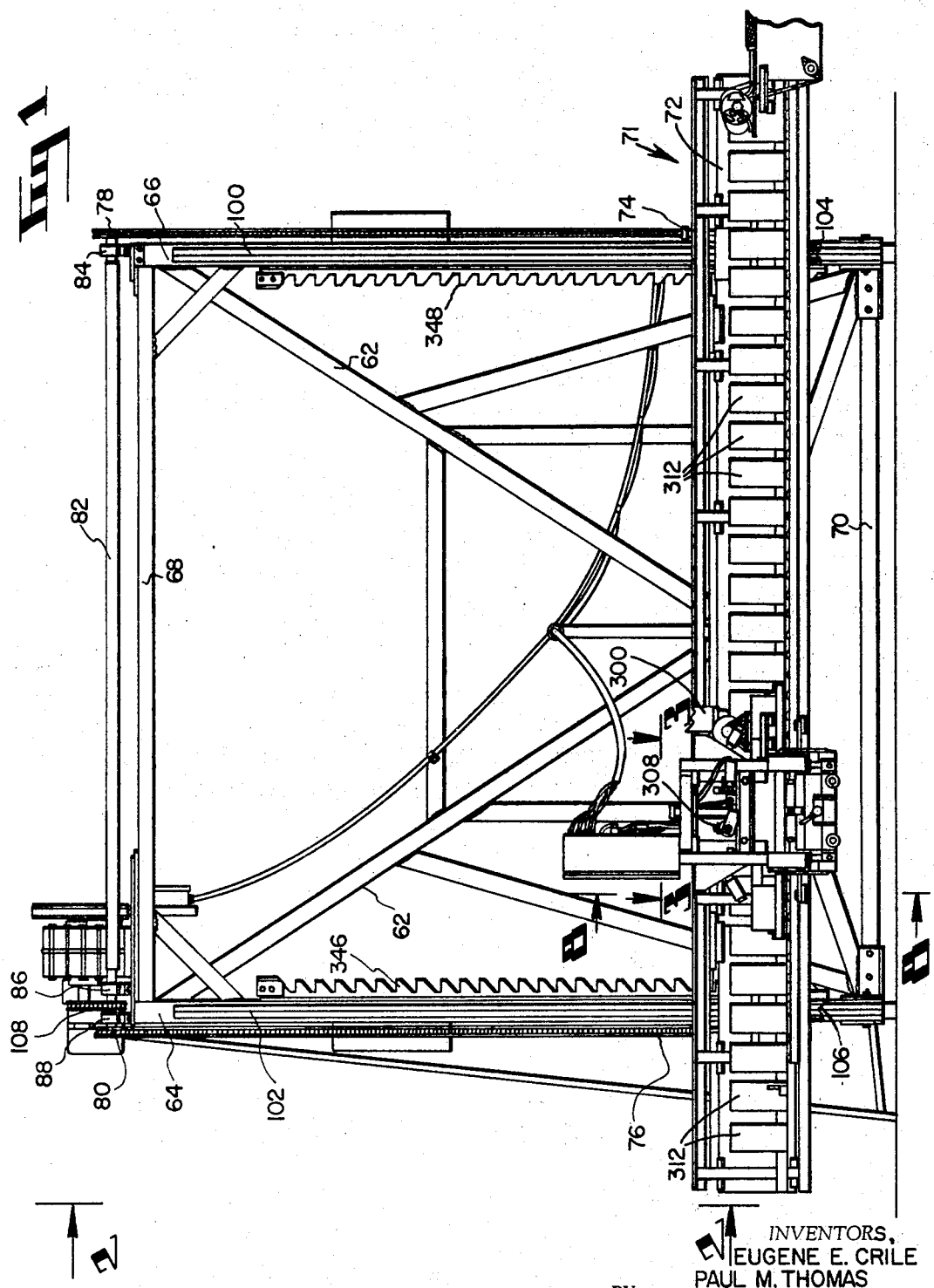
INVENTORS,
EUGENE E. CRILE
PAUL M. THOMAS
RUSSELL W. BURGE
LAWRENCE W. WRIGHT
BY
*Wm. H. Dean*

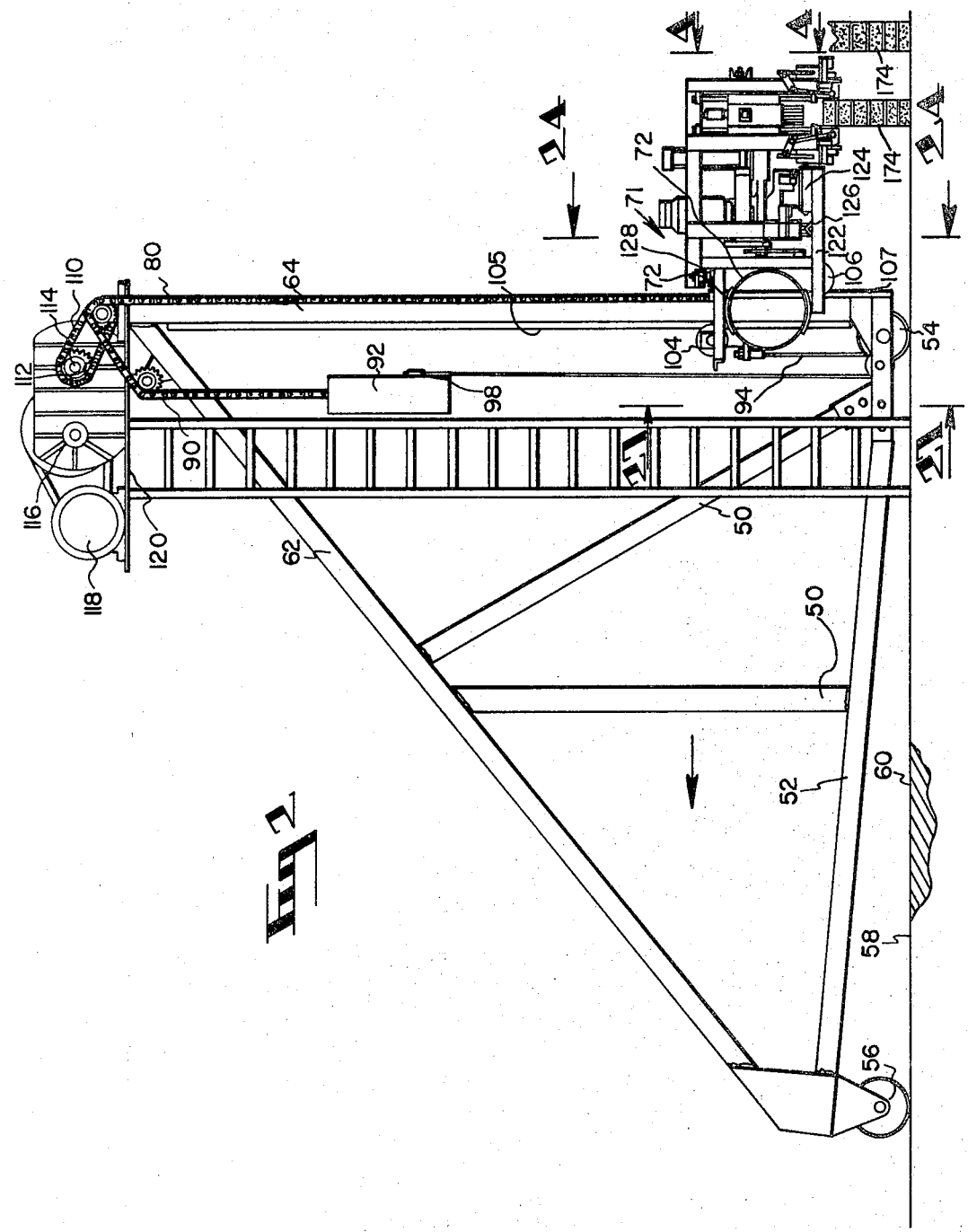

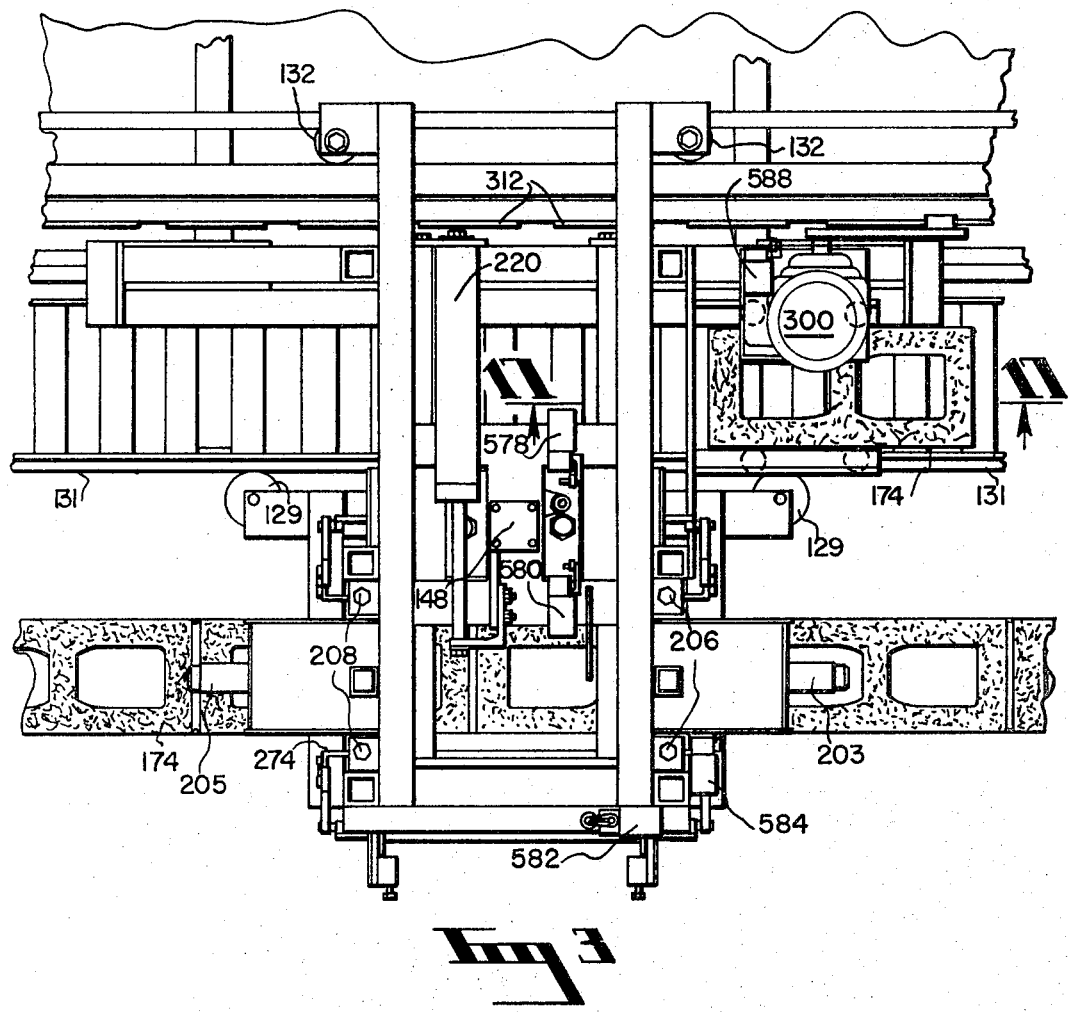

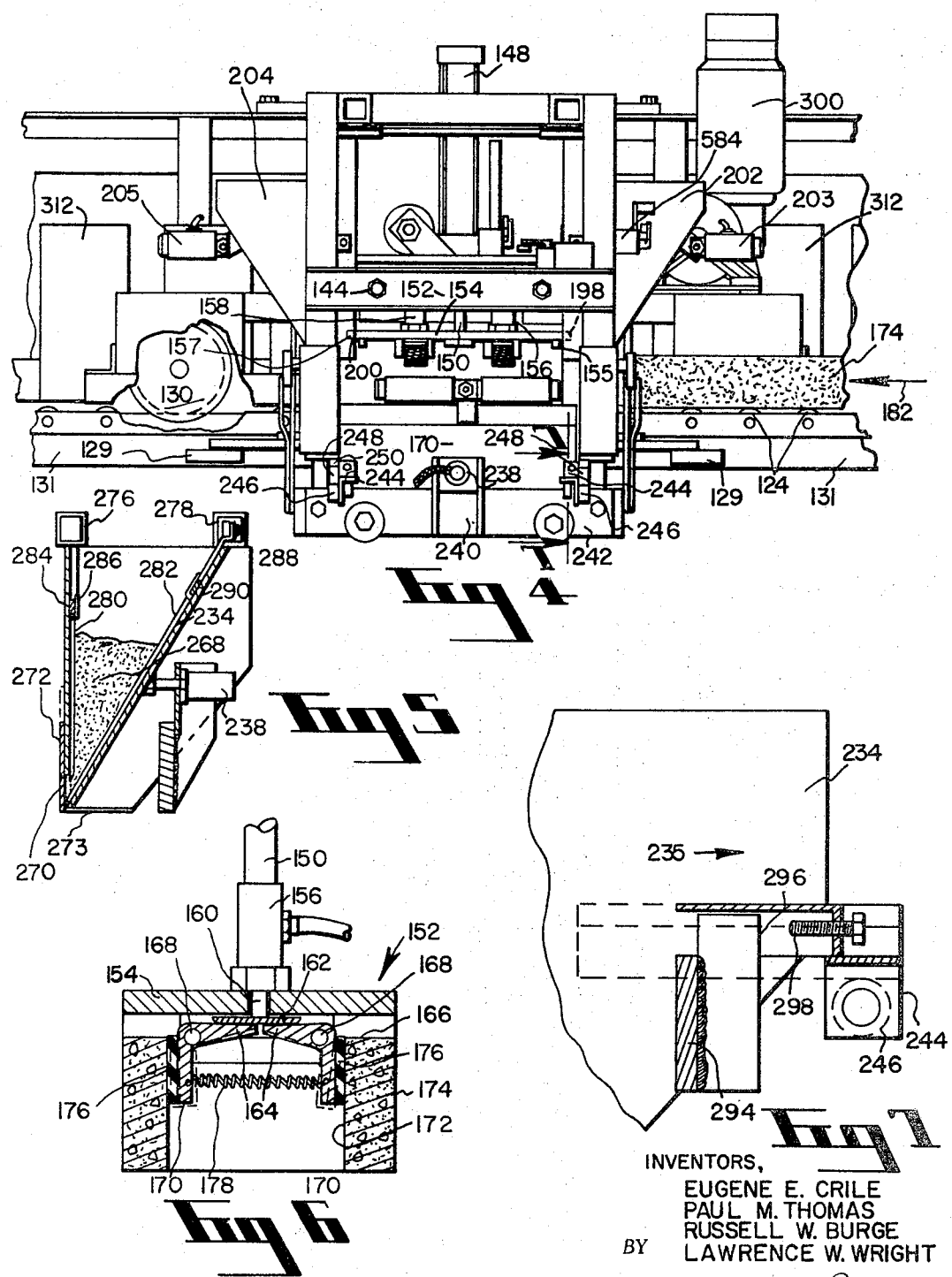

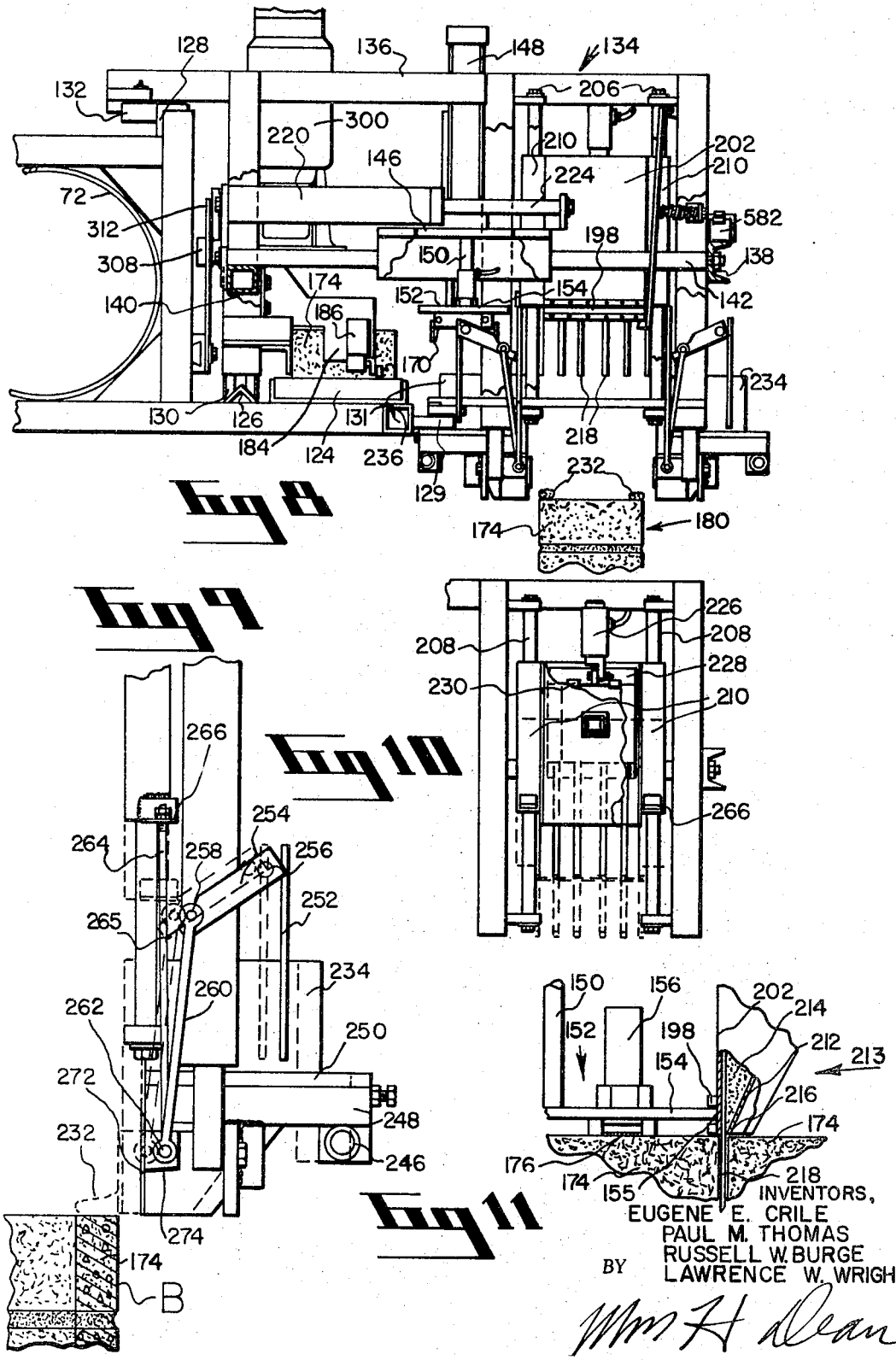

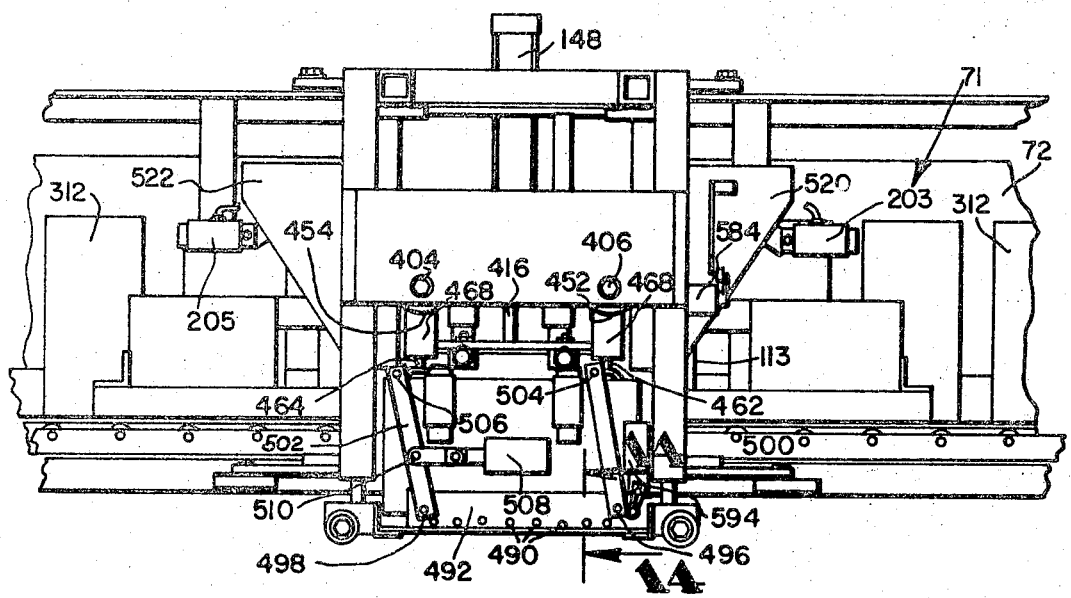
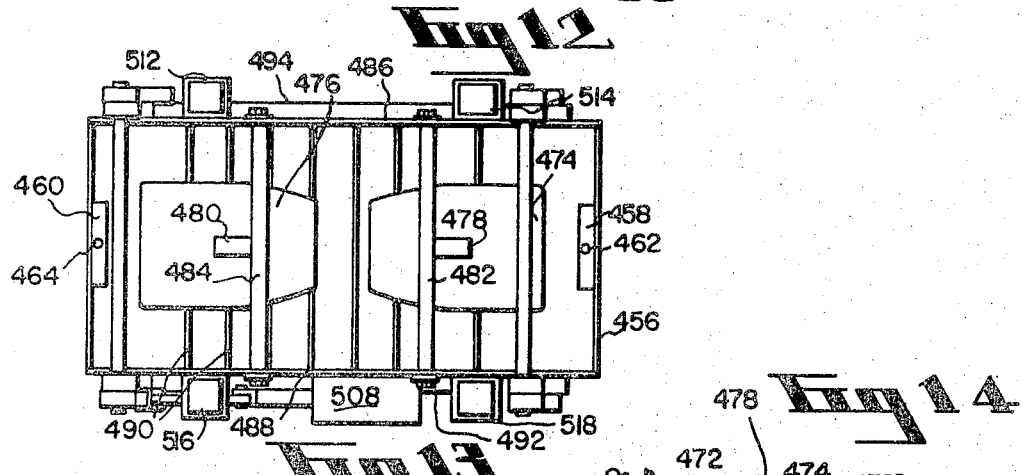

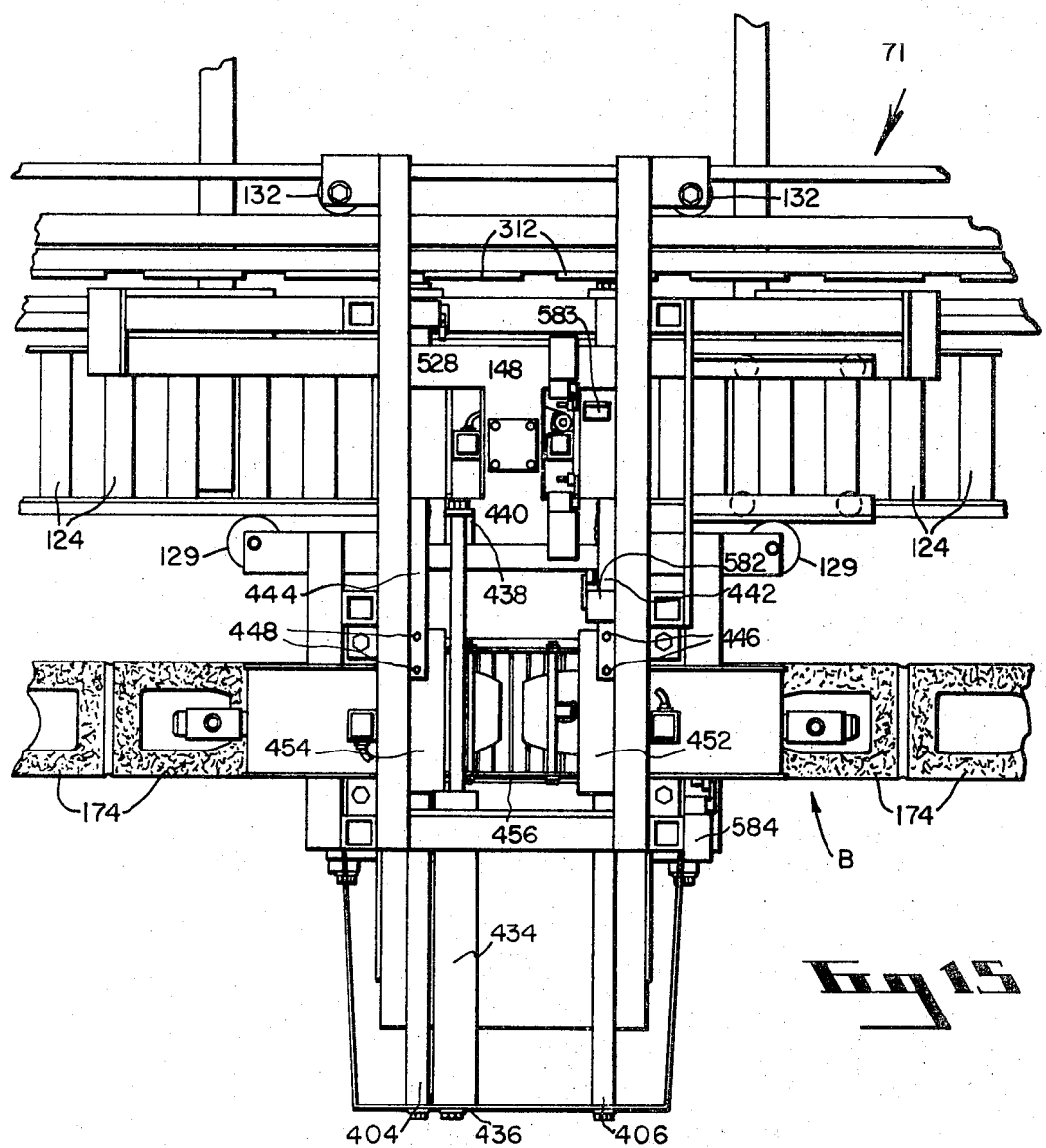

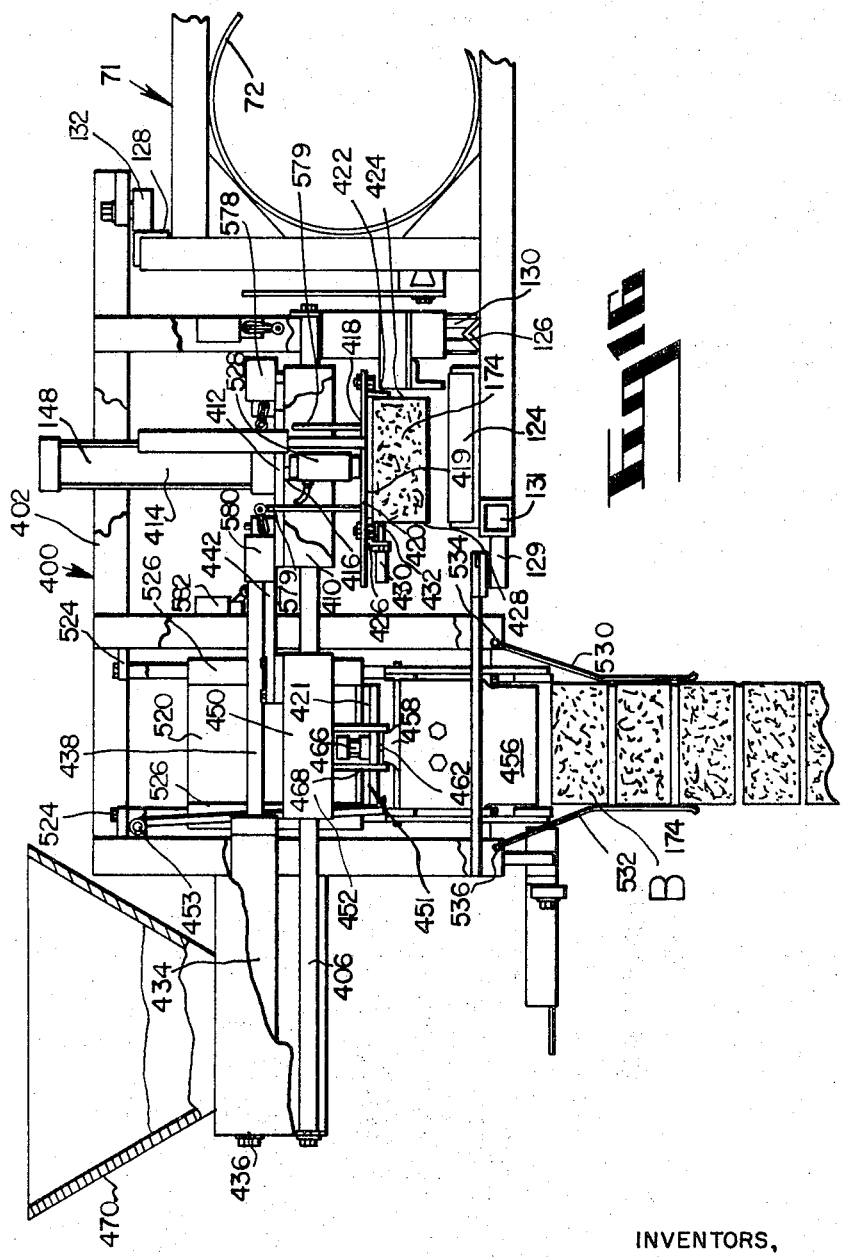

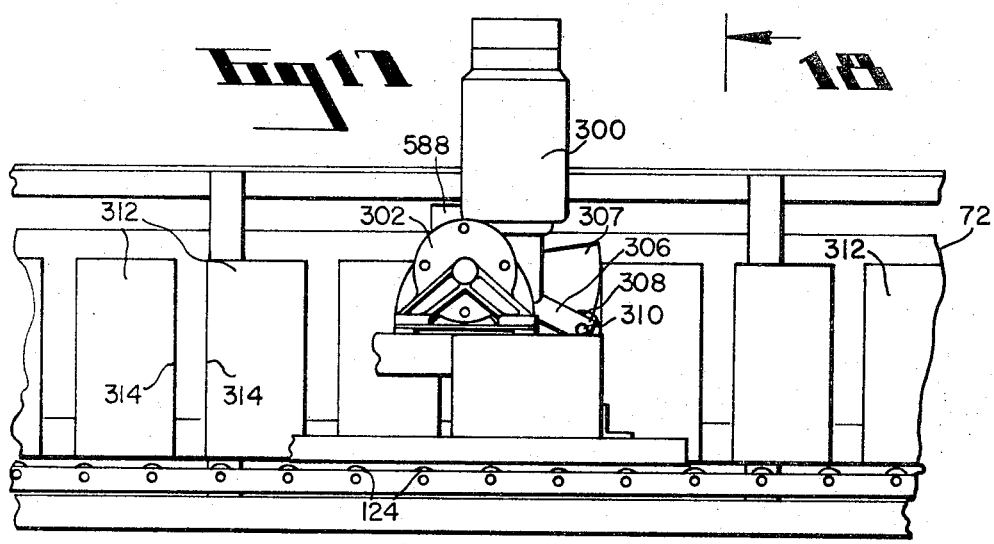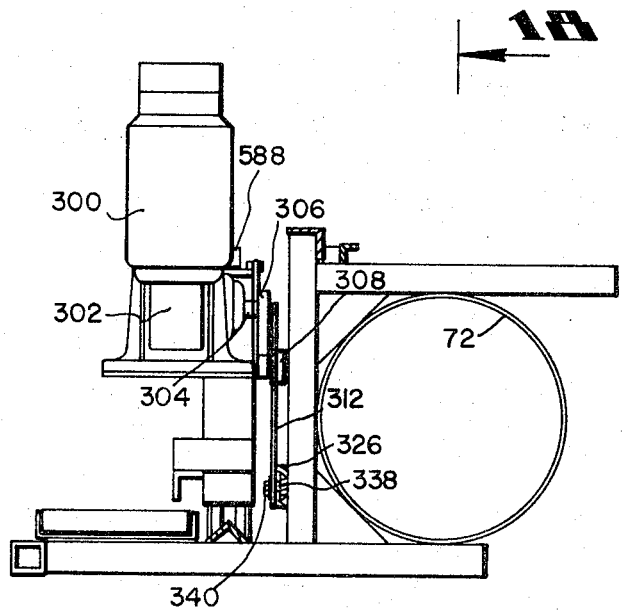

May 14, 1968 P. M. THOMAS ET AL 3,382,640
BRICK LAYING MACHINE
Filed Aug. 1, 1963 38 Sheets-Sheet 10
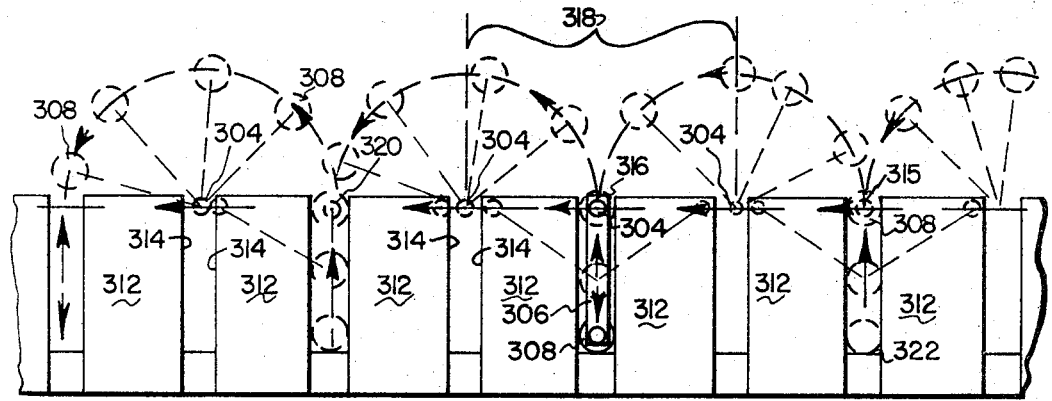
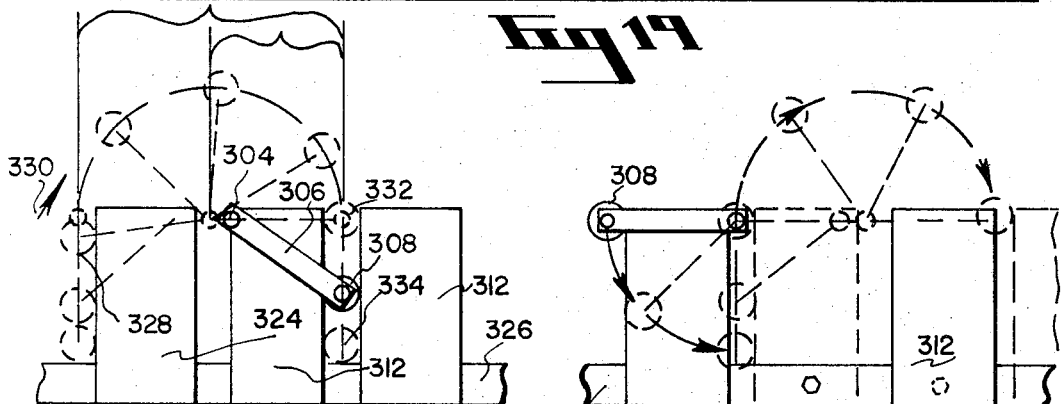
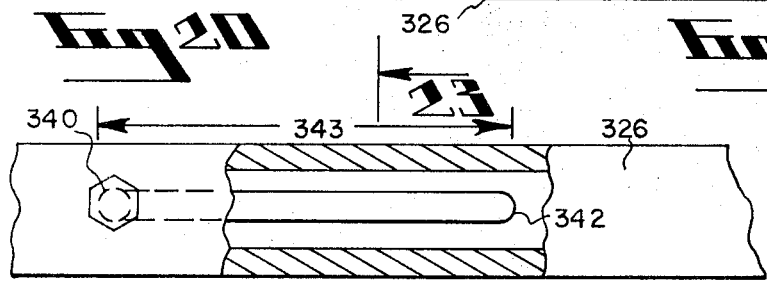
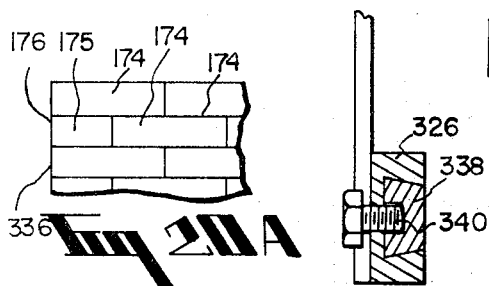
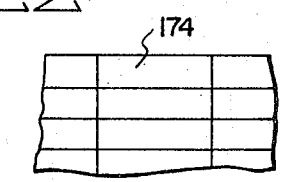
INVENTORS,
EUGENE E. CRILE
PAUL M. THOMAS
RUSSELL W. BURGE
LAWRENCE W. WRIGHT
BY
Wm. H. Dean

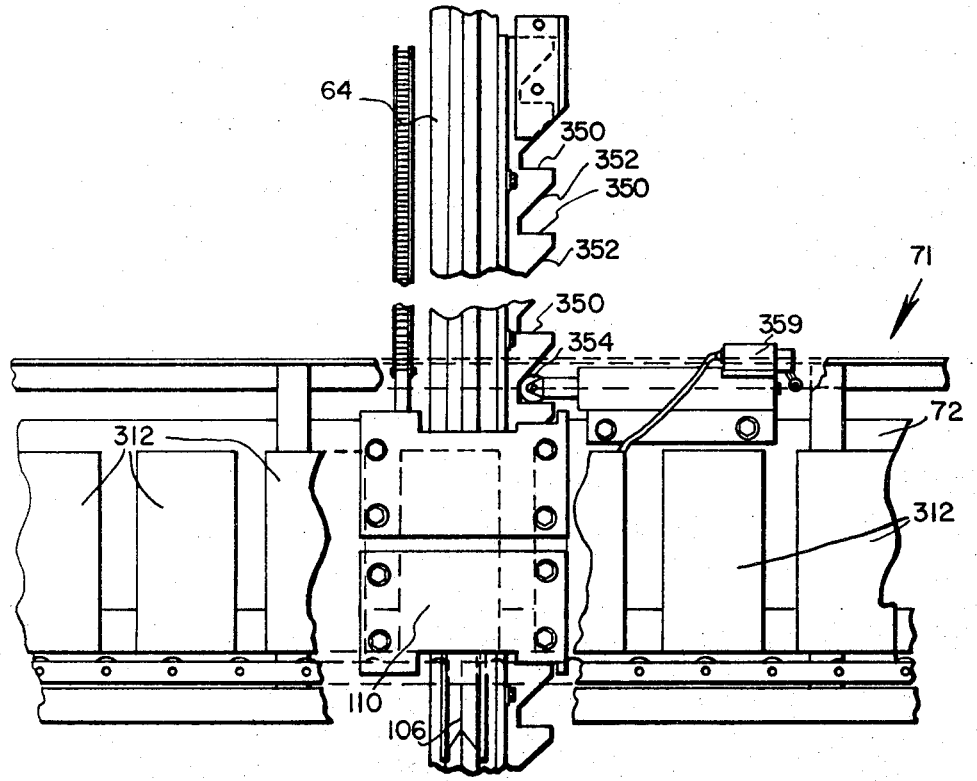
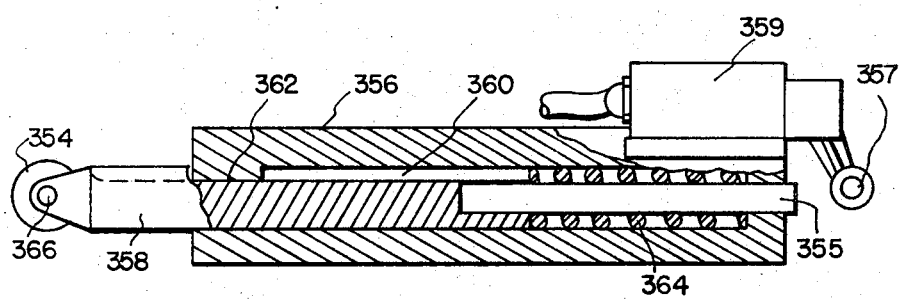

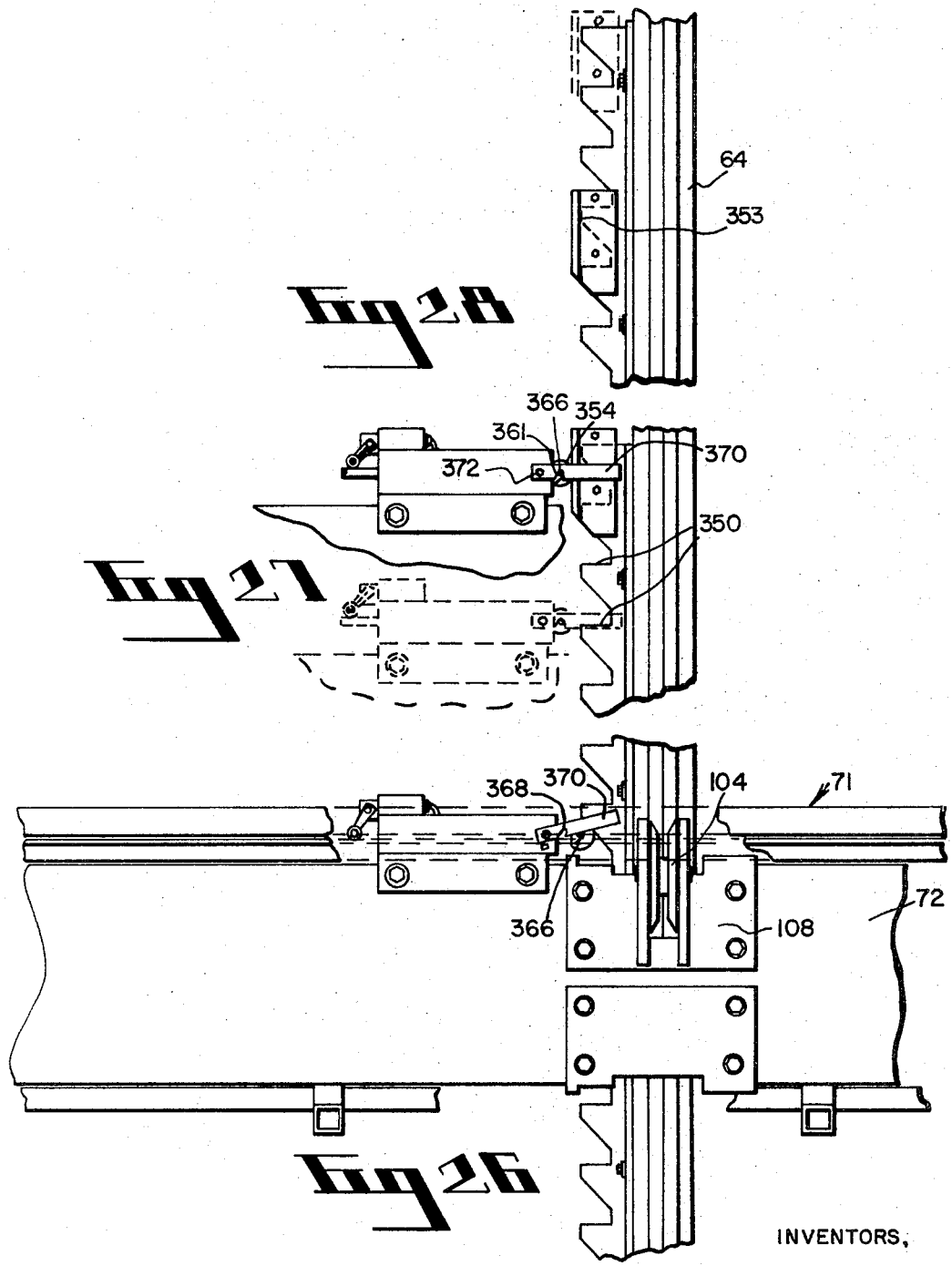

May 14, 1968 P. M. THOMAS ET AL 3,382,640
BRICK LAYING MACHINE
Filed Aug. 1, 1963 38 Sheets-Sheet 13
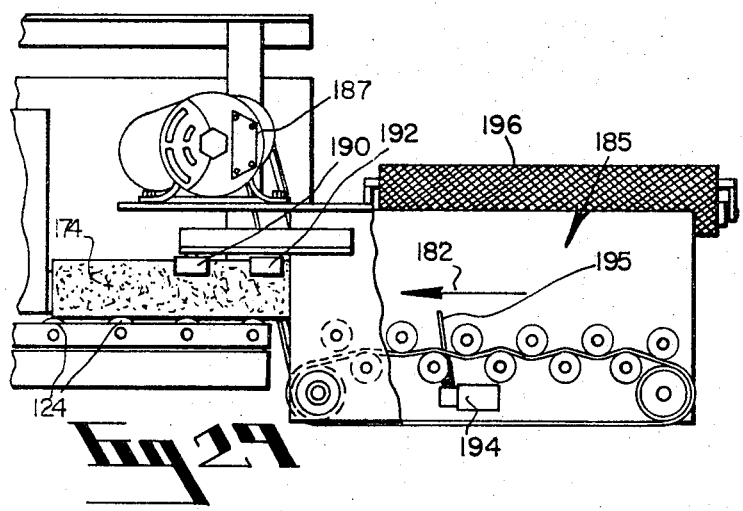
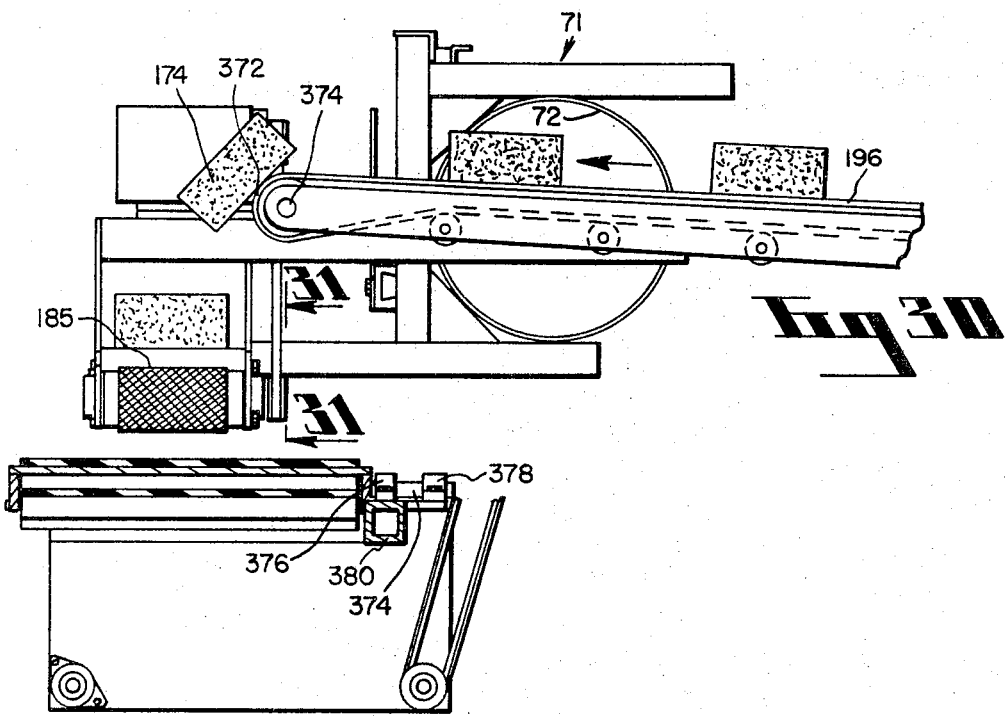
INVENTORS,
EUGENE E. CRILE
PAUL M. THOMAS
RUSSELL W. BURGE
LAWRENCE W. WRIGHT
BY
Wm H. Dean

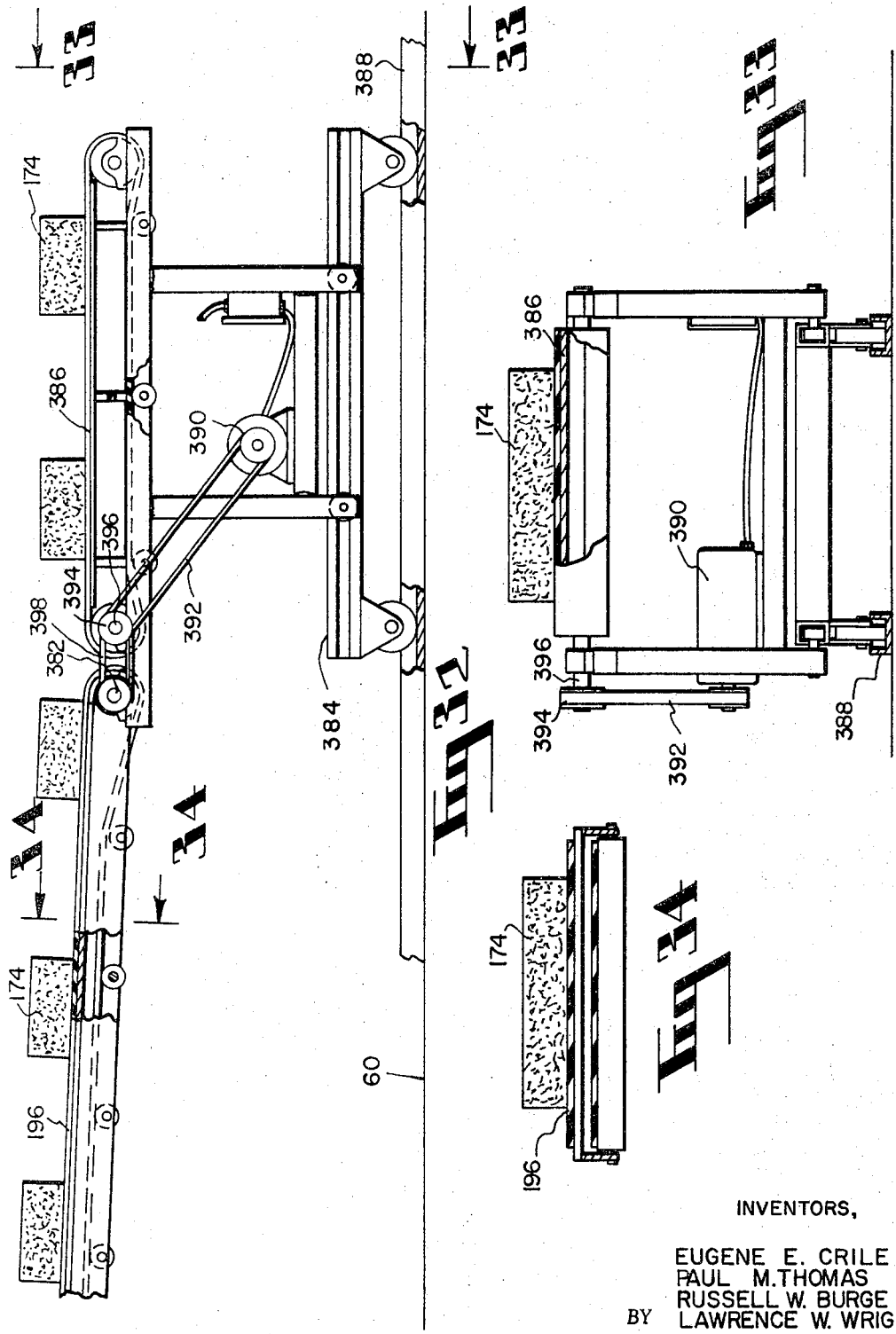

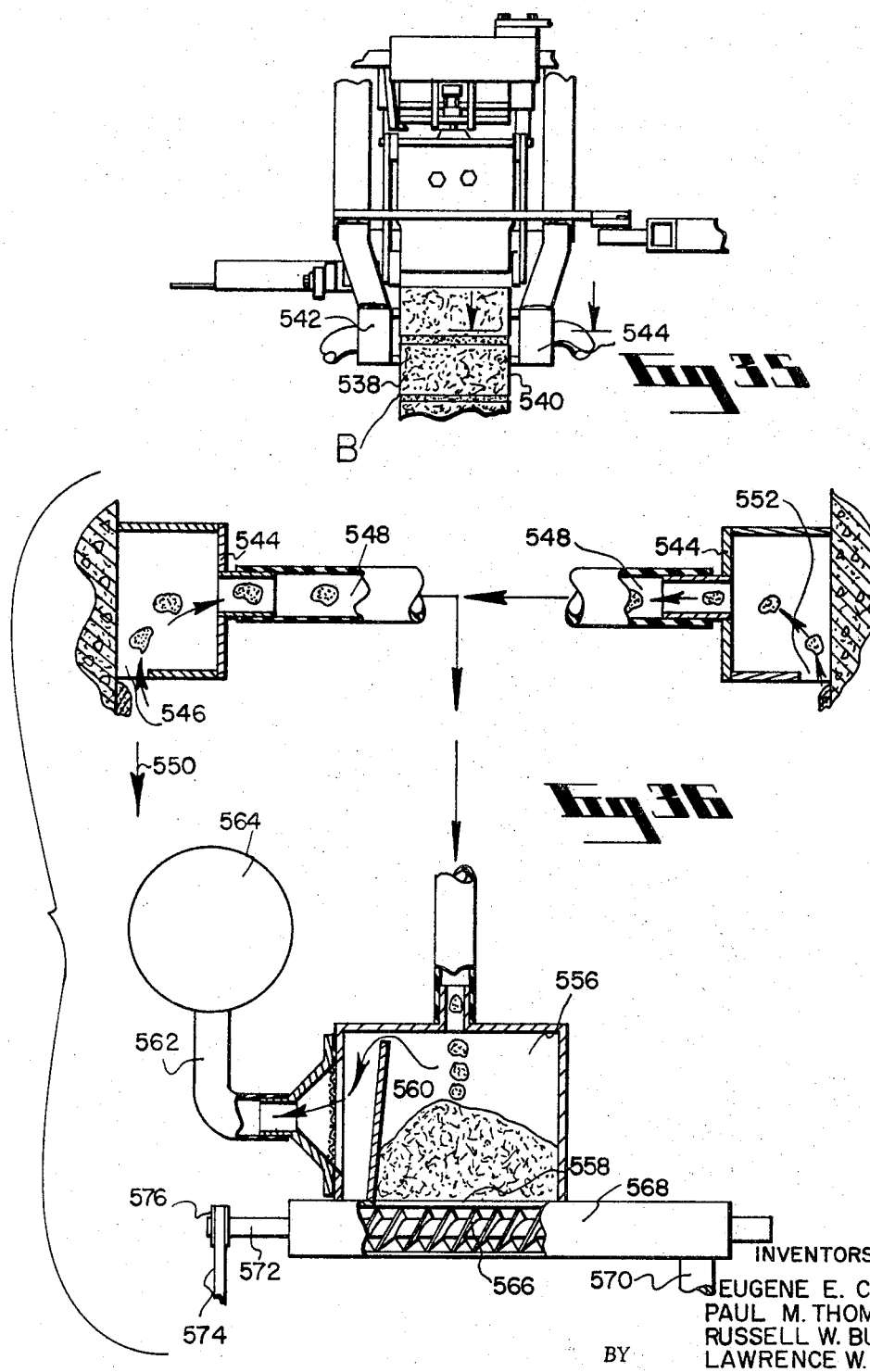

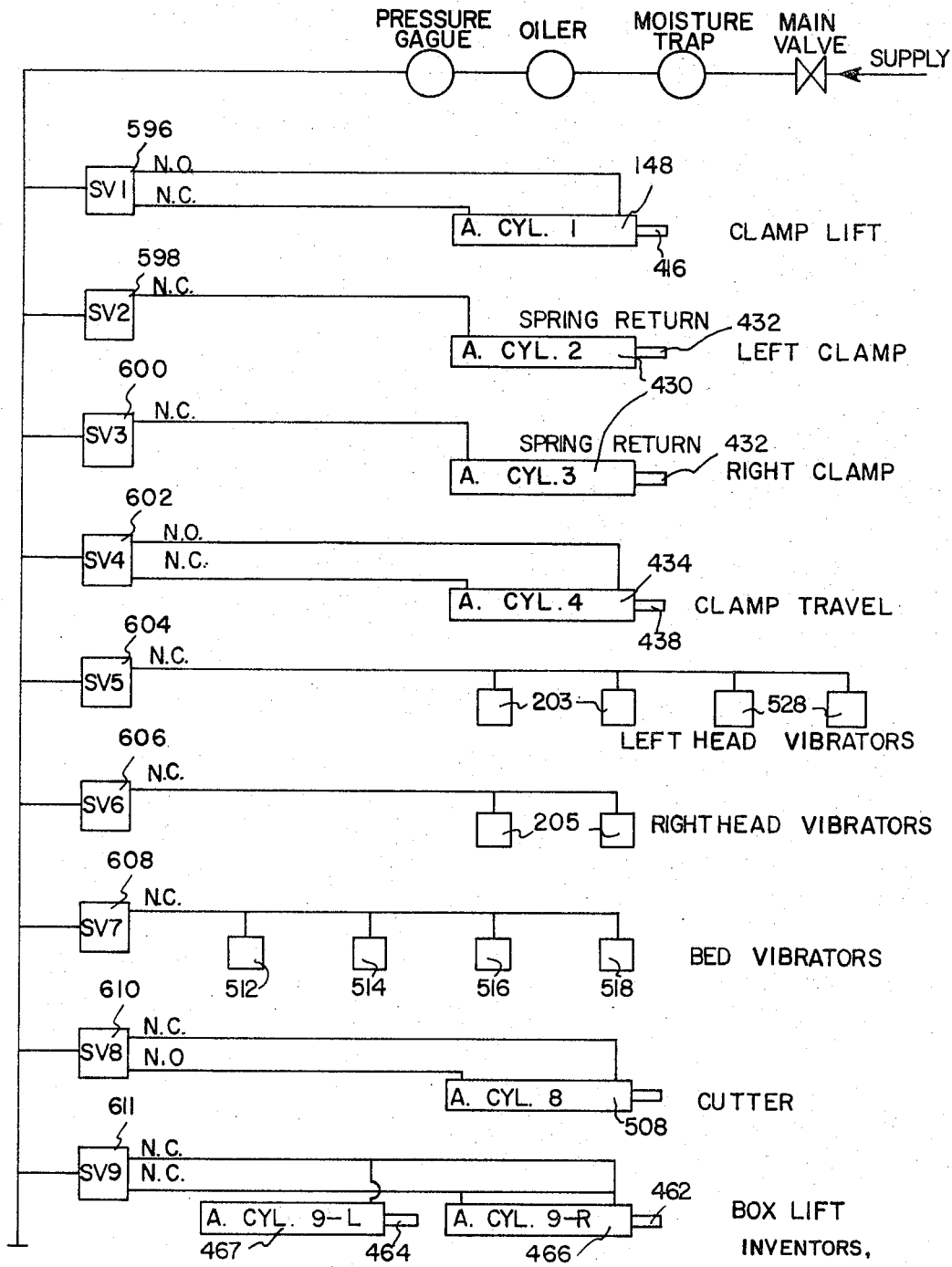

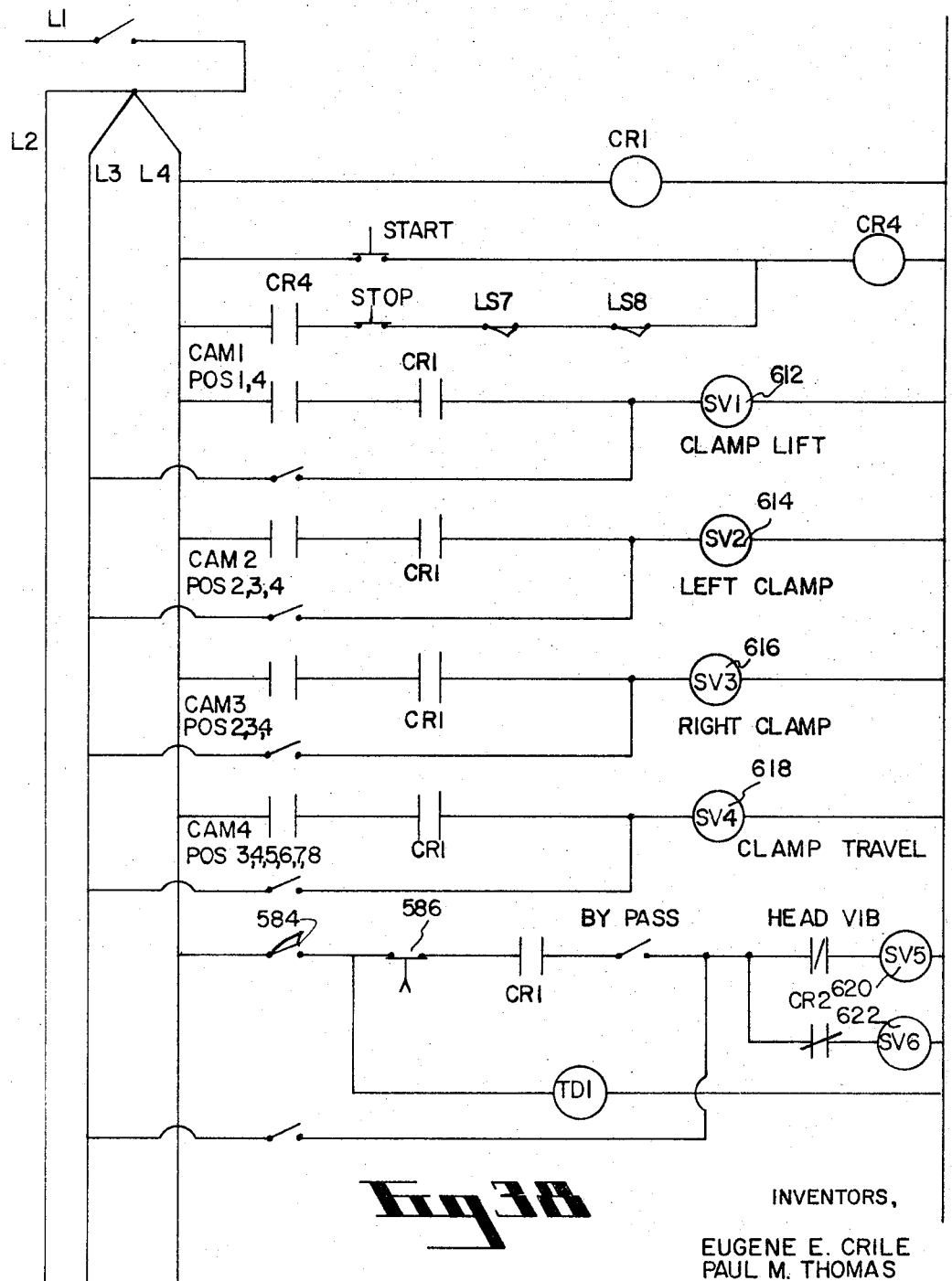

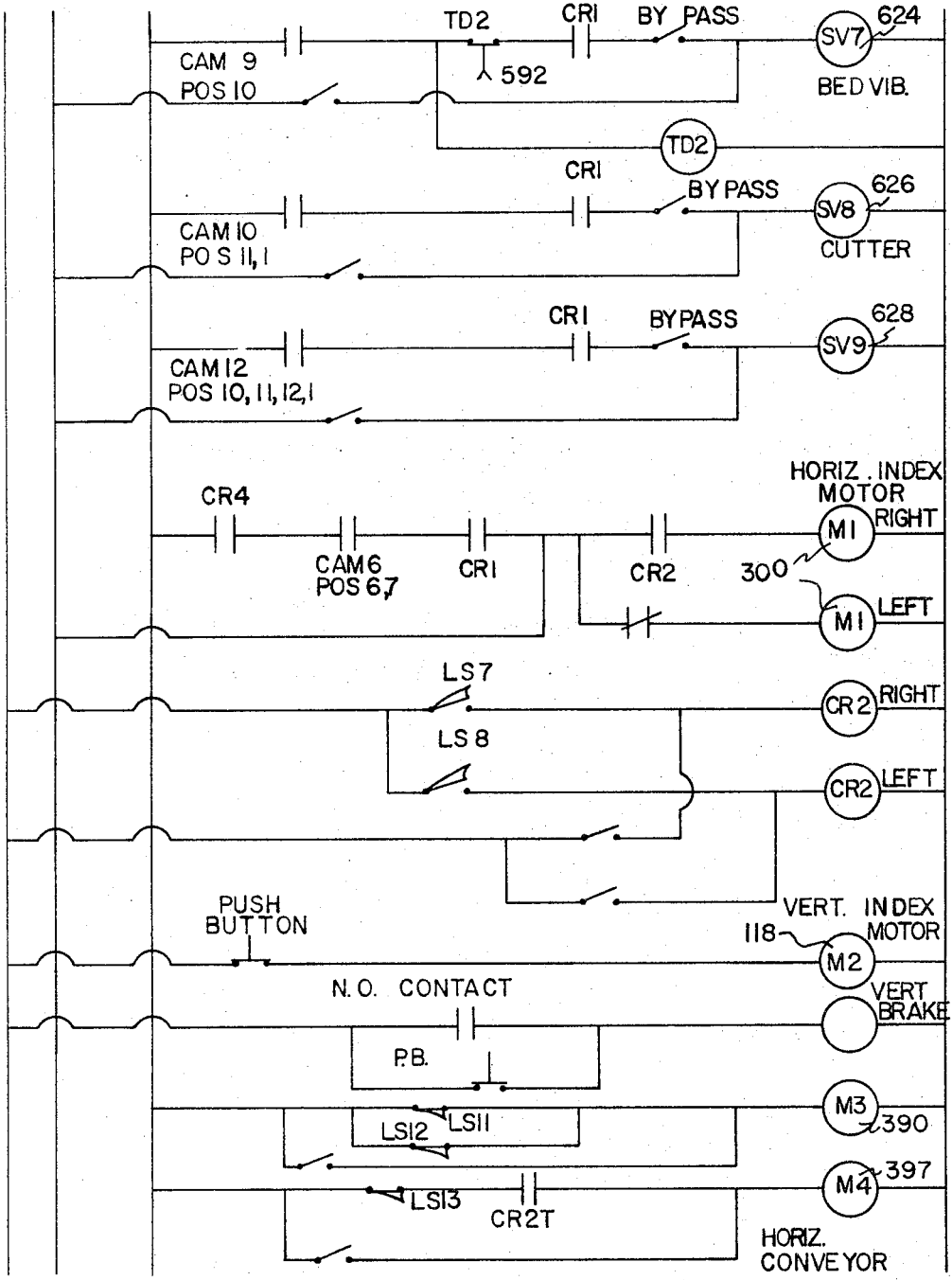

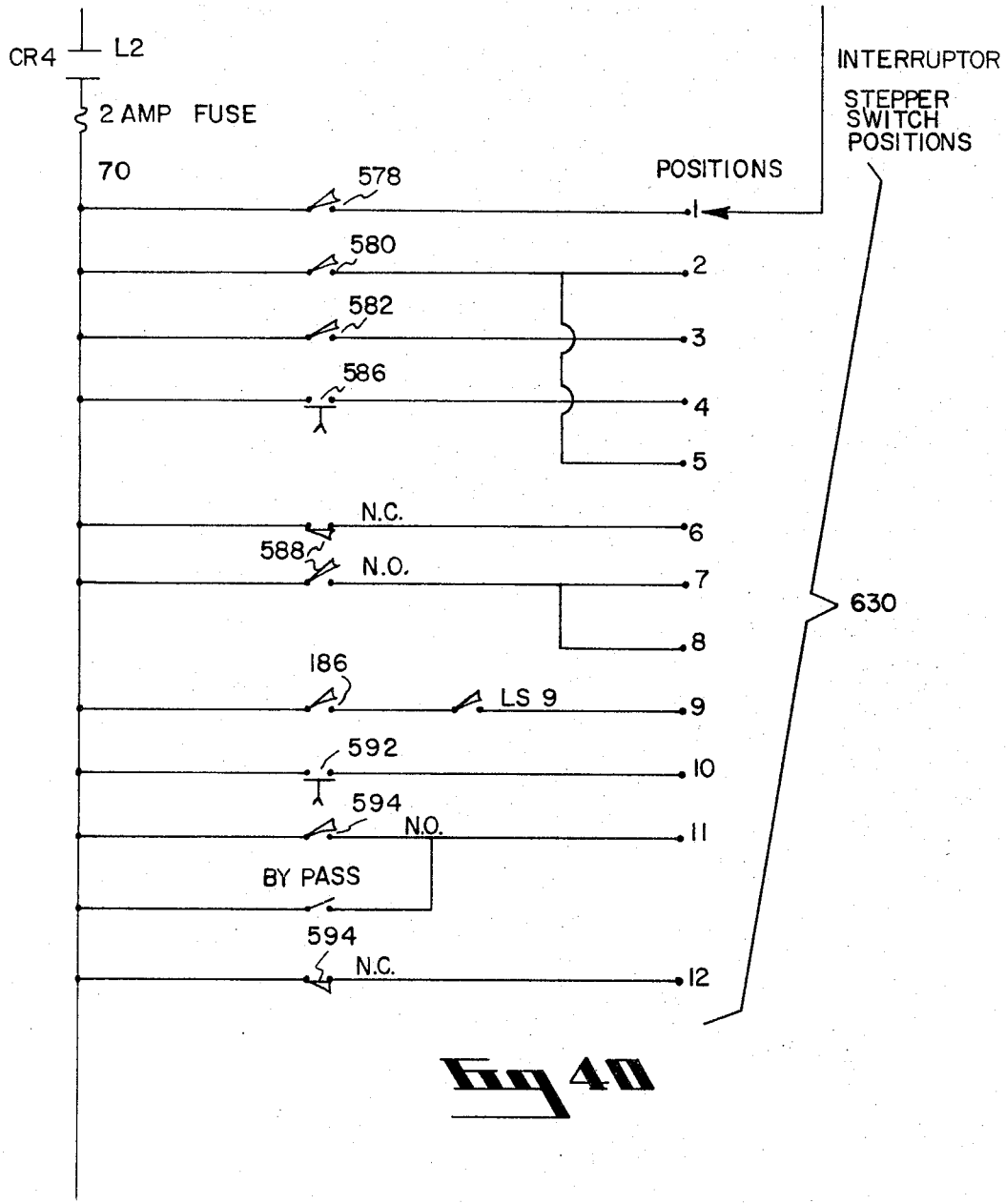

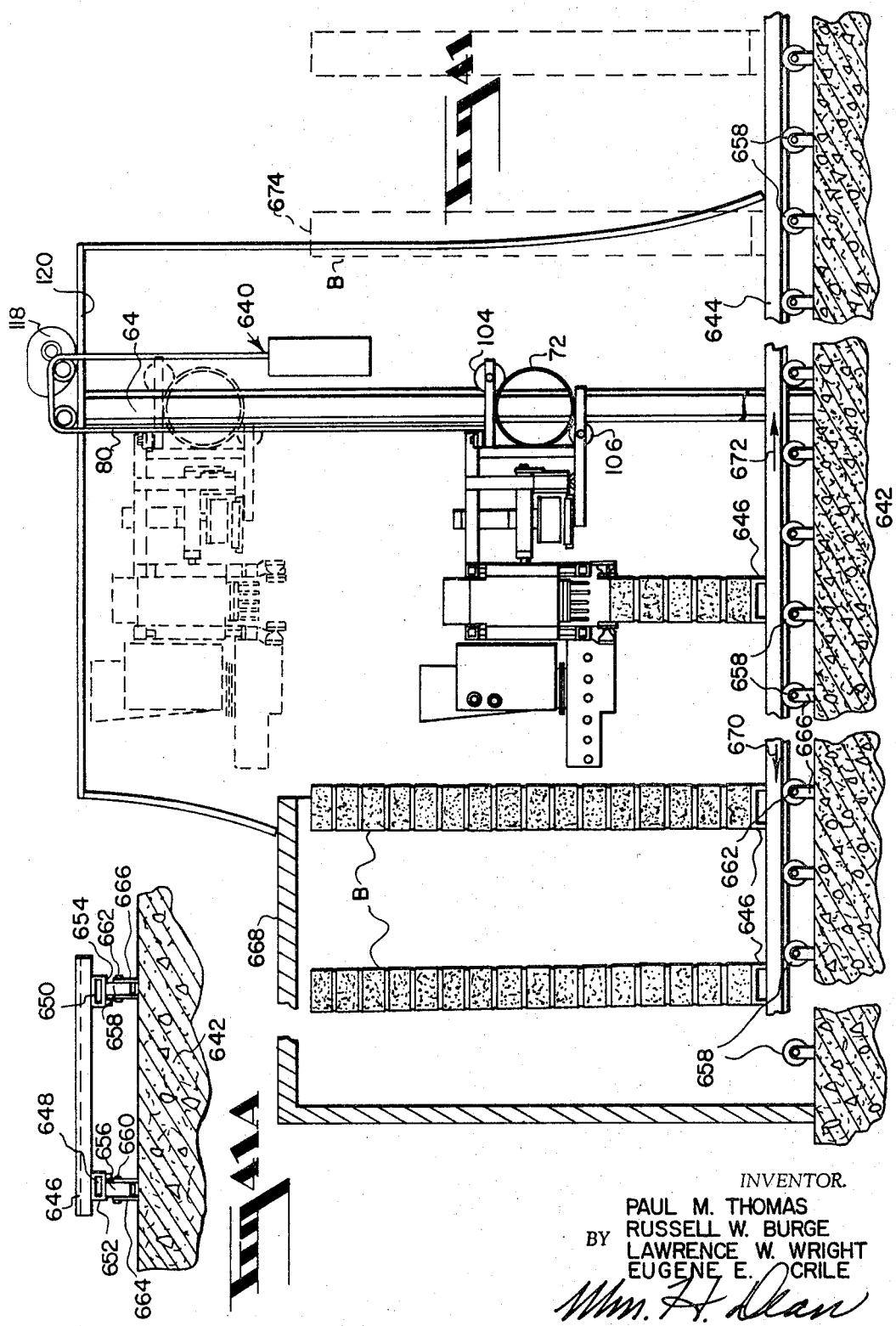

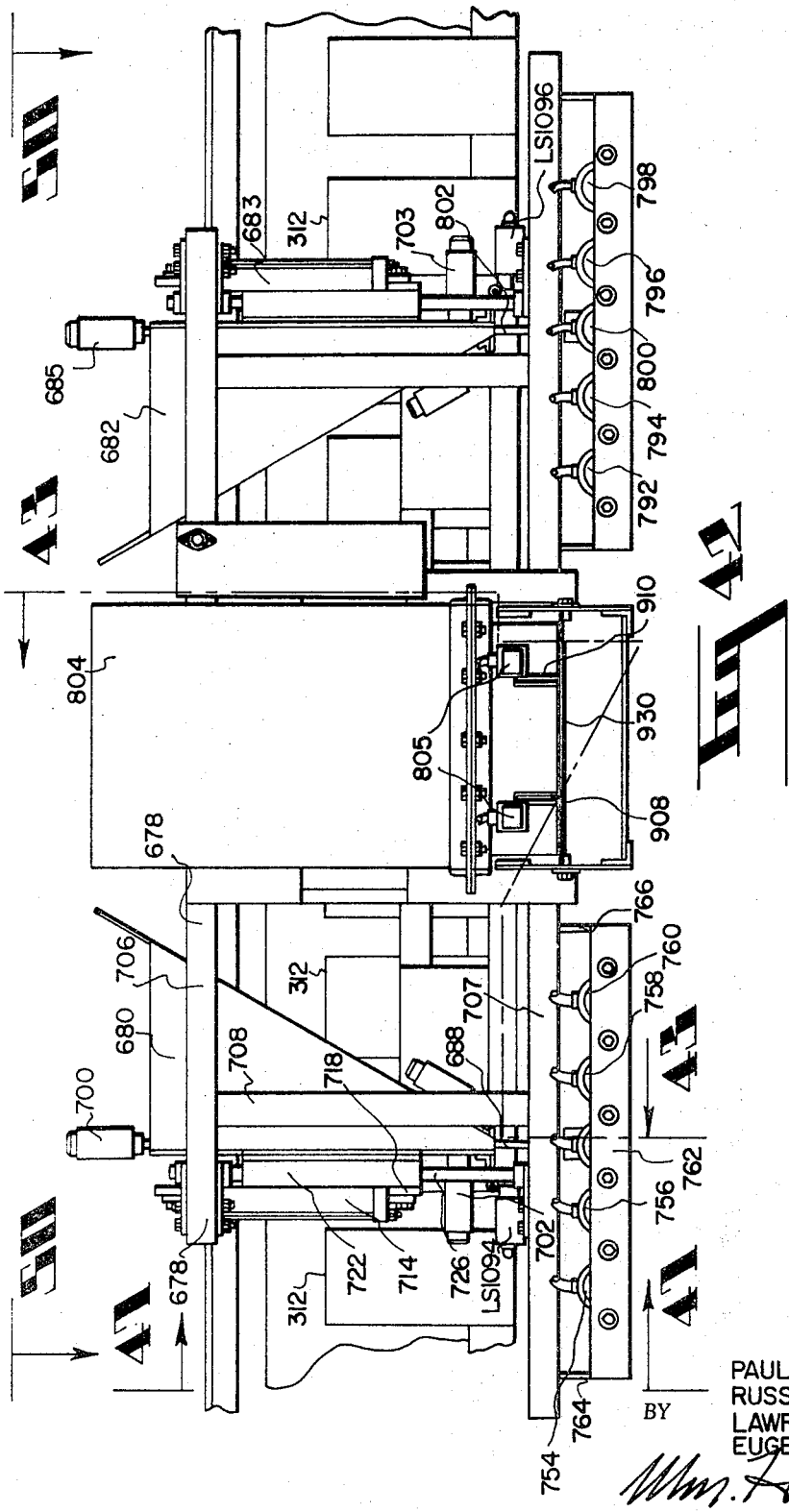

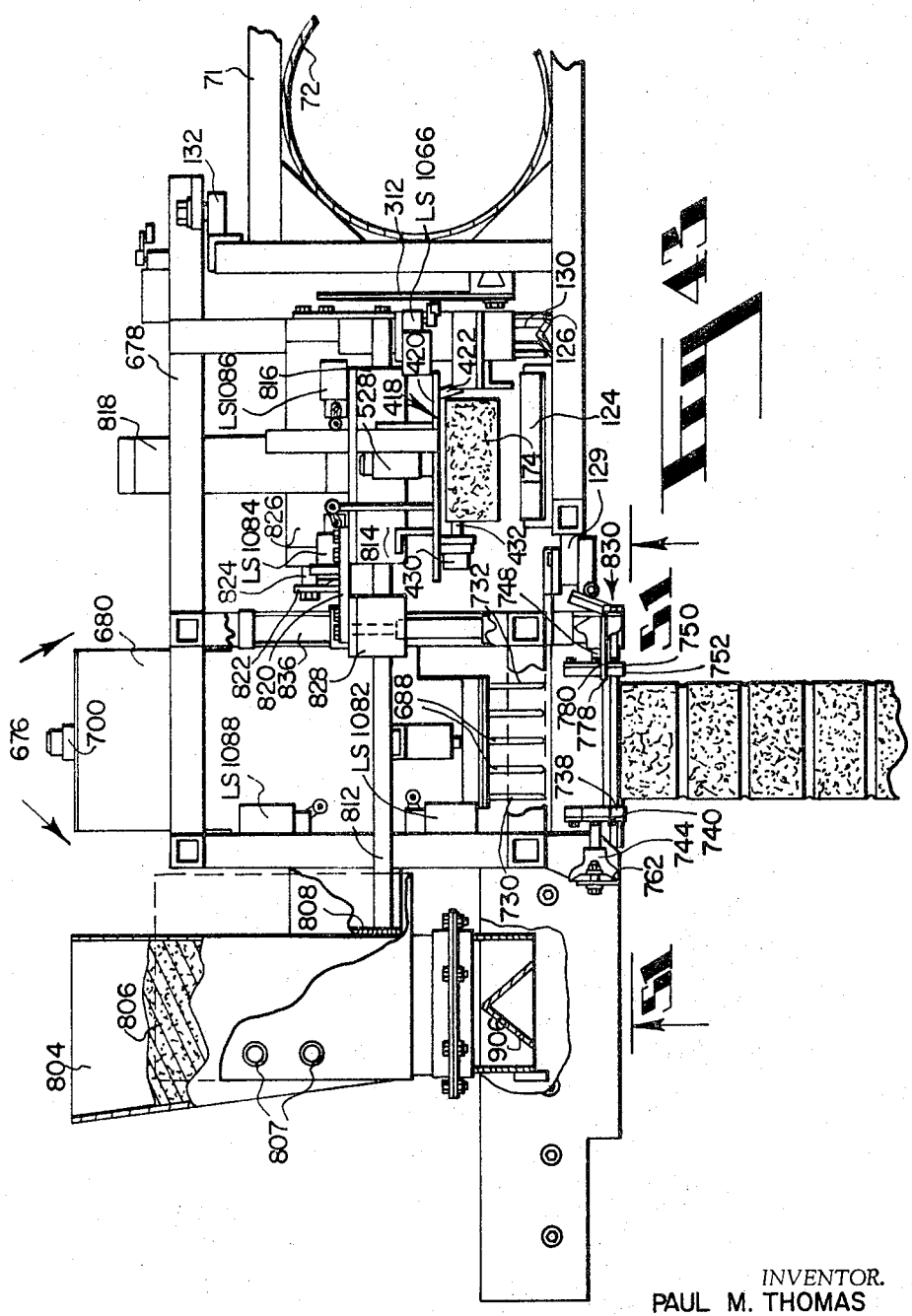

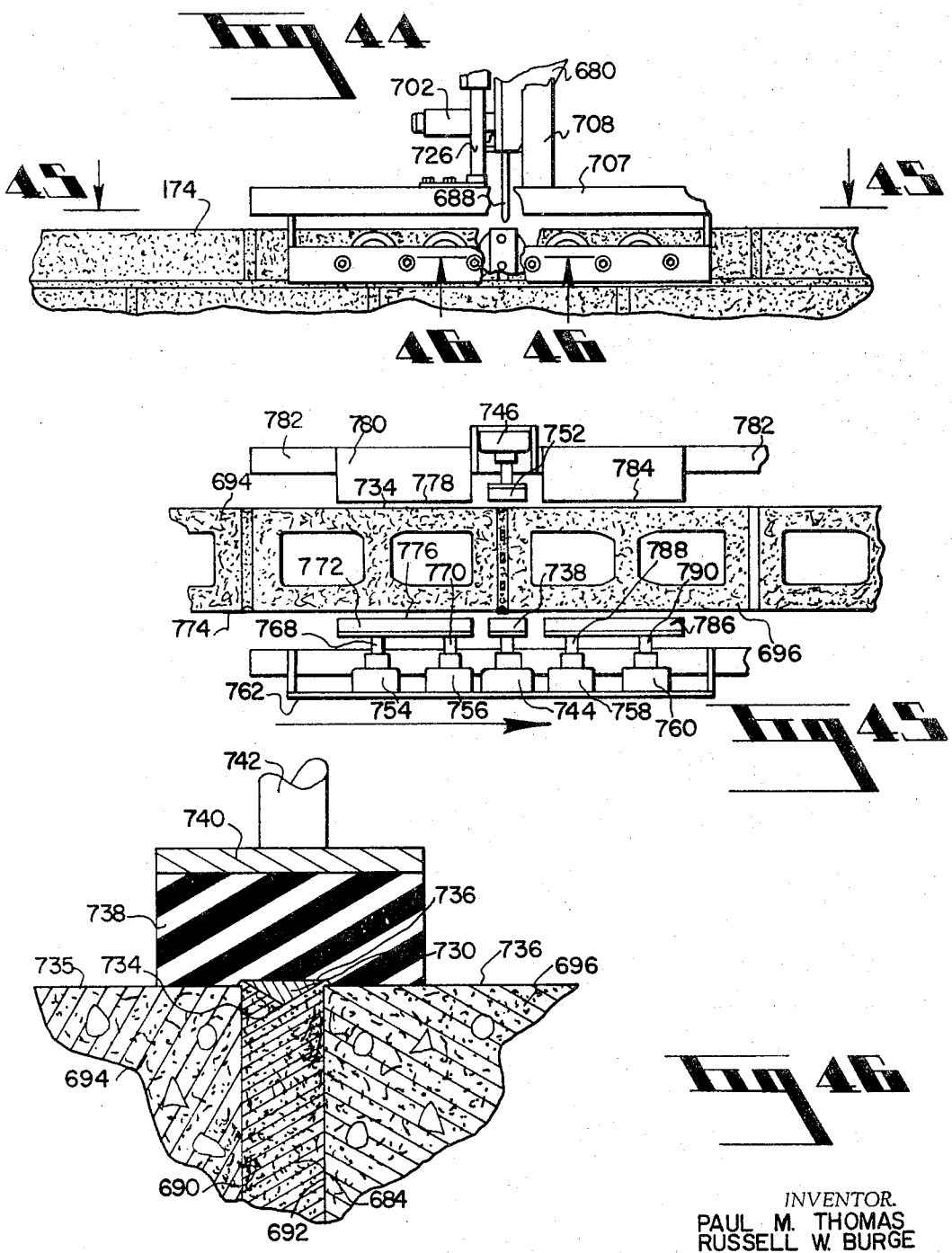

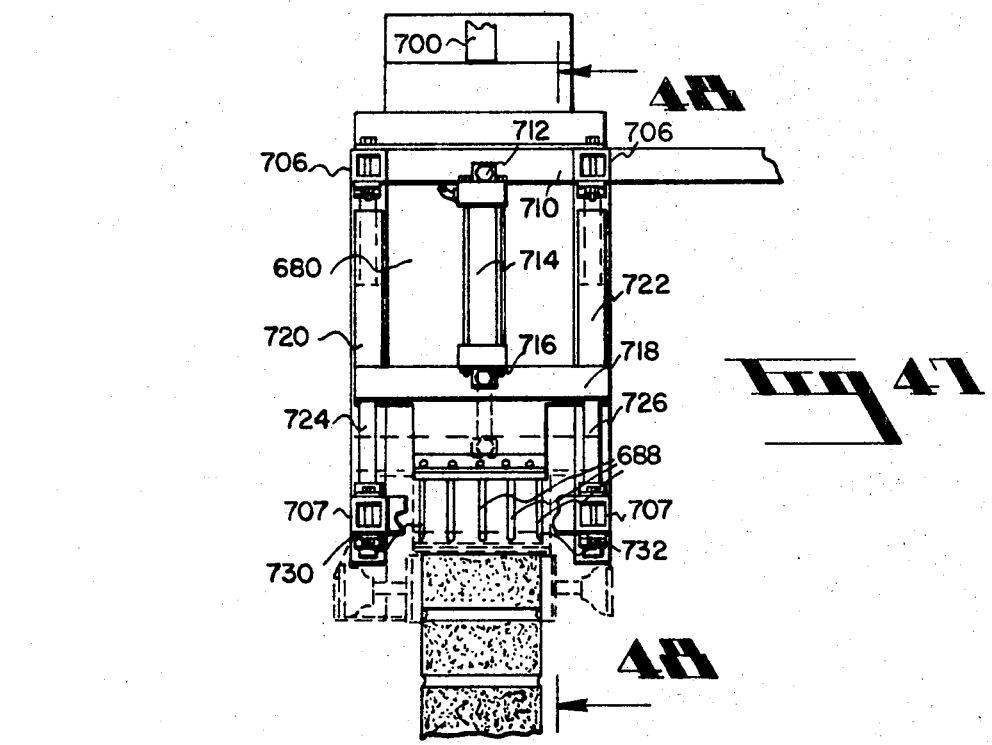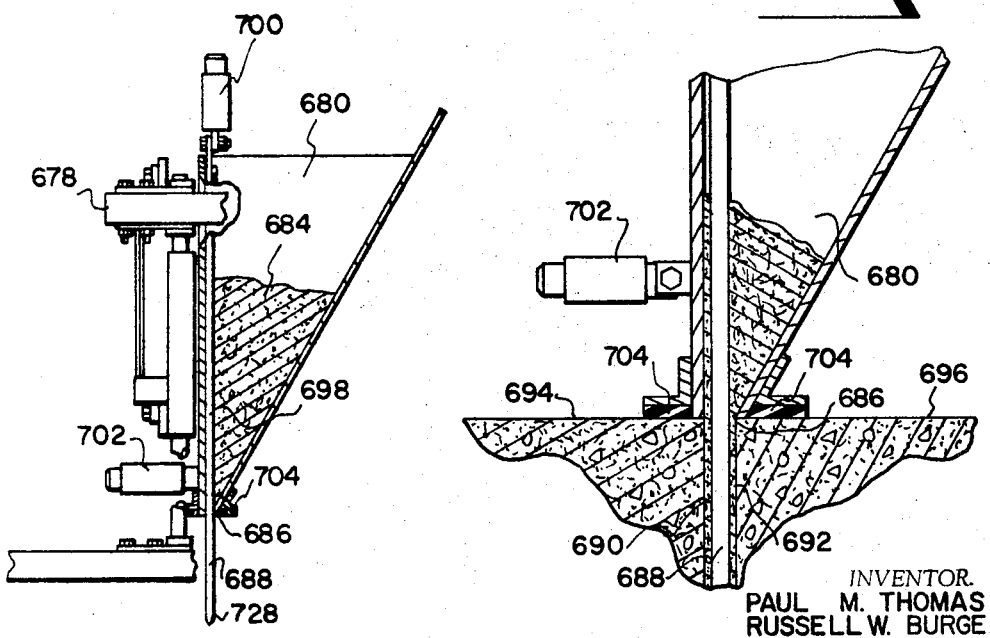

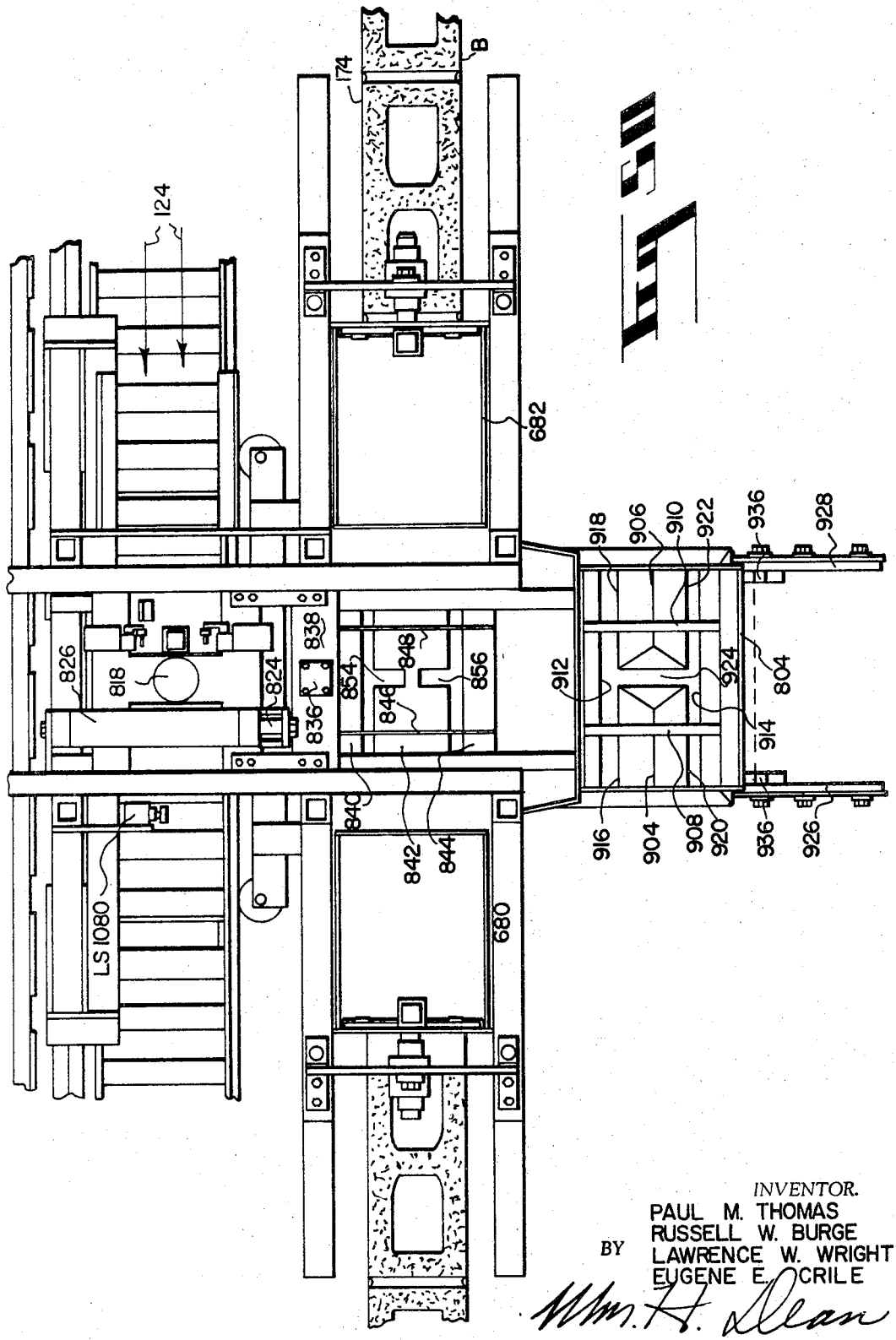

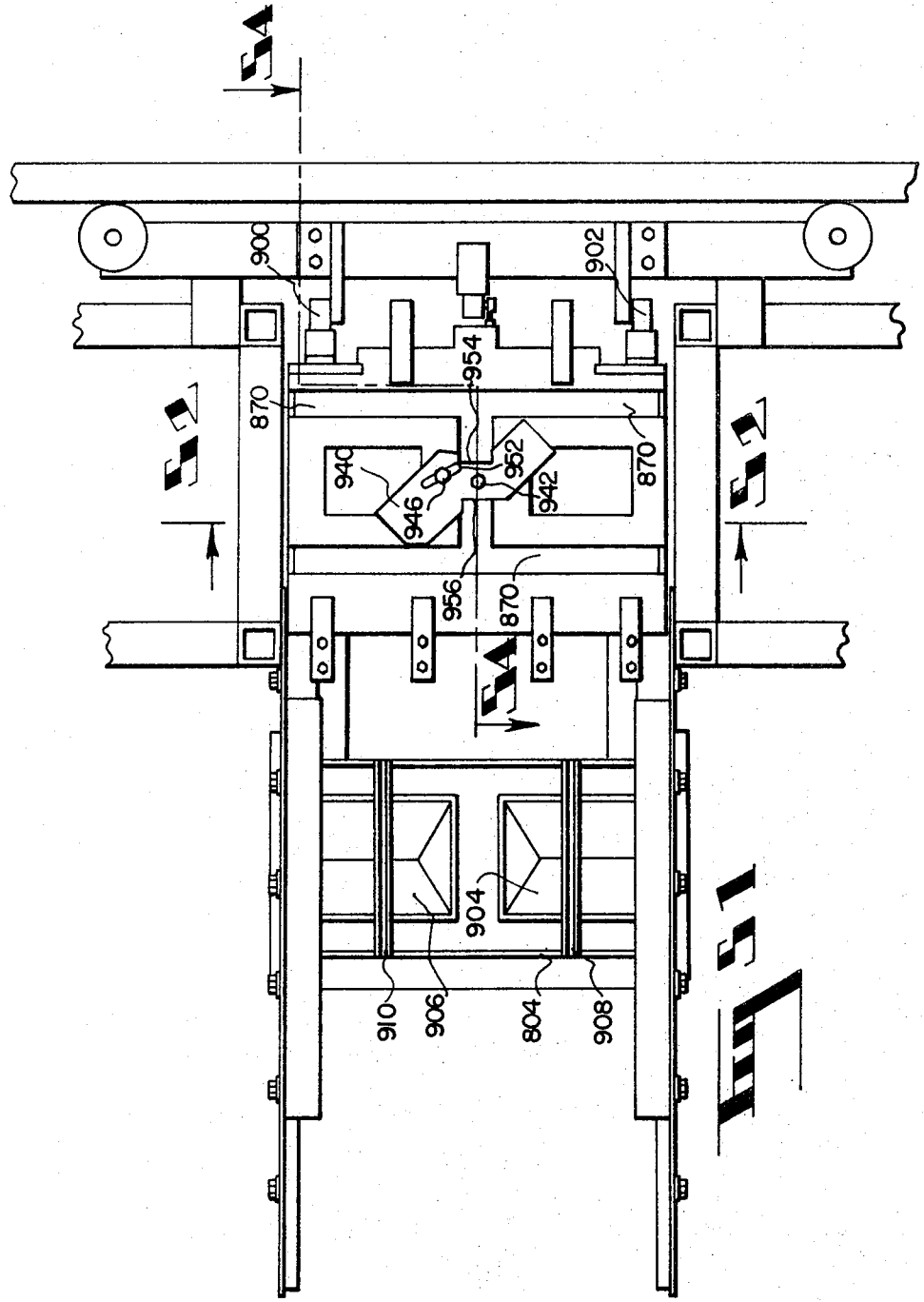

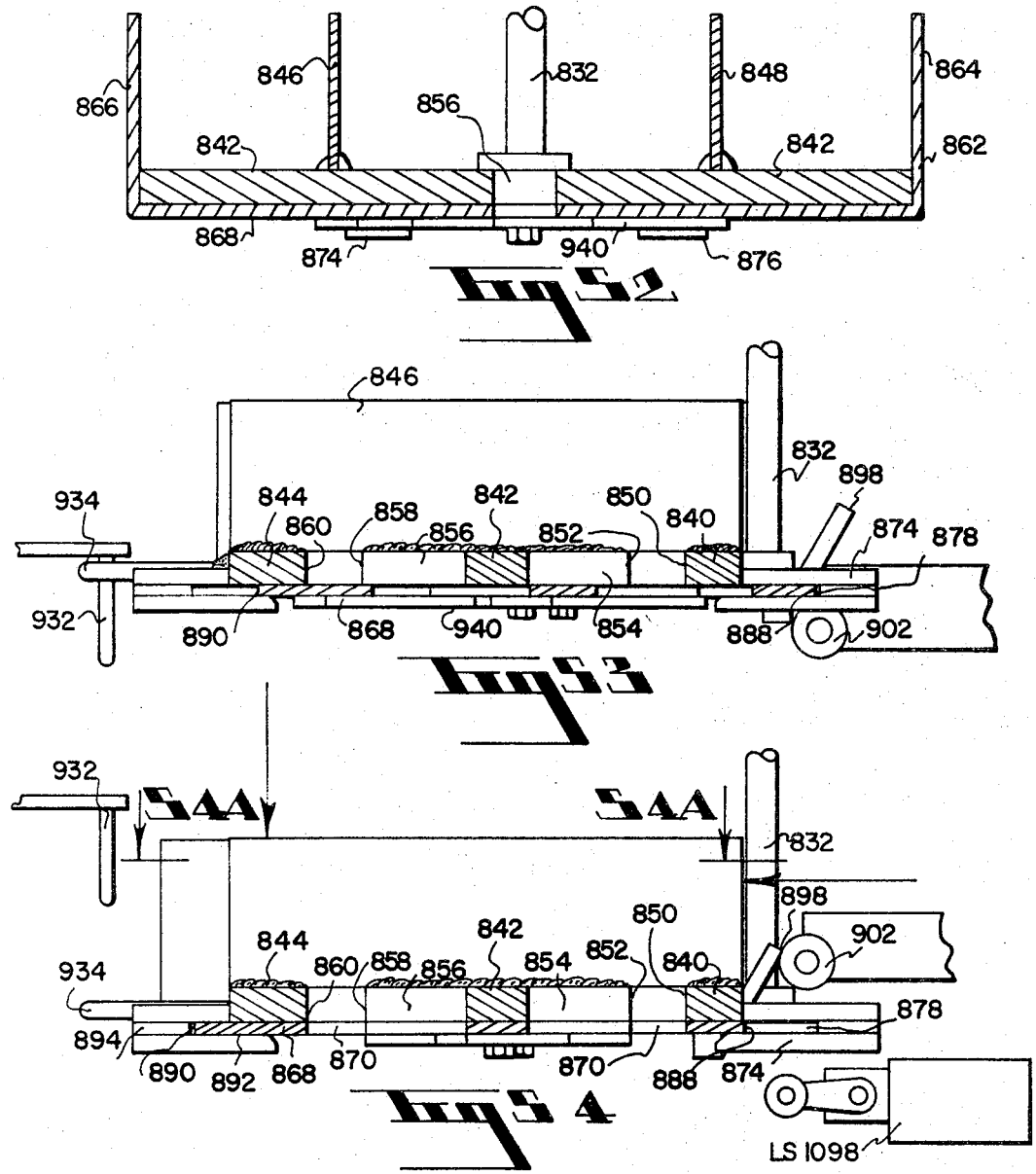

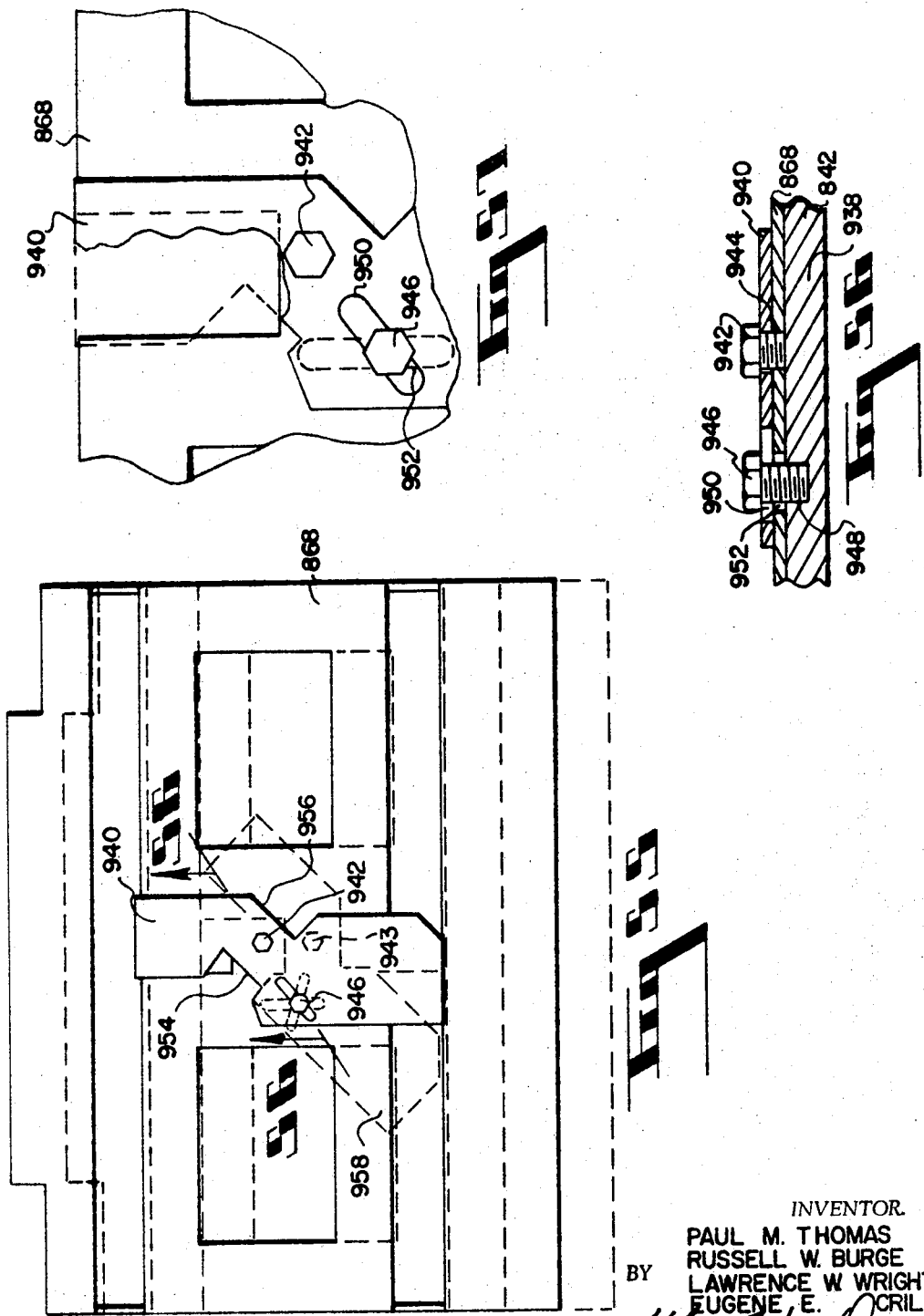

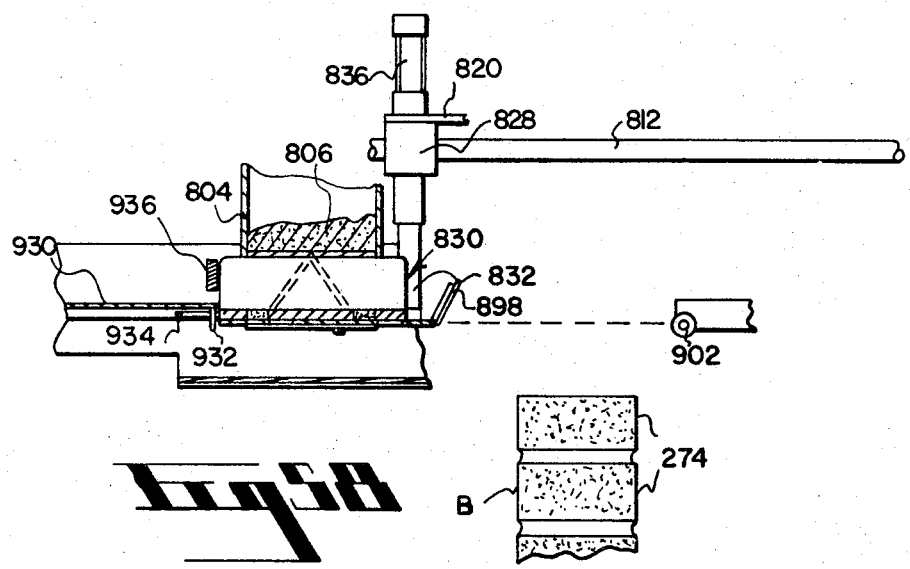
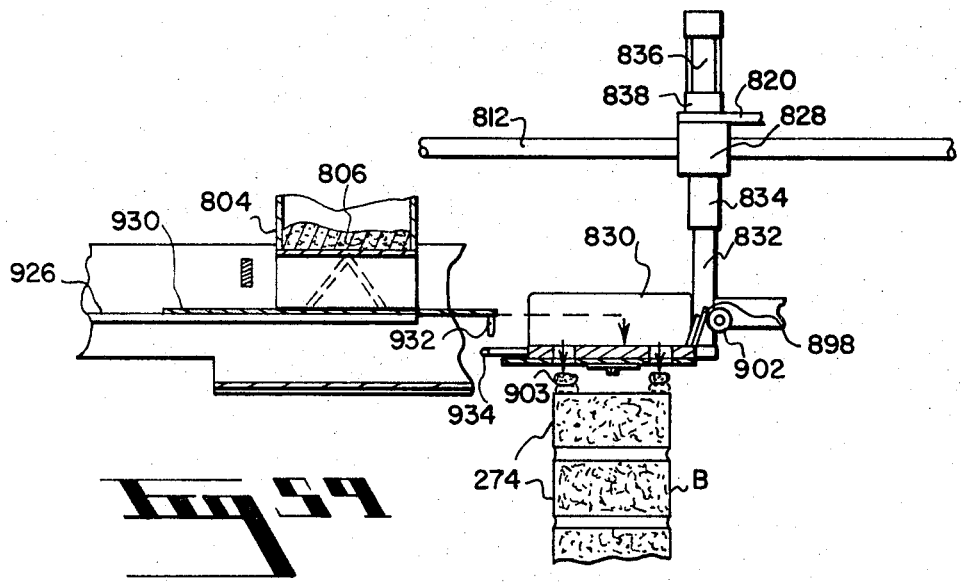

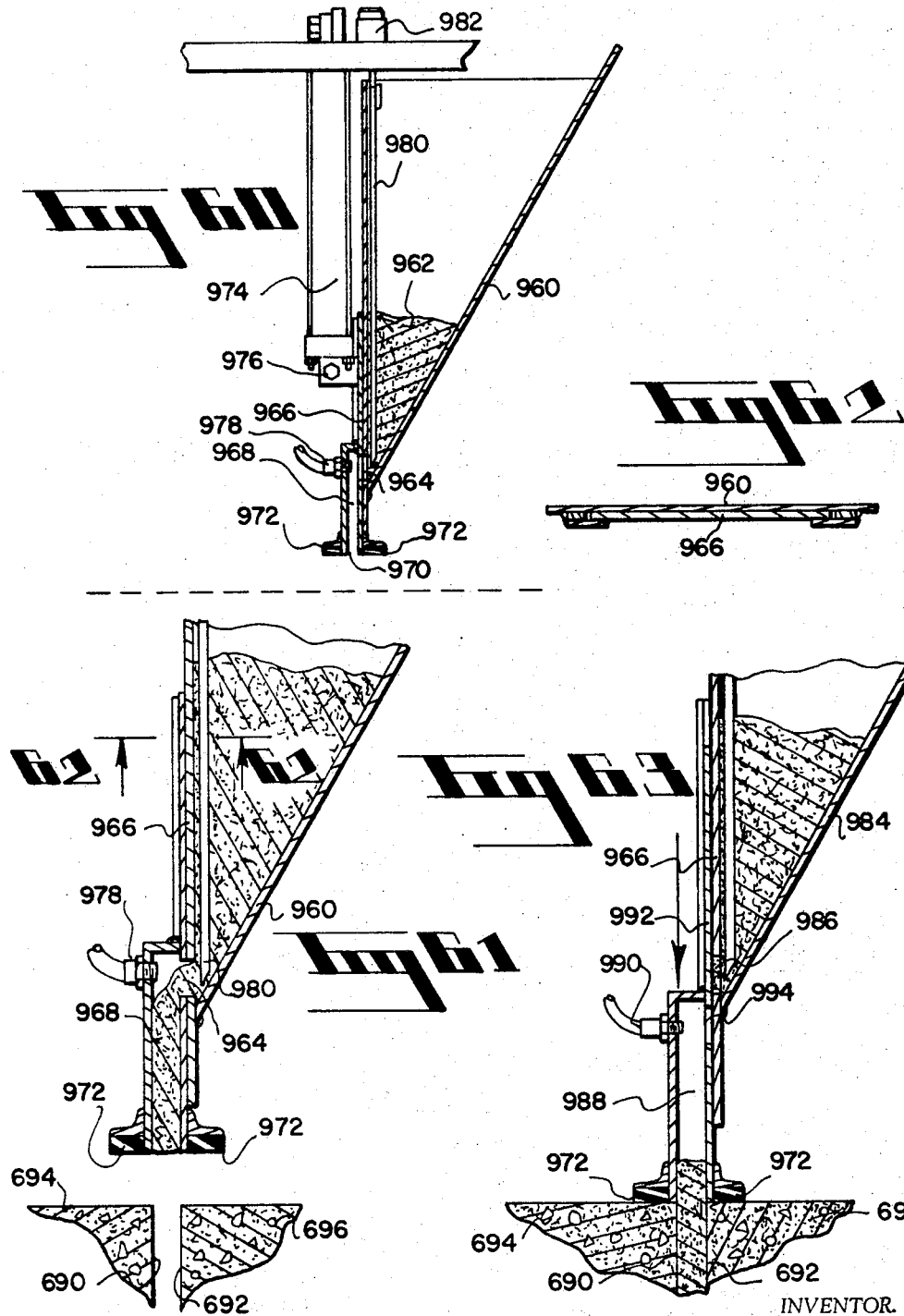

May 14, 1968   P. M. THOMAS ET AL   3,382,640
BRICK LAYING MACHINE
Filed Aug. 1, 1963   38 Sheets-Sheet 32
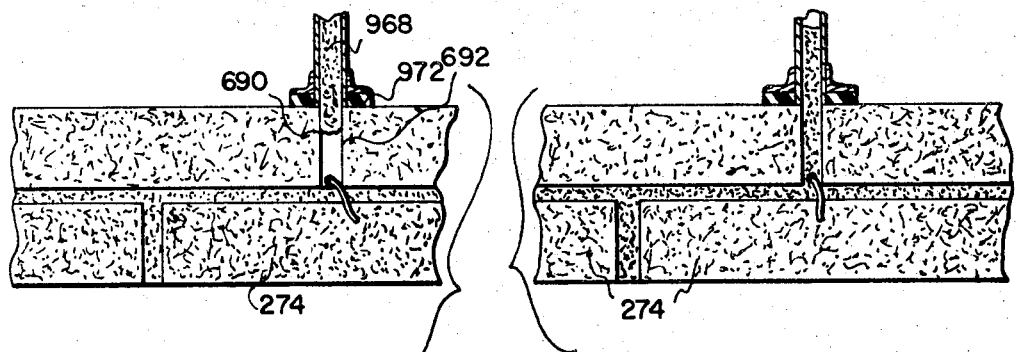
Fig. 4   Fig. 5
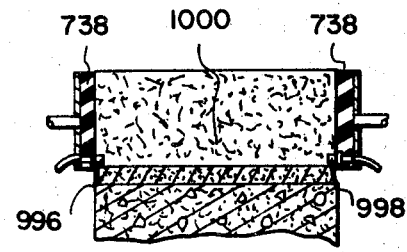
Fig. 6
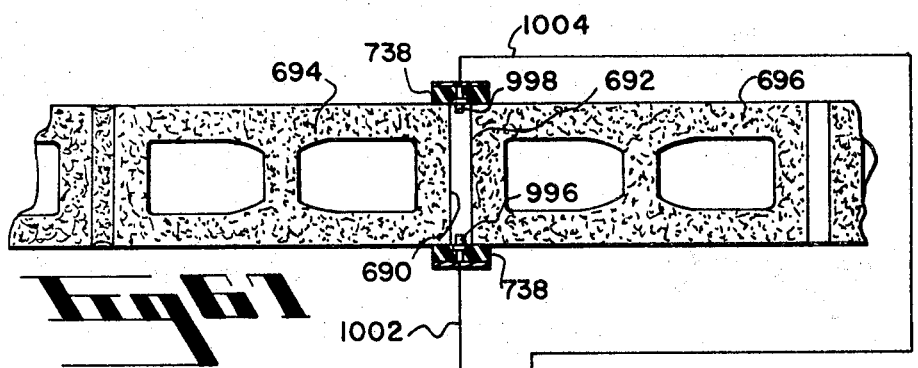
Fig. 7
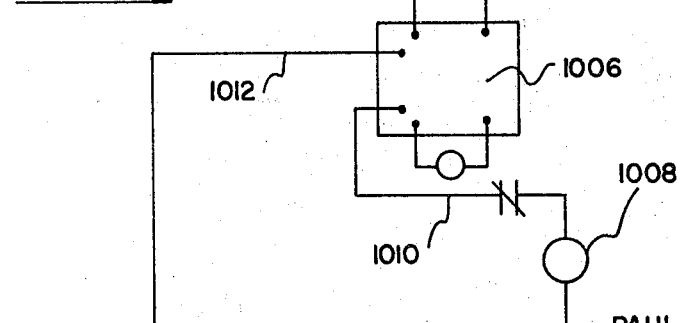
INVENTOR.
PAUL M. THOMAS
RUSSELL W. BURGE
BY LAWRENCE W. WRIGHT
EUGENE E. CRILE
Wm. H. Dean

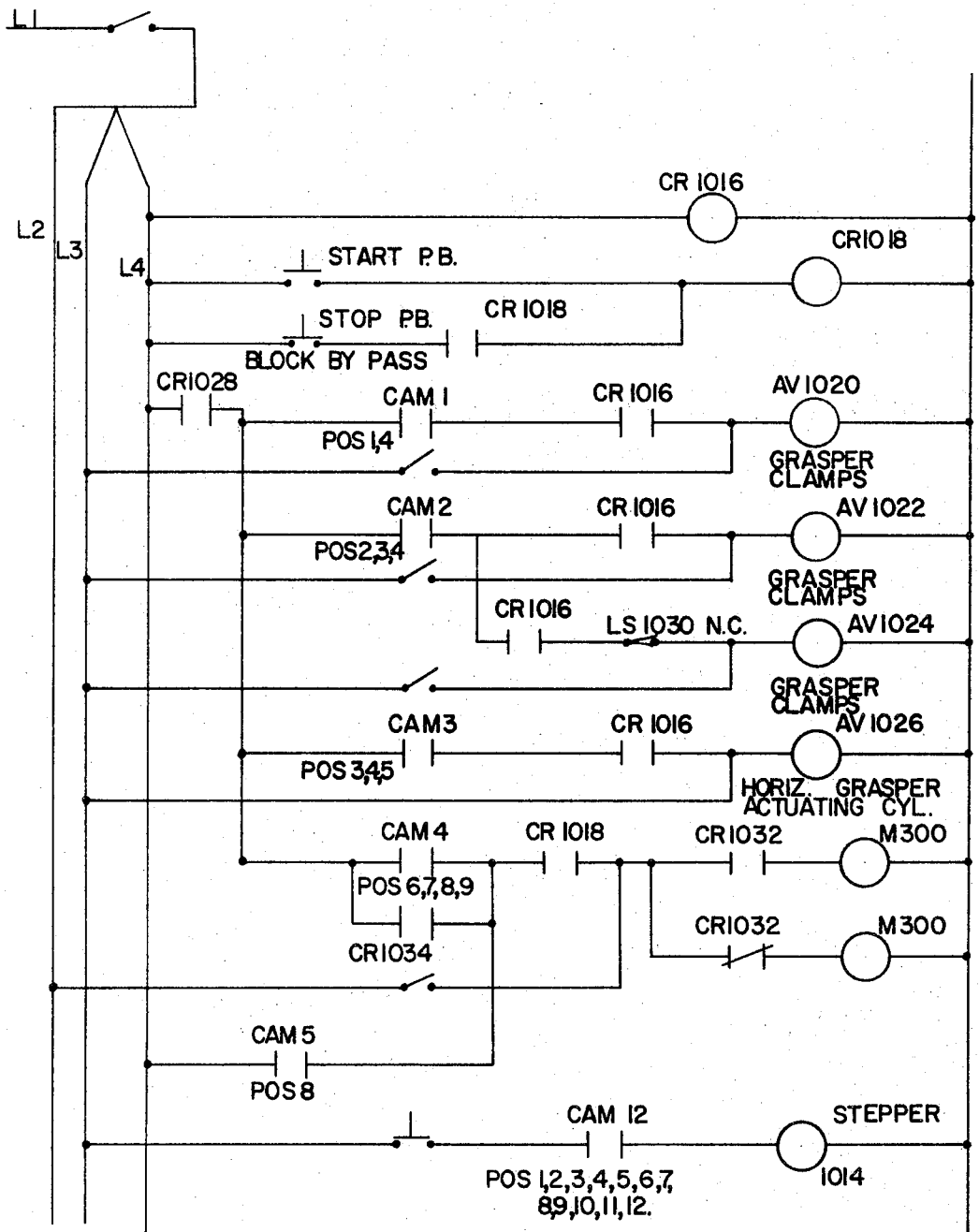

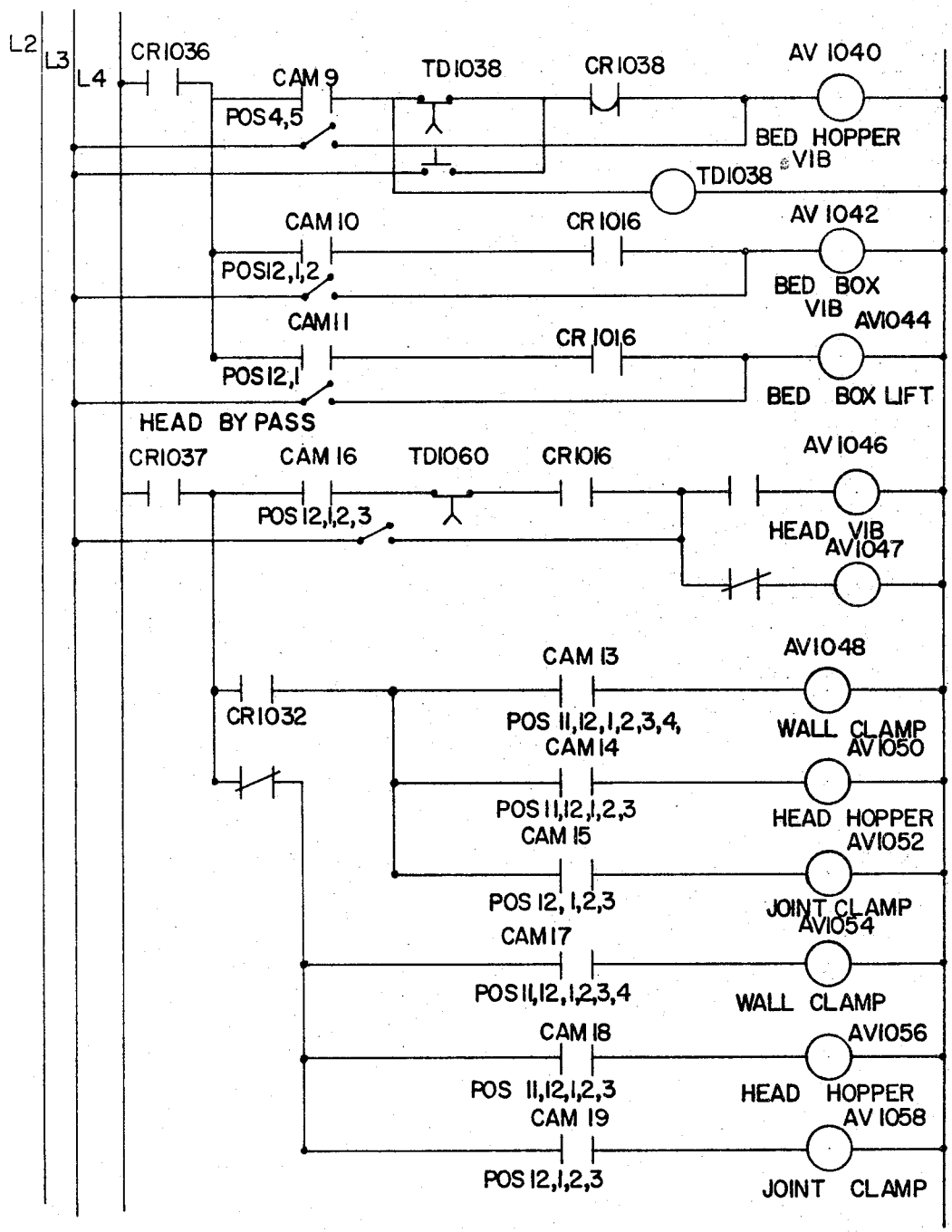

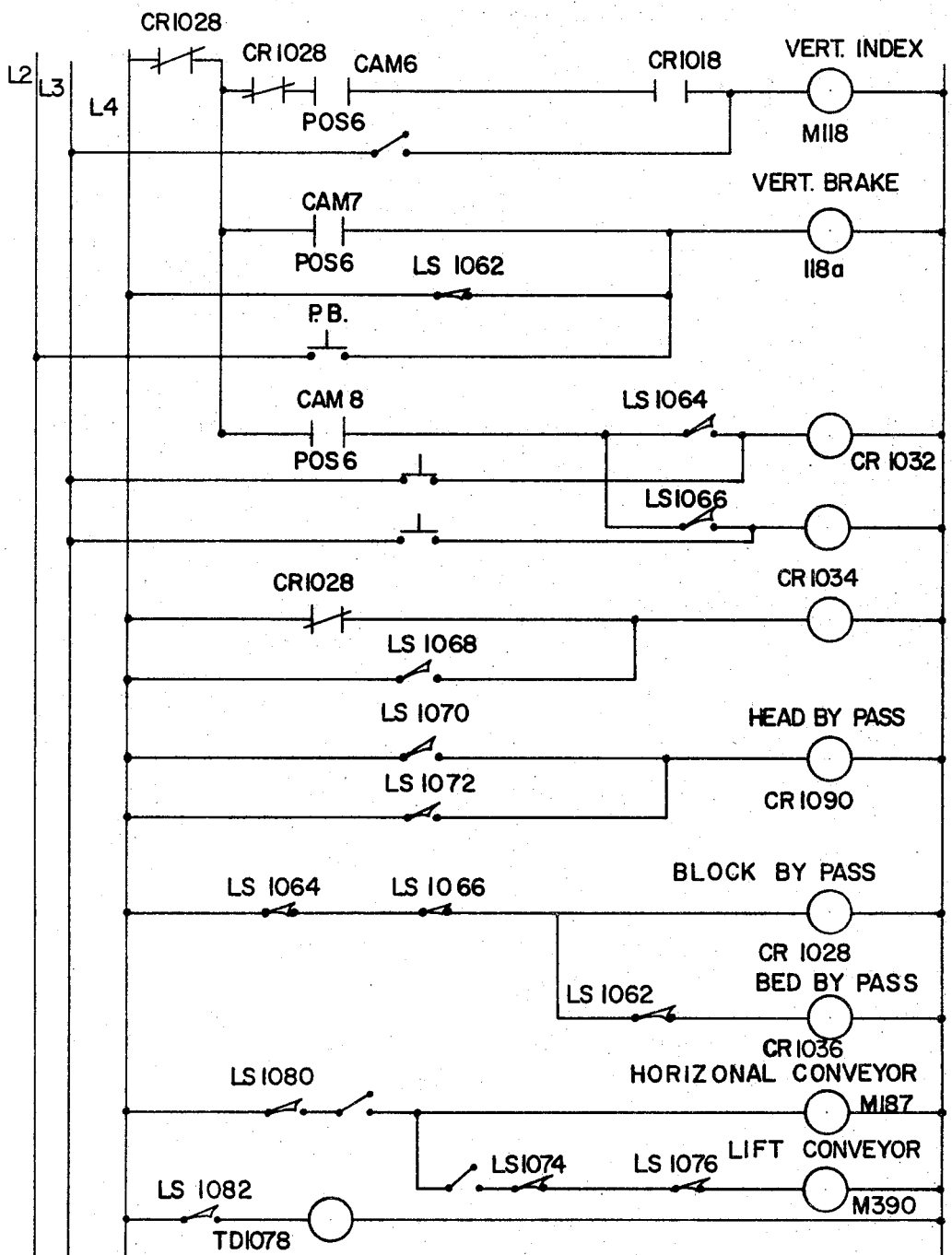

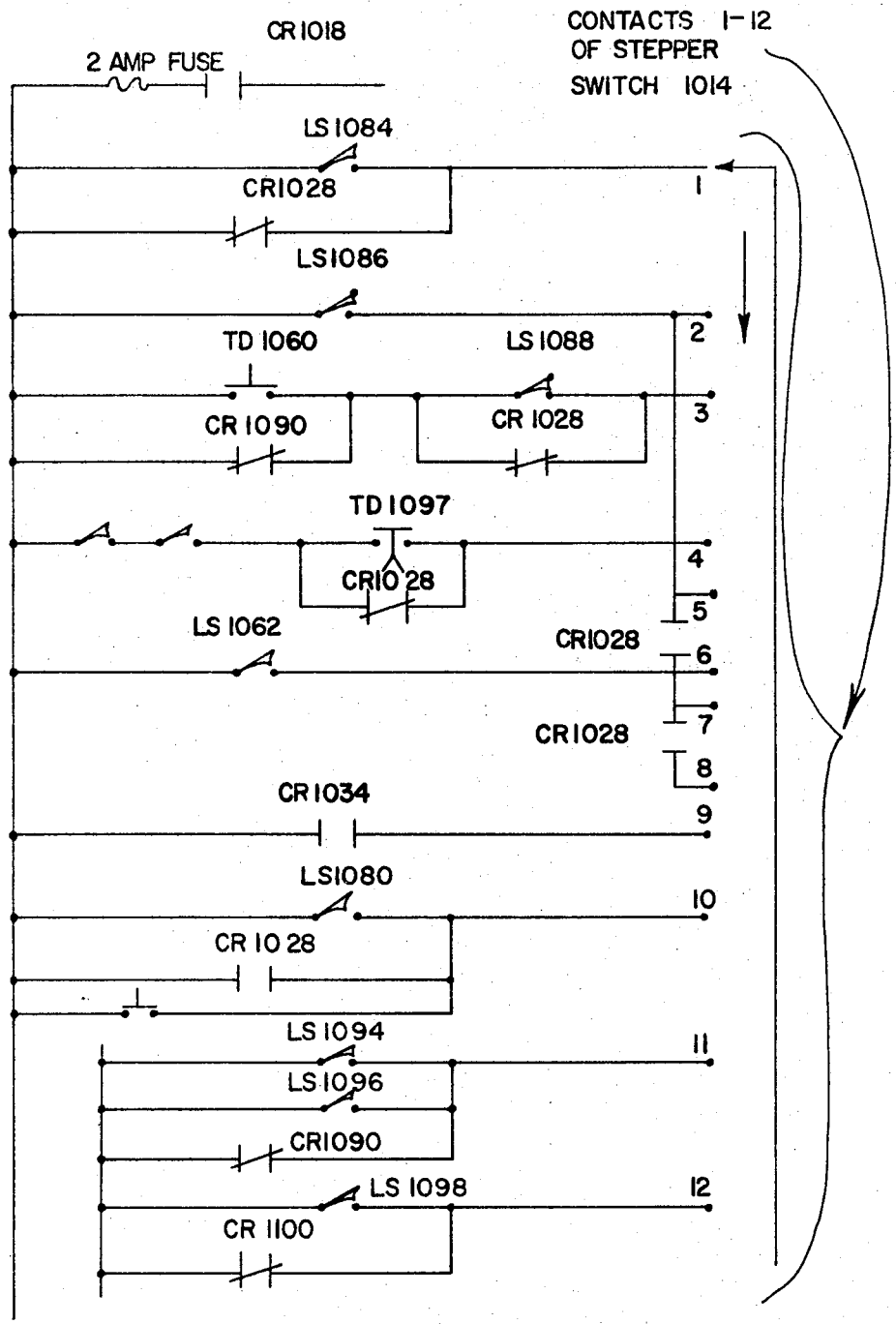

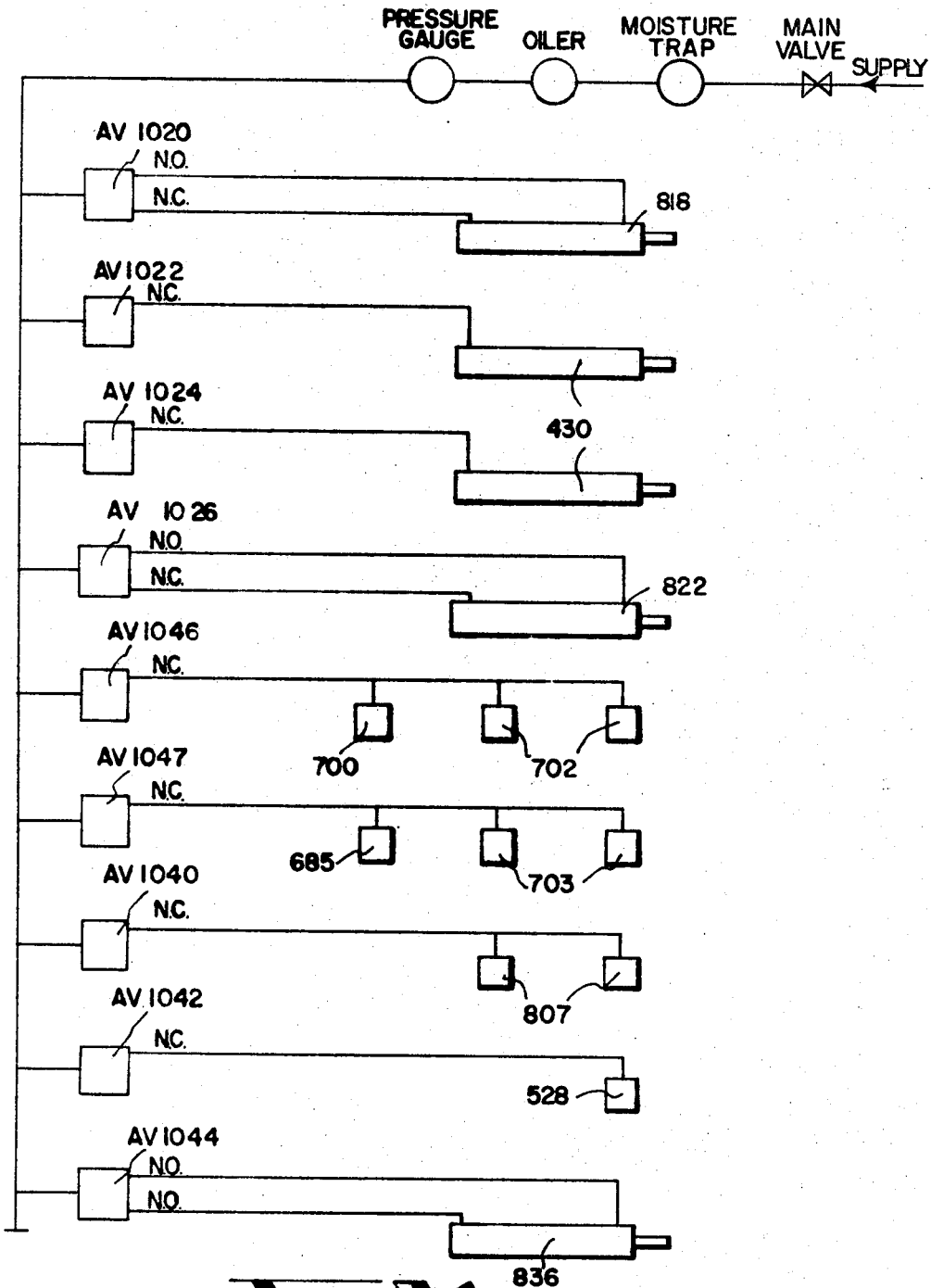

United States Patent Office 3,382,640
Patented May 14, 1968

3,382,640
BRICK LAYING MACHINE
Paul M. Thomas, 5630 E. Edgewood Road, Phoenix, Ariz., and Lawrence W. Wright, Scottsdale, Russell W. Burge, Glendale, and Eugene E. Crile, Phoenix, Ariz.; said Burge, said Wright, and said Crile assignors to said Thomas
Continuation-in-part of application Ser. No. 263,034, Mar. 5, 1963. This application Aug. 1, 1963, Ser. No. 299,354
76 Claims. (Cl. 52—749)

This application is a continuation in part of an application Ser. No. 263,034 filed Mar. 5, 1963, and now abandoned.

This invention relates to a brick laying machine and more particularly to a block laying machine which is capable of laying concrete blocks or bricks and mortaring them into a wall or panel structure.

In the production of wall panels which are constructed of concrete blocks, bricks, or the like, it is common practice for a laborer to lay such blocks or bricks in superimposed disposition, vertically, one above the other, and laying mortar therebetween in order to cement such blocks or bricks in juxtaposition, either to form a wall or panel.

A major portion of the production cost of concrete block walls or panels is represented by direct labor of laying and mortaring such blocks together to form a wall or panel structure.

Various prior art attempts have been made to produce a machine which will automatically lay concrete blocks or the like in a wall or panel structure. However, various problems have presented great difficulties in accomplishing the successful operation of such a machine.

The problems of laying superimposed blocks and mortaring them together, automatically, are numerous, one of which is the problem of longitudinally spacing and indexing blocks while mortaring them together and also concurrently and accurately vertically spacing superimposed tiers or coures of such blocks while maintaining accuracy of alignment of all of the blocks in a wall or panel assembly.

Another problem of great importance has been the provision of a machine which will automatically lay blocks, or the like, and mortar them into a panel or wall structure in such a manner that a very dense and efficient bond is created between the mortar and the blocks so that the panel structure may readily be transportable.

Additionally, it has been a problem to provide an automatic machine which will lay blocks, or the like, and mortar them together into a wall or panel structure while, at the same time, mortar used to cement the blocks together is neatly finished at the joints of the adjacent bricks without leaving substantial random portions of the mortar on the sides of the blocks after they have been mortared together and assembled into a wall or panel section.

It has been recognized that mortar applied to blocks or bricks by a machine must cover all of the horizontal areas and yet the mortar must not be excessively applied or unevenly distributed, otherwise excessive mortar will be used or a poor mortar bond or uneven finished structure may result.

Accordingly, it is an object of the present invention to provide an automatic block laying machine which will efficiently lay and mortar together concrete blocks, bricks, or the like, whereby very neat and accurate wall panels or wall sections may be produced.

Another object of the present invention is to provide an automatic machine for laying blocks or bricks and mortaring them together in a very accurate assembly wherein the mortar joints are very strong and which will thereby permit transportation of the panel or wall sections so produced.

Another object of the invention is to provide a block laying machine having very novel means for applying and vibrating mortar between blocks as they are precisely laid, whereby a very intimate and strong bond of the mortar with the adjacent blocks is accomplished so that the mortar, when cured, holds a wall panel assembly of blocks strongly together to thereby permit such panels to be transported from a production area to an end use area without fracture of the mortar or the blocks under normal handling conditions.

Another object of the invention is to provide a block laying machine having novel means for laying and uniformly distributing fresh mortar on the horizontal surfaces of blocks later to be engaged by superimposed blocks laid by the machine.

Another object of the invention is to provide a block laying machine having a horizontal carriage disposed to lay blocks; said horizontal carriage having a novel crank mechanism engagable with indexing teeth spaced equal to the modulus of the blocks whereby maximum acceleration and deceleration of the carriage, as it moves from one indexed location to another, is attained due to the arcuate travel of the crank arm and its engaged relation with said stationary indexing teeth.

Another object of the invention is to provide a novel block laying machine adapted automatically to lay and mortar together concrete blocks or the like into wall panels or wall sections; said machine being adapted to operate on a horizontal surface and successively lay panel sections of concrete blocks in parallel disposition relative to each other whereby said panels may stand on said surface and subsequently cure as the machine moves laterally of each panel subsequent to the laying thereof by the machine, of the invention.

Another object of the invention is to provide a concrete block laying machine wherein blocks of successive coures are laid with their median portions in overlapping relation with mortar joints of the adjacent superimposed courses; said machine having novel indexing mechanism which may alternately be automatically operable as the carriage of the machine moves back and forth to start indexing the carriage of the machine during the laying of each initial block of each superimposed course to place the block in overlapping position with the mortar joints of the next lower adjacent course; said machine also being adapted to automatically index for half blocks alternately laid in the ends of the courses so that adjacent superimposed courses of blocks may all be properly laid in overlapping relation with the mortar joints of the next lower adjacent courses.

Another object of the invention is to provide a block laying machine having novel means for initially laying a first course of blocks or bricks upon a concrete floor or other surface and then subsequently continuing to vertically index the machine so that subsequent courses of blocks may be successfully laid and mortared, one upon the other, until a wall or panel section of a desired elevation is produced.

Another object of the present invention is to provide a block laying machine having novel means for handling blocks and a novel conveyor system communicating therewith whereby blocks are constantly fed to the area of the handling system which transfers them from the feeding conveyor to a wall or panel section being formed of superimposed courses of blocks being laid by the machine.

Another object of the invention is to provide a block laying machine having positive and very accurate vertical indexing mechanism which precisely controls the elevation of each successive course of blocks, laid one upon the other, so that any number of vertically superimposed courses of blocks will reach an exact predetermined elevation.

Another object of the invention is to provide a block laying machine which comprises means for horizontally indexing blocks successively laid in a wall or panel section; said indexing means being very accurate to provide for uniform spaces between the blocks in which mortar is to be placed whereby the overall longitudinal dimension of a course of blocks and mortar therebetween will meet very exacting measurements.

Another object of the present invention is to provide a concrete block laying machine which very accurately lays and mortars superimposed courses of concrete blocks to form wall panels and wherein novel vacuum cleaning and mortar salvage mechanism efficiently cleans mortar joints to remove excess mortar therefrom and to conserve the mortar while at the same time providing a uniform finished configuration of the various mortar joints between the individual blocks of a wall panel formed by the machine of the invention.

Another object of the invention is to provide a concrete block laying machine having a pair of upright frame members on which a main carriage frame is vertically movable; the upright members having buttress teeth structures with horizontal ledges at their upper portions and inclined portions at their lower portions; the carriage having spring loaded roller followers disposed to roll upon the inclined portions and to positively engage the horizontal upper portions of the buttress teeth whereby the main frame carriage may be elevated precisely the modulus of a course of blocks being laid by the machine into a wall or panel section.

Another object of the invention is to provide a concrete block laying machine which is mounted on rollers and adapted to move on a track or floor laterally of concrete block panels being produced and whereby blocks and mortar may be supplied to the machine by conveyor means so that a single operator may operate the machine and produce a large multiple of concrete block panel structures as compared to that which might be laid by a manual bricklayer.

Another object of the invention is to provide a block laying machine having a novel means for controlling a conveyor which feeds a block laying carriage of the machine when the carriage is proceeding from one end to the other of a panel being produced and then proceeding in the opposite direction, all the while blocks may be fed in a direction from one end of the wall or panel being produced; the conveyor thus may automatically feed blocks toward the carriage of the machine at different rates depending upon the direction the carriage moves longitudinally of the conveyor.

Another object of the invention is to provide a novel vibratory means for feeding mortar onto the upper horizontal surfaces of concrete blocks whereupon blocks may subsequently be laid and vibrated into position.

Another object of the invention is to provide a novel vibrating finger mechanism which is inserted between the head joints or adjacent ends of concrete blocks of a common course whereby mortar fed between adjacent ends of such blocks may very efficiently be compacted and adhered to the ends of the blocks by vibration of said fingers during the feeding of the mortar to form head joints between the blocks.

Further objects and advantages of the present invention may be apparent from the following specification, appended claims, and accompanying drawings, in which:

FIG. 1 is a front elevational view of a brick laying machine, in accordance with the present invention;

FIG. 2 is an end elevational view thereof taken from the line 2—2 of FIG. 1;

FIG. 3 is an enlarged fragmentary plan sectional view taken from the line 3—3 of FIG. 1 and showing concrete blocks carried by the conveyor of the machine and additionally, concrete blocks laid and mortared into a wall by the machine;

FIG. 4 is an enlarged fragmentary elevational view similar to that shown in FIG. 1, but showing only block handling carriage details of the invention;

FIG. 5 is an enlarged fragmentary sectional view taken from the line 5—5 of FIG. 4, showing details of a mortar feeding hopper mechanism of the present invention;

FIG. 6 is an enlarged fragmentary sectional view taken from the line 6—6 of FIG. 4, showing block grasping mechanism of the invention which is utilized to transfer blocks from a conveyor to a course of blocks being laid in a wall;

FIG. 7 is an enlarged fragmentary sectional view taken from the line 7—7 of FIG. 4;

FIG. 8 is an enlarged fragmentary sectional view taken from the line 8—8 of FIG. 1, showing mechanism beyond the plane of the section broken away to amplify the illustration and further showing concrete blocks on the conveyor of the machine carriage and also in superimposed courses of blocks being laid and mortared together by the machine to form a wall or panel;

Figure 54A:
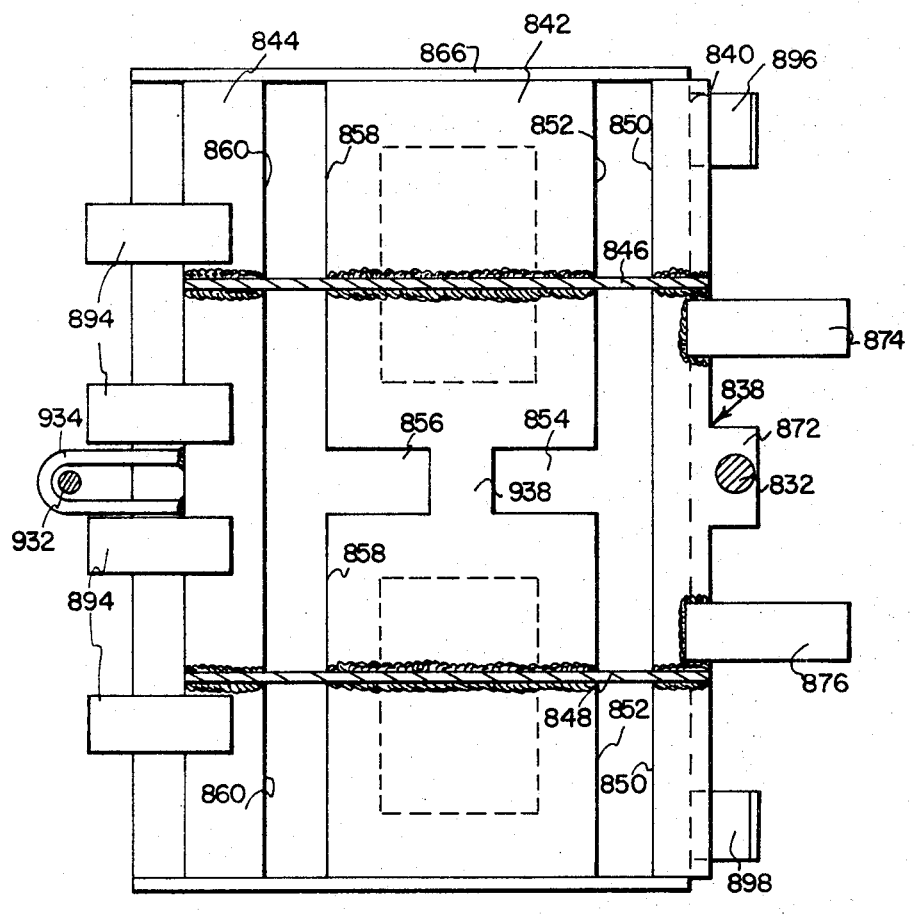

FIG. 9 is an enlarged fragmentary sectional view similar to that shown in FIG. 8 but showing only a portion of the mechanism including one mortar dispensing hopper means adapted to dispense mortar on the horizontal surfaces of concrete blocks to form a bed joint between superimposed courses of blocks; said blocks being shown in relation to said mortar dispensing means and said means being disclosed in varying positions by broken lines;

FIG. 10 is a fragmentary elevational view similar to FIG. 8 but showing outside features of a mortar dispensing hopper and mortar placement means utilized to place and vibrate mortar between vertical end surfaces of concrete blocks to produce mortar head joints therebetween;

FIG. 11 is an enlarged fragmentary sectional view taken from the line 11—11 of FIG. 8 and showing head joint mortar dispensing and vibrating mechanism placing mortar between vertically disposed ends of concrete blocks to establish and attain mortar head joints between adjacent blocks of a horizontal course thereof;

FIG. 12 is a view similar to FIG. 4 but showing portions broken away and in section to amplify the illustration;

FIG. 13 is a plan sectional view taken from the line 13—13 of FIG. 12;

FIG. 14 is a fragmentary side elevational view similar to FIG. 12 but showing portions of the mechanism on enlarged scale;

FIG. 15 is a plan sectional view similar to FIG. 3 but showing modified mechanism of the machine of the invention;

FIG. 16 is a view similar to FIG. 8 but showing a modification of the mechanism of the machine corresponding to the mechanism shown in FIG. 15;

FIG. 17 is a fragmentary sectional view taken from the line 17—17 of FIG. 3 and showing the horizontal indexing mechanism of the invention which is adapted to move the block handling carriage of the machine of the invention longitudinally of a course of blocks being laid thereby intermittently to stop said carriage in precise increments equal to the longitudinal modulus of the blocks being laid;

FIG. 18 is a fragmentary sectional view taken from the line 18—18 of FIG. 17;

FIG. 19 is a diagrammatic view of the function of the indexing mechanism shown in FIGS. 17 and 18;

FIG. 20 is a further diagrammatic illustration of the indexing mechanism shown in FIGS. 17 and 18;

FIG. 21 is another diagrammatic illustration of an adjustable function of the indexing mechanism shown in FIGS. 17 and 18; said adjustable function being adapted for the purpose of accommodating the laying of concrete blocks in superimposed courses wherein all of the vertical head joints of the blocks are vertically aligned, as disclosed in FIG. 21a;

FIG. 20a is a side elevational view of superimposed courses of concrete blocks laid in a wall or panel and corresponding to the diagrammatic functional illustration disclosed in FIG. 20;

FIG. 22 is a fragmentary side elevational view of adjustable mechanism utilized to change the indexing mechanism function, as shown in FIG. 20, to the indexing mechanism function, as shown in FIG. 21;

FIG. 23 is a sectional view taken from the line 23—23 of FIG. 22;

FIG. 24 is an enlarged fragmentary sectional view taken from the line 24—24 of FIG. 2 showing details of the horizontal and vertical indexing mechanism of the machine of the invention;

FIG. 25 is an enlarged fragmentary view of an indexing mechanism plunger device shown in FIG. 4 for engagement with vertically spaced buttress teeth of the vertical indexing mechanism of the machine;

FIG. 26 is a view similar to FIG. 24 but showing vertical indexing mechanism of the machine at the opposite end of the main carriage of the machine from that as shown in FIG. 24 and further illustrating indexing latch means in connection therewith;

FIG. 27 is a fragmentary sectional view of the vertical indexing mechanism of the machine of the invention and showing portions thereof directly above the mechanism shown in FIG. 26 and the continuity thereof;

FIG. 28 is a view similar to FIG. 27 omitting some of the indexing mechanism but showing a varying position of the vertical stop structure of the vertical indexing mechanism to limit the overall height of the machine, in accordance with the number of superimposed courses of blocks it is desired to lay in a block panel or wall structure;

FIG. 29 is an enlarged fragmentary view taken on substantially the same plane as FIG. 24 but showing a block feeding conveyor mechanism adapted to feed blocks onto the carriage conveyor of the machine of the invention;

FIG. 30 is a fragmentary elevational view taken from the line 30—30 of FIG. 29 showing further details of the block feeding mechanism of the invention;

FIG. 31 is an enlarged fragmentary sectional view taken from the line 31—31 of FIG. 30;

FIG. 32 is a view of the block feeding conveyor mechanism of the invention movably mounted on a floor structure and movable in unison with the machine as it transports itself from one block wall, previously laid, to a location laterally thereof in which a subsequent wall will be laid by the machine;

FIG. 33 is a sectional view taken from the line 33—33 of FIG. 32;

FIG. 34 is a sectional view taken from the line 34—34 of FIG. 32;

FIG. 35 is a fragmentary view similar to FIG. 16, showing a vacuumatic mortar removal device for removing excess mortar from fresh joints between blocks of a wall being produced by the machine of the invention;

FIG. 36 is a diagrammatic view of the remainder of the vacuumatic mortar removal device as shown in FIG. 35;

FIG. 37 is a diagrammatic view of pneumatic and hydraulic actuating cylinders for actuating mechanism of the machine of the invention; said cylinders having solenoid valves disclosed in connection therewith;

FIG. 38 is a diagrammatic view of the electrical wiring utilized in connection with the solenoids disclosed in FIG. 37 of the drawings; FIG. 38 being only a partial illustration of the electrical wiring of the machine;

FIG. 39 is a diagrammatic view showing other portions of the electrical equipment of the invention and being a continuity of the disclosure of FIG. 38;

FIG. 40 is a further diagrammatic illustration showing a continuity of the electrical wiring of the machine, as disclosed in FIGS. 38 and 29;

FIG. 41 is a diagrammatic side elevational view of the concrete block laying machine of the invention supported on an elevated platform and having pallet carrying rails movable thereunder and projectable into a steam curing room and showing a plurality of I-beam pallets supporting walls laid by the block laying machine of the invention and being projected into a steam curing room;

FIG. 41a is an enlarged fragmentary sectional view taken from line 41a—41a of FIG. 41.

Figure 73:
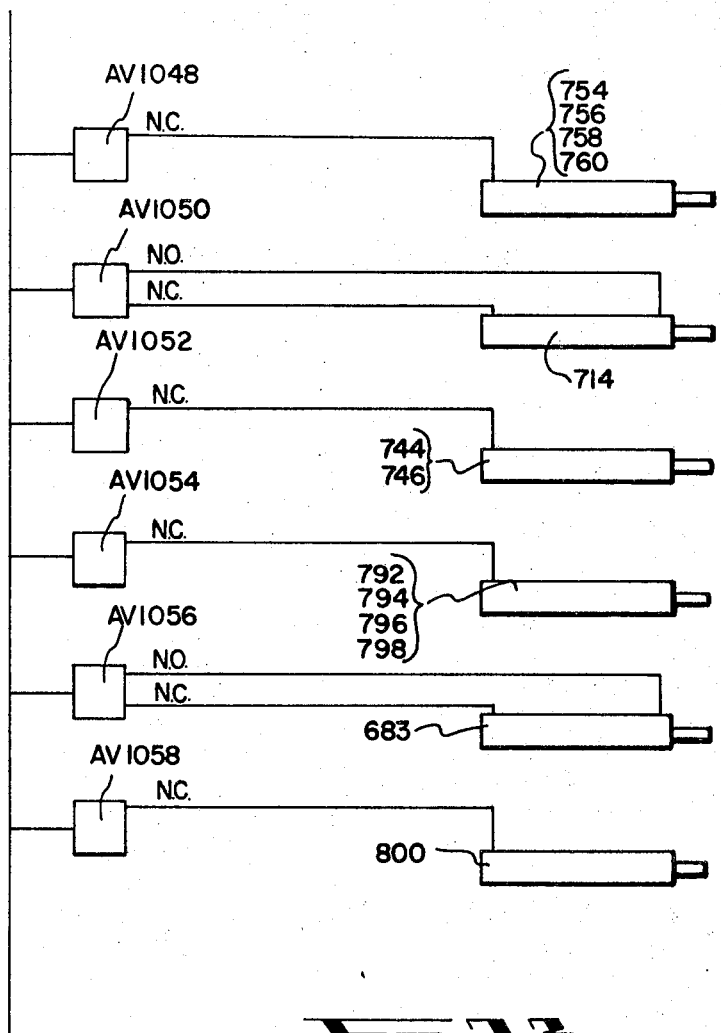

FIG. 42 is an enlarged fragmentary view showing modified structure of the machine of the invention and illustrating the same in a view similar to FIG. 1, but showing only a fragmentary portion of the mechanism of the machine;

FIG. 43 is a sectional view of the modified machine structure shown in FIG. 42 and taken from line 43—43 of FIG. 42;

FIG. 44 is a fragmentary side elevational view of part of the mechanism shown in FIG. 42 and illustrating this mechanism in relation to superimposed tiers of concrete blocks being laid by the machine;

FIG. 45 is a fragmentary sectional view taken from the line 45—45 of FIG. 44;

FIG. 46 is an enlarged fragmentary section view taken from the line 46—46 of FIG. 44;

FIG. 47 is a fragmentary sectional view taken from the line 47—47 of FIG. 42;

FIG. 48 is a fragmentary sectional view taken from the line 48—48 of FIG. 47;

FIG. 49 is a view similar to FIG. 47 but showing structural features of the invention on enlarged scale and illustrating the hopper and vibrator structure of the invention relative to a pair of concrete blocks between which mortar is being inserted and compacted;

FIG. 50 is a fragmentary top or plan view of machine structure of the invention taken from the line 50—50 of FIG. 42;

FIG. 51 is a fragmentary bottom plan view of machinery of the invention taken from the line 51—51 of FIG. 43;

FIG. 52 is an enlarged fragmentary sectional view taken from the line 52—52 of FIG. 51;

FIG. 53 is an enlarged fragmentary sectional view taken from the line 53—53 of FIG. 51;

FIG. 54 is a view similar to FIG. 3 but showing a varying position of parts of the mechanism disclosed therein;

FIG. 54a is a plan sectional view taken from line 54a—54a of FIG. 54;

FIG. 55 is an enlarged bottom plan view of a portion of the mechanism shown in FIG. 51;

FIG. 56 is an enlarged fragmentary sectional view taken from the line 56—56 of FIG. 55;

FIG. 57 is an enlarged fragmentary view similar to a portion of the mechanism shown in FIG. 55 but showing the mechanism in greater detail;

FIG. 58 is a fragmentary view of mortar placing mechanism of the machine taken in substantially the same direction as FIG. 43 but showing in detail and on enlarged scale the mortar handling mechanism relative to a tier of concrete blocks being laid by the machine of the invention;

FIG. 59 is a view similar to FIG. 58 but showing a varying position of the mortar handling mechanism and showing it dispensing a layer of mortar on top of a concrete block at the uppermost portion of a tier of blocks being laid by the machine;

FIG. 60 is a fragmentary sectional view of a modified mortar handling hopper mechanism for mechanically and pneumatically placing concrete between the heads of concrete blocks in a position similar to that disclosed in FIG. 49;

FIG. 61 is an enlarged fragmentary sectional view similar to FIG. 60 but showing the mechanism of the concrete mortar placing means in greater detail and in relation to adjacent head ends of a pair of concrete blocks;

FIG. 62 is a fragmentary sectional view taken from the line 62—62 of FIG. 61;

FIG. 63 is a view similar to FIG. 61 but showing the mortar placing mechanism thereof inserting mortar between head ends portion of a pair of adjacent concrete blocks;

FIG. 64 is a fragmentary sectional view of a plurality of tiers of concrete blocks and showing head joint mortar placing mechanism comprising switch contacts adapted to be abridged by mortar placed between concrete blocks whereby the mortar placing mechanism will automatically be de-energized when the mortar closes a circuit between a pair of spaced contacts indicating that the space between the blocks is filled;

FIG. 65 is another view similar to FIG. 64 and illustrating further contact means;

FIG. 66 is a fragmentary sectional view taken from the line 66—66 of FIG. 65;

FIG. 67 is a diagrammatic view of the electrical wiring and control equipment utilized in connection with the mortar indicating contact means shown in FIGS. 64, 65 and 66;

FIGS. 68, 69, 70 and 71 are diagrammatic views each showing a portion of the electrical wiring and electrical equipment utilized in connection with the concrete brick laying machine of the invention; and FIGS. 72 and 73 are diagrammatic views of the pneumatic and valve actuating system of the concrete block laying machine of the invention.

As shown in FIGS. 1 and 2 of the drawings, the brick laying machine of the present invention is provided with a frame 50 having a base portion 52 mounted on rollers 54 and 56 which traverse tracks 58 on a floor 60. This floor 60 is preferably of concrete and is level. It will be noted that a pair of tracks 58 are disposed in parallel relationship to each other and that a corresponding pair of rollers 54 engage these tracks 58 while there are a pair of the rollers 56 also engaging the tracks 58. This arrangement permits the machine of the invention to be moved in a direction of an arrow A so that a plurality of block walls or panels B may be laid in parallel relationship to each other and in upstanding position on the floor 60. Thus, the machine may continue to move in the direction of the arrow A, intermittently, following the completion of each of the block walls B.

The frame base 52 is provided with brace members 62 connected to uprights 64 and 66 which are interconnected at their upper ends by a cross member 68 and the base 52 is provided with a cross member 70 at its lower end interconnecting the uprights 64 and 66.

Vertically movably mounted on the uprights 64 and 66 is a main carriage 71 which is horizontally disposed and having a structural pipe 72 as its main structural member. Coupled to opposite ends of this main carriage 71 are chains 74 and 76. These chains 74 and 76 pass over and engage sprockets 78 and 80 on opposite ends of a shaft 82 which is rotatable mounted on the top of the frame above the member 68 by means of bearings 84, 86 and 88. Opposite ends of the chains 78 and 80 pass over stationary idler sprockets 90 and are connected to counterweights 92 which substantially balance the weight of the main carriage 71 and mechanism supported thereon.

Another chain 94 is coupled to each end of the main carriage 71 substantially in alignment with the respective chain 78 or 80 and this chain 94 passes downwardly around a sprocket 96 and extends upwardly into connection with the counterweight 92 at 98. Thus, the counterweights 92 at each opposite end of the carriage 71 are stabilized, all as shown best in FIGS. 1 and 2 of the drawings.

The main carriage 71 is mounted on the vertical members 64 and 66 to move on respective tracks 100 and 102 carried thereby. The main carriage being provided with rollers 104 and 106 engaging these tracks 100 and 102. The tracks 100 and 102 are V-shaped in cross section tracks and are supported on frame portions 108 and 110, respectively, shown in FIGS. 26 and 24, respectively. These frame portions 108 and 110 support the respective track following rollers on opposite sides of the perspective uprights 66 and 64 in a substantially conventional manner.

It will be seen from FIG. 2 of the drawings that the rollers 104, at each opposite end of the main carriage 71, operate in engagement with vertical tracks 105 and that the rollers 106, on the opposite side or front of the vertical member 64, operate on tracks 107. Thus, the structure of the main carriage 71 is supported in cantilever fashion on the main frame so that it may freely be moved up and down in connection with the chains 74 and 76. The chains are driven by means of the shaft 82, hereinabove described, on which a drive sprocket 108 is secured. This drive sprocket 108 is engaged by a chain 110 driven by a sprocket 112 on a shaft 114 of a reduction gear box 116 driven by a motor 118. This drive mechanism is supported on a platform 120 carried by the upper cross member 68 of the main frame. The motor 118 is a conventional electric motor provided with an electric brake and is intermittently controlled to raise the main carriage 71 in vertical increments, as will be hereinafter described in detail.

As shown in FIGS. 1 and 2 of the drawings, the main carriage 71 is provided with horizontally extending cantilever track and conveyor supports 122 on which a roller conveyor 124 is mounted. This conveyor 124 is adapted to carry blocks in a direction parallel to the longitudinal axis of the main carriage 71.

Supported on the horizontal members 122 is an inverted V-shaped in cross section track portion 126 which is adapted, partially, to support a block handling carriage, as will be hereinafter described. The main carriage 71 is also provided with a second track member 128 extending longitudinally thereof and parallel to the track 126. The tracks 126 and 128 are engaged by rollers 130 and 132, respectively, of the block handling carriage, as shown best in FIGS. 8 and 34 of the drawings. Rollers 129 on the carriage also engage a main carriage track member 131.

The block handling carriage, generally designated 134, is provided with a frame 136 to which the rollers 130 and 132 are rotatably mounted.

The frame 136 is provided with cross members 138 and 140 which carry opposite ends of a pair of guide rods 142 and 144 on which a platform 146 is slidably mounted. This platform 146 is slidably mounted longitudinally of the rods 142 and 144 and mounted on the platform 146 is a pressure fluid actuated cylinder 148 having a plunger shaft 150 vertically movable and to the lower end of which is coupled a block grasping mechanism 152 shown in detail in FIG. 6 of the drawings. The block grasping mechanism 152 is provided with a frame plate 154 which is generally horizontally disposed and to which the plunger 150 of the pressure fluid cylinder 148 is fixed.

Mounted on the plate 154, at opposite sides of the plunger 150, are pressure fluid actuated cylinders 156 and 158. These cylinders are similar and operate in conjunction with identical block grasping mechanism as shown in FIG. 6, therefore the pressure fluid cylinder 156 and its respective block grasping mechanism will be hereinafter described.

The cylinder 156 is provided with a plunger 160 projecting through the plate 154 and having an enlarged head 162 which is engaged with ends 164 of bell crank arms 166 which are pivotally mounted on pins 168 in connection with the plate 154. Downwardly and substantially vertically projecting ends 170 of the bell crank arms 166 are adapted to be positioned internally of a cavity 172 in a concrete block 174, the outer sides of the vertical portions 170 of the bell crank arms 166 are provided with resilient pads 176 having a high co-efficient of friction with the concrete block 174 so that when the plunger 160 of the pressure fluid cylinder 156 is extended downwardly, it pivots the bell crank members 166 about the axes of the pins 168 and projects the arm portions 170 outwardly forcing them apart, frictionally, to engage opposite inner walls of the cavity 172 of the concrete block 174. Thus, the concrete block is grasped and held by the block grasping mechanism 152.

A spring 178 interconnects the opposed arm portions 170 and tends to pull them toward each other for releasing them from the inner walls of the cavity 172 of the block 174 when the pressure fluid cylinder 156 is de-energized thereby permitting retraction of the plunger 160 upwardly so that the end portions 170 of the bell crank arms 166 may pivot inwardly toward each other under influence of the spring 178. Referring again to FIG. 8 of the drawings, it will be seen that the block grasping mechanism 152, being mounted on the plunger 150 of the pressure fluid cylinder 148, is carried by movement of the platform 146 longitudinally of the rods 142 and 144 from a position of the concrete block 174 on the conveyor 124 to a position directly over the concrete blocks 174 in superimposed courses of a wall or panel designated 180, in FIG. 8 of the drawings. Thus, the platform 146 carries the cylinder 148 and the block grasping mechanism 152 back and forth between the conveyor 124 and the courses of blocks designated 180, which may comprise a concrete block wall or panel being produced by the machine.

As shown in FIG. 4 of the drawings, blocks 174 are fed on the conveyor 124 in a direction of an arrow 182 toward a stop plate 184 which overlies the conveyor 124 and which carries a limit switch 186 disposed to control operation of a block driving conveyor 185 and a motor 187 which powers the conveyor 185. This conveyor 185 delivers blocks in the direction of the arrow 182, as shown in FIG. 29, and delivers the blocks onto the conveyor 124 toward the stop plate 184, all as shown best in FIGS. 8 and 29, of the drawings.

Thus, the blocks, as they contact the plate 184, trip the switch 186 and de-energize operation of the motor 187. Switches 190 and 192 are provided with arm portions engagable with blocks 174 on the conveyor 124 when it is full, the switch 190 is in series with the switch 186 and when both switches are engaged and open, the motor 187 is stopped, thereby stopping operation of the conveyor. 185. The switch 192 is in series with a switch 194 and disposed to control operation of a third conveyor 196. This conveyor 196 dumps blocks onto the short conveyor 185 and when both switches 192 and 194 are closed, operation of the conveyor 196 is interrupted, as will be hereinafter described.

Thus, blocks are fed onto the conveyor 124 and are kept in engagement with the plate 184 which aligns with the block grasping mechanism 152 as it slides back and forth on the rods 142 and 144.

The plate 154, at its opposite edges 155 and 157, slides into channels 198 and 200, respectively, which are carried on the inner side walls of mortar handling hoppers 202 and 204, respectively, as shown best in FIGS. 4, 8 and 11 of the drawings. Thus, the channel structures 198 and 200 are opposed to each other and receive opposite edges 155 and 157 of the plate 154 as it slides from the conveyor 124 to a position over the courses 180 of blocks 174. Thus, the plate 154 is vertically interlocked with the hoppers 202 and 204 which are vertically slidably mounted on vertically disposed guide rods. The hopper 202 being vertically slidably mounted on guide rods 206 and the hopper 204 being vertically slidably mounted on guide rods 203.

As shown in FIG. 10, each of the hoppers 202 and 204 is provided with vertical cylindrical bearings 210 which are vertically slidably mounted on the rods 208. Inasmuch as both hoppers are substantially identical in structure, description applied to one may equally apply to the other.

The hopper 202, as shown in FIG. 11 of the drawings, is provided with a downwardly inclined bottom portion 212 on which mortar 214 is fed to a bottom outlet opening 216 through which spaced fingers 218 are projected. These fingers 218 project beyond the opening 216 are adapted to be projected between adjacent ends of blocks 174, as shown in FIG. 11, to form a head joint between these blocks. The fingers 218 projecting from their respective hoppers 202 and 204 are movable from a position, as shown in FIG. 8 of the drawings, to a position shown in FIG. 11 of the drawings, by actuation of the cylinder 148, mounted on the platform 146 after it has been slidably moved longitudinally of the rods 142 and 144 by actuation of a pressure fluid cylinder 220. This cylinder 220 is mounted on the frame 136 and is provided with a plunger 222 coupled to the platform 146 and adapted to move it together with the block grasping mechanism 152, into a position wherein opposite edges of the plate 154 are engaged in the channels 198 and 200, hereinbefore described. Thus, the block grasping mechanism 152 and a block carried thereby, is disposed directly over the course of blocks B. Subsequent to operation of the cylinder 220 to move the platform 146 and block grasping mechanism longitudinally of the rods 142 and 144, the cylinder 148 is energized, as will be hereinafter described, and is thus caused to move the block grasping mechanism 152 together with the hoppers 202 and 204 downwardly to the position shown in FIG. 11 wherein the block 174, held by the block grasping mechanism 152 is placed on top of blocks therebelow and the fingers 218 are projected between the block held by the block grasping mechanism 152 and an adjacent block 174. The fingers 218 are then vibrated by means of a vibrator 226 thereby causing the mortar 214 in the hopper 202 to flow downwardly around the fingers 218 and between the adjacent vertical surfaces of the blocks 174, as shown in FIG. 11, thus, very intimately driving and compacting the mortar between the adjacent ends of the blocks 174.

It will be seen that the fingers 218 are connected together and supported in the hopper so that they may readily respond to vibration. The fingers are all supported on a cross member 228 held loosely in the hopper by clips 230. These clips 230 are similar to those shown in FIG. 5 and which will later be described in connection with the other hoppers which vibrate mortar into horizontal position on the tops of blocks before they are covered by blocks subsequently laid on such mortar.

When the vibration of the fingers 218 has been completed and operation of the vibrator 226 is stopped, the cylinder 148 is energized to bring the hoppers and the block grasping mechanism 152 upwardly to a stop position at an elevation shown in FIG. 8 of the drawings whereupon the cylinder 220 may subsequently be energized to force the platform 146 to the left, as shown in FIG. 8 of the drawings, so that the block grasping mechanism 152 is disposed over a block on the conveyor 124 against the stop 184. Subsequently, the cylinder 148 is again energized to force the block grasping mechanism 152 downwardly until the cantilever fingers 170 are inserted into the interior of the cavities 172 in a block 174.

During this time, mortar is laid on an upper surface of a block 174 in one of the courses B, as shown in FIG. 9 of the drawings, preliminary to the placement of a block on such mortar.

The mortar, designated 232, in FIGS. 8 and 9 of the drawings, is dispensed from hoppers 234 and 236 disposed to operate at opposite sides of the courses B of blocks 174.

Reference is hereby made to FIG. 5 of the drawings, wherein the hopper 234 is disclosed. This hopper 234 is movable laterally of the course B of blocks 174, as indicated by broken lines in FIG. 9 of the drawings. And this lateral movement is accomplished by a pressure fluid cylinder 238 and the hopper 236 is movable inwardly toward the course of blocks in a similar manner by a similar cylinder. This cylinder 238 being shown best in FIG. 4 of the drawings, is mounted by means of a bracket 240 on a cross member 242 of the frame 136.

Fixed to the outer side of the hopper 234 are brackets 244 carrying rollers 246 which ride beneath projecting track members 248. These rollers are opposed by slide bars 250 engaging the upper surfaces of the track members 248, and thus the hoppers 234 and 236 are provided with rectilinear bearing guides to move inwardly toward the course B of blocks 174, as indicated best in FIGS. 8 and 9 of the drawings.

Coupled to each slide bar 250 is an understanding plate 252 having a lever 254 pivotally mounted thereto by means of a pin 256. Coupled to the lever 254 by means of a pivot pin 258 is a link 260 which is pivotally connected by means of a pin 262 to a slide rod 264 which is slidably mounted in a bracket 266 connected to one of the guide bearings 210, all as shown best in FIGS. 9 and 10 of the drawings.

Each hopper 234 and 236 is provided with a downwardly diverging cavity in which motar 268 is loaded. The bottom portion, at one inner side of the hopper provides an outlet opening 270 which is disposed to be opened or closed by a vertically sliding gate 272 coupled to the pivots 262 by means of angular brackets 274 shown in FIGS. 3 and 9 of the drawings.

When the block grasping mechanism 152 carrying a block, moves downwardly, toward a course of blocks 174, mortar in the hoppers 234 and 236 is preliminarily vibrated by means of vibrators 276 and 278 coupled to fingers 280 and 282, respectively, disposed internally of each hopper 234 and 236. This causes mortar to flow outwardly through the openings 270 after the cylinders 238 have been actuated to place the opening 270 in alignment with a side of a block 174, as shown in FIG. 9 of the drawings. Thus, vibration of the mortar 268 causes it to flow outwardly into a layer 232, as shown in FIG. 9 of the drawings. This is caused by the vibration of the spaced fingers 280 and 282, the spaced fingers 280 being coupled to a horizontal bar 284 held in an upstanding clip 286. This structure being similarly used to provide clip supports 230 for the fingers 218, hereinbefore described.

Another similar clip 288 is utilized to support a bar 290 interconnecting a plurality of spaced fingers 282.

After the mortar has been dispensed and vibrated into a layer 232 on the upper horizontal surfaces of the blocks 174, shown in FIG. 9 of the drawings, the block grasping mechanism 132 is actuated downwardly, as hereinbefore described, until the lower surface of blocks contact the mortar 232 whereupon the vibration of the fingers by the vibrators 226 and vibration of the hoppers 202 and 204 by means of vibrators 203 and 205, respectively, causes the block to settle down upon the mortar layer 232 to a proper elevation, in accordance with the downward travel limit of the block grasping mechanism, as limited by plunger stroke of the pressure fluid cylinder 148. During downward movement of the bearing members 210 supporting the hoppers 202 and 204, the clip 230 slides downwardly over the rod 264 and engages an end portion 265 of the lever 254 for forcing the link 260 downwardly and forcing the lever 254 to pivot about the axis of the pin 256. Thus, the angle brackets 274, together with the shut off gates 272, are moved downwardly, causing the lower edge 273 thereof to shut off the opening 270 and stop dispensation of mortar from each of the hoppers 234 and 236. Thus, flow of mortar is stopped and shut off with respect to the outlets 270 of the hoppers 234 and 236 before the block handled by the grasping mechanism 152 reaches the layer of mortar 232. Concurrently, the pressure fluid cylinders 238 are energized to retract the hoppers 234 and 236 away from opposite sides of the blocks 174 so that the block progressing downwardly on the block grasping mechanism 152 may clearly pass between the hoppers and may accurately be seated and laid on top of the mortar 232, as hereinbefore described. Thus, each block is laid on the mortar 232 and is provided with a head joint, as hereinbefore described and disclosed in FIG. 11.

As shown in FIG. 7 of the drawings, the hopper 234 is coupled to a cross member 294 having an upstanding stop member 296 engageable with an adjustable screw 298 to control the outward movement of the hopper 234 in a direction of an arrow 235 when actuated by the pressure fluid cylinder 238. Comparable stop means is provided for the hopper 236.

It will be understood that when the carriage frame 136 is moving in one direction longitudinally of the conveyor 124, that one of the hoppers 202 or 204 is utilized to provide head joints and that when moved in the opposite direction, the other of the hoppers 202 or 204 is utilized to provide the head joints. As for example, when the block handling carriage is moving in a direction of the arrow 213, in FIG. 11, the hopper 202 is utilized to provide head joints between the blocks, since it immediately follows the block being concurrently laid. When the block handling carriage moves in the opposite direction of the arrow 213, the mortar dispensing hopper 204 is utilized to provide head joints, since it is the one which follows blocks being immediately laid by the block grasping mechanism 152.

It will thus be appreciated that the block handling carriage 134 when moving in one direction longitudinally of the conveyor 124, lays blocks in one course and then the machine rises, as will be hereinafter described, to elevate the main carriage and the block handling carriage so that when the block handling carriage moves backwardly in the opposite direction, it lays another course of blocks 174.

Mounted on the block handling carriage frame 134 is a motor 300, as shown best in FIGS. 4, 8, 17 and 18. This motor 300 is adapted to move the block handling carriage 134 longitudinally of the tracks 126, 128 and 131. These tracks being traversed by rollers 130, 132, and 129, respectively.

The motor 300 is provided with a reduction gear box 302 having an output shaft 304 to which is fixed a crank arm 306. This crank arm 306 is provided with a roller 308 mounted on a pin 310 fixed to the end of the arm 306. The arm is disposed to swing about the rotational axis of the shaft 304 and the roller 308 is thus disposed to pass between spaced upwardly extending index plates 312, said roller 308 being disposed to pass between adjacent edges 314 of these plates, all as shown best in FIGS. 17, 18, 19, 20 and 24. It will be seen that the distance between the axis of the shaft 304 and the axis of the roller 308 equals, approximately, one-half the length of each concrete block 174, that is to say, that the mortar between the blocks must be considered, thus, the radius, hereinbefore mentioned, equals one-half the modular length of the blocks 174, when laid in a wall with mortar therebetween. Thus, as the motor 300 operates the shaft 304, shown best in FIG. 19, the roller 308 swings from a position between adjacent upstanding index members 312 and bypasses two of the upstanding members 312 to pass into another space between adjacent upstanding index members. It will be seen, from FIG. 19 of the drawings, that the axis of the shaft 304 may be disposed between adjacent index members 312 while the roller 308 traverses opposite edges of adjacent upstanding members 312, thus each cycle of operation of the shaft 304 tractively moves the block handling carriage 134 a distance equal to the modulator length of each concrete block 174. As for example, the roller 308, during a complete revolution of the shaft 304, may, in 180 degrees of shaft rotation, pass from a location 315 to a location 316 and during the next 180 degrees of travel, will pass from the location 316 to a location 320 thus moving the shaft 304 a distance designated 318.

Suitable limit switches, actuated by the movement of the roller 308, control each operating cycle of the shaft 304, this being done by means of circuitry coupled to to the motor 300 and an electric brake thereof. Thus, the roller 308, as hereinbefore described, may precisely travel through a 360 degree cycle from the position 314 to the position 320, and will be precisely stopped by electrical control means in connection with the motor 300, as will be hereinafter described in detail.

It will be seen that since the roller 308 has a diameter equal to the distance between adjacent edges 314 of the index members 312 that movement of the block handling carriage 134 may be very precisely controlled and that coasting thereof will effectively be prevented.

It will be seen, however, that the arm 316, when rotated about the axis of the shaft 304, projects the roller 308 downwardly between the edges 314 during each revolution of the shaft 304, this being indicated by solid and broken lines in FIG. 19 of the drawings. While the roller 308 travels in a circular path around the axis of the shaft 304, the carriage 134 moves longitudinally of the main carriage and relative to the upstanding index members 312.

Referring to FIG. 20a, it will be seen that blocks may be laid in overlapping relationship to each other whereby adjacent ends of the blocks of one course may be located above an intermediate portion of adjacent ends of blocks 174 immediately below the upper course. In order, automatically, to accomplish this, the arm 306 and the roller 308, as hereinbefore described, may reach the last upstanding index member 312 adjacent to an end of the concrete block wall being laid and at the end of each wall, alternate full blocks and half blocks are laid to make the blocks come out even at the end of the wall. As shown in FIG. 20a, a half block, designated 175, is provided with an end 176 which is flush with an adjacent end of an immediately superimposed full block 174. In order to accommodate alternate spacing and overlapping relationship of adjacent superimposed courses of blocks, the indexing mechanism, shown in FIGS. 19 and 20, automatically accomplishes an indexing of the block handling carriage 134 at each opposite end of a block wall being laid, and at each opposite end of the row of upstanding members 312. This is accomplished, as shown in FIG. 20 of the drawings. The indexing member 312, designated 324 in FIG. 20, is the last indexing member 312 at the left end of a supporting bar on which all of the indexing members 312 are fixed. Assuming that the roller 308 starts at a position 328 and moves in a direction of an arrow 330, it does not contact an index member 312 until it reaches a position 332 at which time it passes between adjacent index members 312 and downwardly to a stop position 334 to complete one cycle of revolution about the axis of the shaft 304. In this cycle of operation, the roller 308 does not push against an indexing member 312 for half of the rotating cycle of the shaft 304 and thus, the block handling carriage 134 moves only half the modular length of one of the blocks 174 or a modular length equal to a half block 175, as shown in FIG. 20a. By contrast, the roller 308, when operating in a normal manner, as shown in FIG. 19, pushes against one of the indexing members 312 for the first half of the cycle of rotation of the shaft 304 and then passes downwardly between another pair of indexing members 312 and pushes against them for the other half of the rotating cycle so that the roller 308 provides traction during its rise and fall, as shown in FIG. 19 of the drawings, and only provides forward traction for its downward or fall motion as shown in FIG. 20, when accommodating movement of the carriage 134 in relationship to the laying of the half block 175 at the end 336 of a concrete block wall shown in FIG. 20a.

The modified indexing structure shown in FIG. 21 of the drawings, is adapted, automatically, to index the block handling carriage 134 in a manner so that it will lay concrete blocks as shown in FIG. 21a of the drawings, said blocks having adjacent ends of each and all of the vertically superimposed courses in vertical alignment with each other. The machine automatically accomplishes this function by means of sliding mechanism provided to support the bar 326 on the machine. As shown in FIGS. 22 and 23 of the drawings, the bar 326 is supported on slide bars 338 having dovetail cross section and bolts 340 extend into the bar 326 and into a slot 342 in the bar 338 in order to form longitudinal slide stops at the ends of the slots 342, limiting slidable movement of the bar 326 longitudinally of the main carriage for a distance 342 which is half the modular length of the blocks 174. Thus, in the modification shown in FIGS. 21, 22 and 23, the bar 326 is slidably mounted on the main carriage 71 by rigidly mounting the bars 338 and permitting the bar 326 to move longitudinally thereof within the limits of the length of the slot 342 as determined by the bolt 340 which traverses this slot and reaches opposite ends thereof, alternately.

In operation, the roller 308, during each cycle of operation, moves the block handling carriage 134 a distance equal to the modular length of the one of the blocks 174 in a similar manner as hereinbefore described in FIG. 19. When the roller 308 reaches the last upstanding member 312 and is caused then to rotate in the opposite direction, starting a new cycle of the carriage 134 in the opposite direction, the roller contacts one of the upstanding members 312 and slides the bar 326 longitudinally of the main carriage 71 corresponding to the length 343 of the slot 342, thus the bar 326 is reset each time the carriage reaches an opposite ends of the block wall being laid thus alleviating the necessity for the half blocks 175, as shown in FIG. 20a, and permitting all of the blocks 174, at their adjacent mortared ends to be in vertical alignment with each other, as shown in FIG. 21a.

The limit switches and electrical equipment utilized to reverse operation of the block handling carriage 134 as it reaches opposite ends of the main carriage 71 or stops thereon will be hereinafter described in detail. However, with respect to the longitudinal indexing mechanism provided by the upstanding members 312, it will be understood that traction of the block handling carriage 134 will effectively move the bar 326 and the upstanding members 312 each time the block handling carriage 134 is automatically caused to reverse its movement longitudinally of the main carriage 71 for establishing an end position of a concrete block wall being formed.

Vertical indexing of the main carriage 71 and the block handling carriage 134 relative to vertically superimposed courses of concrete blocks being laid by the machine is illustrated in FIGS. 1, 24, 25, 26, 27 and 28. This mechanism comprises a pair of bars 346 and 348 which are substantially vertically disposed and secured to the upstanding members 64 and 66 of the main frame shown in FIG. 1 of the drawings. These bars 346 and 348 are each provided with vertically spaced buttress teeth having horizontal ledge portions 350 which are spaced apart a distance equal to the vertical modular distance between courses of vertically superimposed concrete blocks in a concrete block wall, such as shown in FIGS. 20a and 21a, it being understood that the vertical modulus includes the thickness of a layer of mortar for each vertically disposed or superimposed course of blocks.

Directly below each horizontal ledge of each buttress tooth portion is an inclined tooth portion 352 which facilitates upward travel of a spring loaded latch roller 354 which is mounted near opposite ends on the main carriage 71, these rollers 354 each being carried by a shank 356 rigidly mounted on the main carriage 71. The shank 356 having an arm or plunger 358 slidably mounted in a bore 360 thereof and provided with a key 362 to prevent rotation of the arm 358 to maintain the roller 354 in a plane of the buttress teeth portions and to ride up on the inclined portions 352 and ultimately to rest on the horizontal ledge portions 350. A spring 364 urges each roller 354 outwardly and positively into engagement with the buttress teeth portions 352 so that as the main carriage 71 is raised upwardly, as hereinbefore described, by means of the motor 118, that the rollers 354 will rest upon one of the horizontal ledge portions 350. Thus, each opposite end of the carriage 71 is supported corresponding to the laying of a superimposed course of concrete blocks.

Limit switch means for momentarily energizing the motor 118 for moving the main carriage 71 upwardly in increments equal to the spacing of the ledge portions 350 of the buttress teeth, will be hereinafter described in detail.

Each roller 354 is provided with an extending trunnion portion 366 which may be engaged by a notch portion 368 in a lever 370 pivoted on a pin 372. The notch 368 being so located as to hold the roller 354 in retracted position and out of interference with the horizontal ledge portions 350 thereby permitting the machine to travel from an uppermost position down to a lowermost position for the beginning of another block laying operation to produce another wall or panel. Thus, the latches 370 are utilized to permit lowering of the main carriage 71 without interference of the rollers 354 and the horizontal ledge portions 350.

As hereinbefore described, the feeding conveyor 185 receives concrete blocks from a conveyor 196 which is disposed at substantially right angles thereto, as shown best in FIG. 30. This conveyor 196 operates at substantially right angles to the feeding conveyor 185 and the conveyor 196 is disposed thereabove and is provided with a precipice end portion 372 disposed above the conveyor 185 so that concrete blocks 195 may be tumbled onto the conveyor 185. The upper surface of the conveyor 185 is soft and the elevation of the conveyor 196 provides a convenient right angle transition between these conveyors for properly loading blocks from the conveyor 196 to the conveyor 185 without lateral friction or lateral sliding of the blocks 174, as they pass from the conveyor 196 to the conveyor 185. This conveyor 196 is provided with a pivotal mounting shaft 374, this shaft being cantilevered and held by fixtures 376 and 378 to a frame member 380 of the main carriage 71. Thus, the axis 374 of the conveyor 196 moves upwardly and downwardly with the main carriage 71. The opposite end of the conveyor 196, as shown in FIG. 32 is pivotally mounted on an axle 382 carried by a truck 384. The truck 384 also mounts another short endless conveyor 386 in alignment with the conveyor 196 so that blocks may be placed on the conveyor 386 carried by the truck 384 mounted on tracks 388 which are parallel to the tracks on which the rollers 54 of the main frame operate.

Thus, the truck 384 travels with and parallel to the movement of the main frame 50 and the conveyor 196 is inclined in varying degrees, according to the elevation of the main carriage 71 and relative to the concrete floor 60 on which the track 388 is laid.

The truck 384 carries the conveyor 386 and a motor 390 by means of a belt 392, drives a pulley 394 on a shaft 396 of the conveyor 386 and a drive belt 398 interconnects pulleys carried on the shafts 396 and 382 so that the conveyor 196 is concurrently driven with the conveyor 386 by means of a motor 390.

Concrete blocks 174 are placed with their longitudinal axis laterally of the conveyors 386 and 196 so that when the blocks 174 are dumped off the precipice end 372 of the conveyor 196, the longitudinal axis of each block 174 is directed longitudinally of the drive conveyor 185 and the roller conveyor 124 which receives blocks therefrom.

In the modification of the invention as shown in FIGS. 12, 13, 14, 15 and 16, the main carriage frame 71 is similar to that hereinbefore described and a block handling carriage 400 is similar to the hereinbefore described block handling carriage 134.

Rollers 129, 130 and 132 support the block handling carriage 400 in a similar manner to the support of the block handling carriage 134, hereinbefore described. Thus, the block handling carriage 400 is mounted to move longitudinally of the main carriage frame 71.

The block handling carriage 400 is provided with a frame 402 which is modified slightly as compared to the frame 136, hereinbefore described, as will be hereinafter set forth.

It will be seen that FIG. 16 of the drawings, disclosing the modified structure, is taken from the opposite direction as FIG. 8 previously described and which shows similar component structure of the machine.

Mounted, stationarily, in the block handling carriage frame 402 are rods 404 and 406 on which bearings 408 and 410 are slidably mounted.

Carried by these bearings 408 and 410 is a platform 412 on which is mounted a hydraulic cylinder 414 having a substantially vertical axis and a downwardly extending plunger 416 which supports a block grasping mechanism 418 similar to that disclosed in FIG. 6 but slightly modified to grasp blocks externally, rather than internally of cavities therein.

The block grasping mechanism 418 is provided with a plate 420 carried by the lower end of the plunger 416 of the hydraulic cylinder 414.

Secured to the plate 420 and extending downwardly thereof is a clip 422 adapted to engage an outer side 424 of a concrete block 174.

A downwardly extending clip 426 extending downwardly from the plate 420 is disposed to be positioned adjacent an opposite side 428 of a concrete block 174 and supported on this clip 426 is a small pressure fluid cylinder 430 having a plunger 432 disposed to engage said opposite side 428 of the block 424.

When the pressure fluid cylinder 430 is energized to project the plunger 432 thereof outwardly, it clamps the block 174 between it and the clip 422. Thus, holding the block 174 to raise it off the roller conveyor 124.

A hydraulic cylinder 434 is mounted on an extending portion 436 of the frame 402 and is provided with a plunger 438 having its one end secured to the platform 412 by means of a clip 440, shown best in FIG. 15 of the drawings.

Thus, the pressure fluid cylinder 434 is disposed to actuate the platform 412 longitudinally of the rods 404 and 406 to move the platform, pressure fluid cylinder 414 and the block grasping mechanism 418 from a position over the conveyor 124 to a position over a concrete block wall B being formed by the machine of the invention.

Connected to the platform 412 are straps 442 and 444 and these straps extend laterally toward the end 436 of the frame 402. Bolts 446 and 448 connect the straps to a mortar dispenser carriage 450 which is provided with a pair of slide bearings 452 and 454 slidably mounted on the rods 406 and 404, respectively. Thus, the straps 442 and 444 rigidly interconnect platform 412 and the mortar hopper carriage 450. Accordingly, when the platform 412 is actuated, slidably, longitudinally of the rods 404 and 406, the mortar hopper carriage 450 is also slidably moved longitudinally of the rods 404 and 406. The block grasping mechanism 418 is thus spaced a distance from the mortar hopper carriage 450, equal to the distance between the conveyor 124 and the block wall B, being formed by the machine.

When the block grasping mechanisms 418 is disposed over the conveyor 124, in order to pick up a block 174 therefrom, the mortar hopper carriage 450 is disposed directly over the block wall B, being formed.

When the block grasping mechanism 418 is moved to a position over the wall B to seat a block thereon, the mortar hopper carriage 450 is moved to a position adjacent the end 436 of the frame 402, all as will be hereinafter described in detail.

A box-shaped mortar hopper 456 is suspended from the bearing members 452 and 454 and is adapted to receive low slump mortar ultimately to deposit this mortar on the tops of blocks in the wall B for mortaring them together, progressively, as will be hereinafter described in detail.

The hopper 456 is suspended by brackets 458 and 460 connected to plunger shafts 462 and 464 of pressure fluid cylinders 466 supported in brackets 468 fixed to the lower portions of the slide bearing members 452 and 454. The pressure fluid cylinders 466 are thus energizable to retract their plungers 462 and 464 to elevate the hopper 456 or may extend their plungers to lower the hopper 456. This elevating movement is only slight, as will be hereinafter described for the purpose of clearing a layer of mortar placed on one of the blocks 174 in the wall B being formed as shown best in FIG. 16 of the drawings.

Inasmuch as the hopper 456 is suspended, as hereinbefore described, from the slide bearings 452 and 454, it is movable longitudinally of the rods 404 and 406 outwardly into a position below a mortar receiving hopper 470, utilized for filling the hopper 456, as will be hereinafter described.

This hopper 456 is provided with an open bottom 472 wherein plates 474 and 476 are suspended by means of stems 478 and 480 connected to cross bars 482 and 484, respectively, which extend to and are in connection with opposite sides 486 and 488 of the hopper 456. The plates 474 and 476 are disposed to be placed over corresponding vertical openings in concrete blocks, as shown best in FIG. 15 of the drawings, when mortar is dispensed vertically and downwardly through the bottom of the hopper 456.

It will be understood by those skilled in the art that the hopper 456 is adapted to handle low slump concrete mortar and that the open bottom portions 472 surrounding the plates 474 and 476, are bridged by a movable cut-off bar assembly 490 composed of a plurality of spaced bars carried by end bars 492 and 494. Thus, the bars 490 are secured at their opposite ends to the bars 492 and 494 by welding or otherwise and are maintained in a fixed assembly.

The bar 492 is pivotally connected by means of pins 496 and 498 with levers 500 and 502 which are in turn pivoted at their upper ends to the hopper 456 by means of pins 504 and 506. A pressure fluid cylinder 508 is mounted on the side 488 of the hopper 456 and is provided with a plunger pivotally connected to the lever 502 by means of a pin 510. Thus, the entire assembly of spaced bars 490 constitutes a foraminous means which is movable laterally of these bars 490 by means of the pressure fluid cylinder 508 and the levers 500 and 502 coupled to the bars 492 co-ordinate movement of the bars 492 and 494 and all of the bars 490 directly below the lower open portion 472 of the hopper 456. Thus, low slump mortar is normally retained in the hopper 456 above the bars 490 and is fed downwardly through the open portions 472 of the hopper 456 by means of vibrators 512, 514, 516 and 518 connected to the sides 486 and 488 of the hopper 456. These vibrators are momentarily energized, as will be hereinafter described, following which the pressure fluid cylinder 508 is energized to move the bars 490 back and forth under the hopper to cut off a layer of mortar deposited directly on top of a concrete block.

Accordingly, reference is made to FIG. 14 wherein the bars 492 and 494 are connected to the bars 490 which are disposed directly below the open portions 472 of the hopper 456. In operation of this hopper mechanism, the mortar is first vibrated down onto the upper surface of the block 174 around the plates 474 and 476 onto the upper surfaces of the blocks 174, the mortar is caused to flow by the operation of the vibrators 512, 514, 516 and 518 and to become intimately coupled to the upper surface of the block 174. After the motors have been de-energized, the hopper 456 together with the bars 490 may be raised upward slightly by operation of the pressure fluid cylinders 466 whereupon the pressure fluid cylinder 508 may later be energized to swing the levers 500 and 502 and cause cut off movement of the bars 490 in spaced relation with the upper surface 175 of the block 174 thereby leaving a smooth cut off layer of mortar disassociated from the mortar remaining in the hopper 456. It will be appreciated that the low slump mortar hangs in the hopper 456 when the vibrators 512, 514, 516 and 518 are shut off.

It will be appreciated that the block grasping mechanism 418 is provided with a plate 419 which is similar to the plate 154 hereinbefore described in connection with the mechanism shown in FIGS. 6 and 8 of the drawings. Opposite edges of the plate 419 engage channel slots 421 shown in FIG. 16 of the drawings, and these correspond with the slots 198 hereinbefore described and disclosed in connection with FIGS. 8 and 11 of the drawings, whereby the plate 419 may be coupled to head joint mortar dispensing hoppers 520 and 522 which are similar to the hereinbefore described hoppers 202 and 204 shown in FIG. 4 of the drawings. The operating details of the hoppers 520 and 522 are similar to the operation of the hoppers 202 and 204, particularly as shown in FIG. 11 wherein the mortar vibrating fingers 218 form head joints between adjacent ends of blocks 174. Thus, the hoppers 520 and 522 are equipped, mechanically, in the same manner as the hoppers 202 and 204 and are vertically, slidably mounted in a unitary assembly by means of vertical rods 524 on which slide bearings 526 are vertically, slidably mounted. These slide bearings 526 are similar to the slide bearings 210, hereinbefore described and shown in FIGS. 8 and 10 of the drawings. Thus, when the plate 419 of the block grasping mechanism 418 moves at its opposite edges into the slots 421, the cylinder 414, when actuated, will move the head joint mortar dispensing hoppers 520 and 522 downwardly into a position, as shown in FIG. 11 of the drawings.

It will be appreciated that while the block grasping mechanism 418 moves into a position over the wall B, that the mortar hopper 456 moves under the receiving hopper 470 to be filled and that when the block grasping mechanism picks up a block from the conveyor 124 that the hopper 456 is in position concurrently to lay mortar on a block 174 so that a block carried by the block grasping mechanism may be set on the mortar immediately and previously laid by the hopper 456, as hereinbefore described.

Vibrators 528 mounted on the upper surface of the plate 419 are disposed to vibrate the respective block held by the block grasping mechanism 418 onto the mortar previously laid by the hopper 456 so that a complete and solid bed joint may be accomplished while the fingers 218 and one of the hoppers 520 or 522 is placing a head joint between adjacent ends of blocks, all as hereinbefore described.

As the block handling carriage moves longitudinally of the wall B, wire fingers 530 and 532, at opposite sides of the wall B, scrape mortar away from the sides of the mortar joints in order to leave neat, horizontal mortar joints between the blocks. Additionally, these wire fingers 530 and 532 also scrape away excess mortar from the head joint areas extending vertically between adjacent ends of the blocks. The wires 530 and 532 are resilient members, preferably made of piano wire or the like, and are fixed in bushings 534 and 536 carried by the frame 402.

As shown in FIG. 35, a modified excess mortar removal device operates vacuumatically to remove mortar from horizontal and vertical joints at opposite sides 538 and 540 of a concrete wall B being formed of the concrete blocks and mortar by the machine of the invention. This vacuumatic excess mortar removal device comprises a pair of conduit structures 542 and 544. These structures are box-shaped and, as shown in FIG. 36, are provided with an open skirt portion 546 inwardly of which air is forced to flow under vacuum drawn on a communicating conduit 548. It will be seen that a pair of these structures 542 and 544 is disposed on each side of the block wall B so that a skirt opening 546 is disposed to receive air flow from the atmosphere when the machine is traversing the wall B in a direction of an arrow 550 while a skirt opening 552 is utilized to receive air and carry away mortar from the sides of the block when the machine is traversing the wall in the direction of the arrow 554.

Communicating with each conduit structure 542 or 544 is a flexible conduit 548 which communicates with a tank 556 into which mortar gravitates to a lower portion 558 thereof.

Vacuum is drawn in the tank 556 through a screen 560 in the upper portion thereof communicating with a conduit 562 which is coupled with the intake of a vacuum pump 564.

As pieces of mortar are picked up by air flowing through the openings 546 and 552, the mortar is drawn, by the high velocity air, through the conduits 548 and dropped into the bottom of the tank 556. The mortar, thus dropped in the bottom 558 of the tank 556, is carried by an air lock lead screw 566 longitudinally of a lead screw casing 568 to a mortar outlet conduit 570 from which the mortar may be returned to a mixer so that it may be reused by delivery into the mortar handling hoppers of the machine, as hereinbefore described.

The screw conveyor 566 is provided with a shaft 572 operable by any suitable motor driving a belt 574 engaging a pulley 576 fixed on the shaft 572.

The operation of the brick laying machine of the present invention is substantially as follows.

Sequential operation of the machine is controlled by a conventional stepper switch 630 which is energized from one position to the next throughout a complete cycle of operation of the machine. This stepper switch 630 is a conventional switch having various switching positions operated in sequence, as will be hereinafter described, and the switch 630 is provided with an interrupter contact mechanism 632 adapted to make contact progressively and in sequence with positions 1 to 12, as shown in FIG. 38 of the drawings, and as hereinafter described. This stepping switch is such that when it has progressed from position 1 to position 12, it returns to position 1 and goes through another cycle of operation.

When the stepper switch 630 is in the position 1, as shown in FIG. 38 of the drawings, it initiates a cycle of operation of the machine of the invention.

For purposes of an example of a cycle of operation, attention is directed to the drawings generally disclosing the machine and specifically including details shown in FIGS. 12, 13, 14, 15 and 16.

When the stepper switch 630 is energized in position 1, the block grasping mechanism 418 is held in a downward position adjacent the conveyor 124 by means of the plunger 416 of the pressure fluid cylinder 148. Thus, the block grasper mechanism 418 is held adjacent the conveyor 124 in position to pick up a concrete block therefrom. Concurrently, time delay 592 is energized which energizes the cutter bars 490 to move a final stroke, as will be hereinafter described in detail.

Operation of the pressure fluid cylinder 148 is accomplished through a solenoid valve 596 while operation of the pressure fluid cylinder 508 is accomplished through a solenoid valve 610, all as shown best in FIG. 35.

As the plunger 416 of the pressure fluid cylinder 148 moves the block grasping mechanism 418 downwardly, an end 579 of a bar on the plate 419 moves away from a roller arm on limit switch 578 which energizes the stepper switch 630 to position 2, as shown in FIG. 38 of the drawings.

In position 2, the stepper switch energizes pressure fluid cylinders 420 through solenoid valves 598 and 600 to project the plunger 432 against a block 174 on the conveyor 124. In this position, the pressure fluid cylinder 148 is energized in an opposite direction, through the solenoid valve 96, to lift the plunger 416 and raise the block grasper mechanism 418 upwardly.

During this operation, the hopper 456 is also moved upwardly due to energization of the pressure fluid cylinders 466 through solenoid valves 611. Additionally, at this time, the pressure fluid cylinder 508 is energized to a position away from the arm of the switch 594, as shown in FIG. 12, by means of the solenoid valve 610 which actuates the plunger of the pressure fluid cylinder 508 in two directions.

As the block grasper mechanism is moved upwardly by the plunger 416 of the pressure fluid cylinder 418, a bar 579 engages an arm of the limit switch 580 which energizes the stepper switch 630 to position 3, as shown in FIG. 38 of the drawings. When the stepper switch 630 is in position 3, the pressure fluid cylinder 434 is energized to retract its plunger 438 and such energization of this cylinder is accomplished through a solenoid valve 602. Retraction of the plunger 438 moves the platform 412 and the block grasper mechanism 418 to a position over the wall B, as shown in FIG. 16, and concurrently moves the hopper 456 to a position beneath the hopper 470, as shown in FIG. 16. When the block grasper mechanism 418 arrives at a position over the wall B, LS 582 is contacted by a bar 583 projecting upwardly from the platform 412 which energizes the stepper switch 630 to position 4 wherein the pressure fluid cylinder 148 is energized through the solenoid valve 596 to move the block grasper mechanism downwardly into a position to carry a block 174 and place it on mortar previously laid on the upper surface of a block in the wall B. As the block grasper mechanism moves downwardly limit switch 584 is contacted which starts operation of a time delay switch 586 and whereby the vibrators 203 and 205 are concurrently set in operation to feed mortar downwardly from the hoppers 520 and 522 in a manner previously described in connection with FIG. 11 of the drawings. It will be understood that the vibrators 203 and 205 are energized through solenoid valves 604 and 606, as shown in FIG. 35 of the drawings.

During operation of the head joint vibrators 203 and 205, the vibrators 528 are also energized in order to vibrate the block grasping mechanism so that the block 174 is vibrated down onto mortar previously laid on the upper surface of a next lower block and concurrently, the head joint vibrators 226 in connection with the fingers 218 and the hopper vibrators 203 and 205 are energized so that the mortar will be fed between the head joints, as shown in FIG. 11, and so that the mortar will be vibrated below the block 174 being seated. In position 4, time delay 586 is energized and this times the operation of the aforementioned vibrators so that mortar is efficiently vibrated for a period of time necessary to make an intimate mortar joint at the bed and at one head end of the block being laid.

When the circuit of the time delay switch 586 automatically opens, the stepper switch 630 is energized to position 5.

With the stepper switch 630 in position 5, the pressure fluid cylinder 430 of the block grasper mechanism 418 is de-energized by means of the solenoid valve 598. This releases the block to leave it mortared to the wall B and at the same time, the fluid pressure cylinder 148 is energized through the solenoid valve 596 which raises the block grasping mechanism together with the hoppers 520 and 522. When the hoppers 522 have been raised to the position shown in FIG. 16, a hook member 451 engages the plate 421 coupled with the bearing members 452.

This hook 451 is pivoted at 453 on the frame 400 and thus holds the hoppers 520 and 522 in position to again register with the plate 419 at the slotted portions 421. As the block grasping mechanism is raised upwardly from the wall B, limit switch 580 is contacted by arm 579 which is supported on the platform 412. Operation of the switch 580 energizes the stepper switch 630 to position 6 which energizes the horizontal index motor 300, as hereinbefore described whereby the index motor 300 moves the block handling carriage of the machine longitudinally of the conveyor 124 by engaging the roller 308 with upstanding members 312 of the indexing mechanism, hereinbefore described.

As the arm 306 completes a 360 degree cycle of operation, a plate 307 connected therewith contacts a limit switch 588 at its projecting arm 589 and actuation of this switch 588 energizes the stepper switch 630 to position 7, 8 and 9 in which a brake on the motor 300 is applied precisely to stop operation thereof and precisely to locate the block handling carriage in a desired position longitudinally of the conveyor and to dispose the carriage in position to place another block end to end adjacent the last placed block in the wall B.

During this interim, the cylinder 434 has been energized through closing of the switch 580 to move the block grasping mechanism to a position over the conveyor 124 and when limit switch 588 is contacted, as hereinbefore described, by the arm quadrant 307. The stepper switch is energized through positions 7 and 8 and moved to position 9 wherein the electric brake to the motor 300 is applied to stop the block handling carriage precisely in position so that the block grasping mechanism may pick up another block from the conveyor 124. Additionally, the mortar hopper 456 is then moved over into position above the wall B and is ready to lay another layer of mortar on top of the uppermost blocks.

At this time, the pressure fluid cylinders 466 and 467 move the mortar hopper 456 downwardly to a position closely adjacent the upper block in the wall B and the vibrators 512, 514, 516 and 518 are energized through the solenoid valve 608 to vibrate mortar downwardly onto the upper surface of the uppermost block in the wall B. Subsequently, energization of the cylinders 466 and 467 raise the hopper 456 slightly and the cutter bar mechanism, including the bars 490, are energized to swing back and forth in couple with the time delay 592 which times the vibration and also times operation of the cutter bar mechanism as it swings back and forth into contact with the switch 594, as hereinbefore described. Thus, the bars 490 cut off mortar above the uppermost block and leaves a neat layer thereof as the box 456 is again raised up by the cylinders 466 and 467. The stepper switch, when in position 11, controls operation of the time delay 592 and the actuation of the cutter bar mechanism, hereinbefore described. In position 11, the stepper switch 630 controls the cutter bar operation movement in one direction until the switch 594 is contacted in the final movement of the cutter bars, as shown in FIG. 12 of the drawings, and contact of this limit switch 594 energizes the stepper switch 630 to position 12. In position 12, the cutter bar actuating cylinder 508 is energized to a position away from the limit switch 594 thereby causing it to open and the machine then proceeds through the foregoing cycle by returning to position 1 and proceeding as hereinbefore described.

The feed conveyor 185, as hereinbefore described, operates in response to the opening of switches 190 and 192 which cause energization of the motor 187 and this is in response to blocks 174 which contact the limit switches 190 and 192. Thus, if the blocks are on the conveyor 124 and hold the switches 190 and 192 in contact, the motor 187 will not operate. However, when the conveyor 124 does not contain blocks adjacent the switches 190 and 192, the motor 187 will automatically start operation of the conveyor 185 to move blocks onto the conveyor 124.

The conveyor 196, driven by the motor 390, is also switch controlled and the operation of the motor 390 is dependent upon a closed circuit of the switch 194 which is provided with a lever 195 which is adapted to be contacted by blocks on the conveyor 185 which are dumped from the conveyor 196. Thus, when there are blocks on the conveyor 185 and also blocks on the conveyor 124, the motor 390 is stopped since the switches 192 and 194 are in series with each other and thus control operation of the motor 390. However, when the switches 190 and 192 are open, the switch 195 will not stop operation of the motor 390.

In operation of the vertical index mechanism, as shown in FIGS. 24, 25, 26, 27 and 28, a removable clamp plate 353 is disposed to be placed over the ledge portions 350 of a pair of the buttress teeth so that the roller 354 will project its plunger 355 into contact with an arm 357 of a limit switch 359 in circuit with the motor 118 in order, automatically, to limit the overall vertical movement of the main carriage frame when the machine has reached an elevation at which it has completed the overall height of a wall B.

Additionally, it will be understood that the plunger portion 355 contacts the arm 357 to actuate the limit switch 359 each time the roller 354 moves upward to a next adjacent ledge 350. Thus, the motor 118 is automatically de-energized and its brake is set for each vertical index operation of the machine as a vertical movement of the main carriage is accomplished to set the machine in position to lay another superimposed course of blocks on the wall B.

It will be understood that the frame 50 of the machine moves along tracks on a floor and that the truck 384 moves along the tracks 388 parallel to the tracks 58 in which the rollers of the main frame move so that as the machine moves progressively away from the walls of blocks B, as shown in FIG. 2 of the drawings, the truck 384 also moves in the same direction.

As the main carriage of the frame moves upwardly, the conveyor 196 becomes inclined and the truck 384 is free to move in the tracks 388 to accommodate for the vertical movement of the opposite end of the conveyor from that pivoted about the axis of the shaft 382.

As shown in FIGS. 41 and 41a the machine of the present invention and various modifications thereof, as will be hereinafter described, may be operable together with a moving platform whereby the machine may be stationarily mounted and the platform may carry pallets in a direction laterally of walls being formed by blocks automatically laid by the machine of the invention.

The machine generally designated 640 as shown in FIG. 41 may be stationarily mounted on a floor 642 or any other suitable base. Thus frame uprights 64 and 66 as shown in FIG. 1 of the drawings may be fixedly mounted on the floor or base 642, and the frame brace members 62 may then be omitted together with the frame members 50 and 52. Thus, according to the modification as shown in FIG. 41, only the upright members 64 or 66, or their equivalent, may be required to support the machine of the invention, and when the main carriage of the invention is elevated upon the uprights 64 and 66 the block laying mechanism of the machine may be disposed at an elevation above the elevation of the walls B being produced by the machine so that a pallet carriage 644 carrying wall supporting pallets 646 may be moved between the uprights 64 and 66 permitting the machine to be stationarily mounted and permitting it to produce concrete block walls on the pallets 646, which may subsequently be moved back and forth relative to the uprights 64 and 66, as will be hereinafter described.

The pallet carriage 644 comprises a pair of spaced members 648 and 650 interconnected by the pallets 646 which are preferably inverted channels welded to the members 648 and 650. These pallets 646 are slightly narrower than the thickness of the walls B produced of concrete blocks so that excess mortar may fall away from the sides of the walls and clear the pallets 646.

The pallet carriage members 648 and 650 are provided with track portions 652 and 654 at their lower sides which travel on stationary rollers 656 and 658, respectively. These rollers are mounted on the floor 642. These rollers are rotatable about pins or axles 660 and 662, respectively. These pins 660 and 662 are mounted in forks 664 and 666, respectively. Thus, the pallet carriage 644 is movable on the floor 642 between the uprights 64 and 66 of the machine 640.

It will be understood that the forks 664 and 666 may be mounted on individual foundations or may be mounted on the floor 642, as desired.

Mounted on the ground or on the floor 642 is a steam curing room 668 into which the pallet carriage 644 may be projected on the roller 658. This steam curing room 668 is disposed to contain steam which surrounds the block walls B on the pallets 646 and as the wall B are produced the carriage is moved generally in a direction of an arrow 670 so that as the walls B are produced they are projected into the steam curing room 668 and suitable means may be provided for moving the carriage 644 as desired. As, for example, an indexing means such as the means 308 cooperating with the spaced members 312, as shown in FIG. 1 of the drawings. This means may provide suitable acceleration and deceleration of the pallet carriage 644 as to move the carriage with the walls B thereon at a maximum rate without tipping the walls.

Thus, the pallet carriage 644 is moved into the steam curing room 668 carrying formed concrete block walls B and when the steam curing room 668 is filled with a full day's production of the walls B, the walls after the mortar between the blocks has been cured may be retracted in a direction of an arrow 672 until the wall B first produced the previous day is retracted to a broken line position 674. Thus, the pallet handling carriage 644 is retracted between the uprights 64 and 66 and moved to a position at the opposite side of the machine 640 from the steam curing room 668. At this time the beginning of another production cycle may be initiated by first removing the block wall at the position 674 and causing the pallet carriage to move in the direction of the arrow 670. Thus, one of the pallets 646 may be put into position below the machine 640 so that new concrete block walls B may be formed concurrently with the continued removal of the cured concrete block walls at a position 674 while the carriage intermittently moves in the direction of the arrow 670 back into the steam curing room progressively to carry newly formed concrete block walls thereinto, so that the mortar between the blocks may be cured and hardened. With the machine 640 mounted, as shown in FIG. 1 of the drawings, in a stationary position with relation to the movable pallet carriage 644, it becomes a simple matter to produce a large number of concrete block walls B and to cure them progressively, whereupon the carriage 644 may later be retracted and relieved of the cured concrete block walls while projected backwardly toward the steam curing room 668 and thereby permitting intermittent movement of the carriage during which time walls B are produced and the cured walls at a position 674 or other position may be removed from the respective pallets 646.

The foregoing arrangement shown in FIGS. 41 and 41a applies to the invention hereinbefore disclosed, and also to the machine 640 as modified in accordance with the teachings hereafter set forth, and in accordance with the present modifications of the invention.

In accordance with a modification of the invention, as shown in FIGS. 42, 43, 50 and 51, a block handling carriage 676 is provided with a frame 678. The block handling carriage 676 corresponds with the block handling carriage 134 and is mounted on the main carriage 71 to move longitudinally thereof in a similar manner as hereinbelow described.

The frame 678 is equivalent to the frame 136 hereinbefore described, but is slightly modified to accommodate various changes in the structure, as will be hereinafter described in detail.

Mounted on the frame 678 are a pair of opposed hoppers 680 and 682 which are utilized to dispense mortar into vertical head joints between concrete blocks, as will be hereinafter described. The hopper 680 is operable when the block handling carriage 676 is moved in one direction, and the hopper 682 is operable to dispense mortar when the carriage is moved in the opposite direction.

Inasmuch as the structure of the hoppers 680 and 682 and their connected mortar dispensing equipment and actuating equipment are similar, the structural features attendant to operation of the hopper 680 will be hereinafter described in detail, as follows.

The hpoper 680 is adapted to contain mortar 684 and is provided with a mortar outlet 686 at its lower portion. Projecting through this outlet 686 is an assembly of fingers 688 which are disposed to be projected downwardly between vertically disposed end surfaces 690 and 692 of concrete blocks 694 and 696 which are being mortared together.

The mortar joint between these vertical faces 690 and 692 is commonly known as a head joint.

The fingers 688 are connected to a shank structure 698 internally of the hopper 680 and extending upwardly through the mortar 684.

Coupled to the shank 698 is a vibrator 700 disposed to vibrate the fingers 688, as will be hereinafter described.

As shown in FIG. 47, the fingers 688 are spaced from each other to allow mortar to flow downwardly therebetween out of the outlet 686 of the hopper 680, as will be hereinafter described.

A vibrator 702 is coupled in fixed relation with a lower portion of the hopper 680 to be operable concurrently with the vibrator 700 for feeding mortar 684 outwardly through the outlet opening 686 and between the vertical adjacent faces 690 and 692 of the blocks 694 and 696 shown in FIG. 49 of the drawings.

The hopper 680 at its outlet 686 is provided with a compressable gasket 704, preferably made out of soft rubber or the like, which provides a seal at the upper surfaces of the blocks 694 and 696, and straddling areas about the portions of the block above the vertical faces 690 and 692.

The block handling carriage frame 678 is provided with upper and lower frame members 706 and 707, respectively, interconnected by vertical members 708.

Disposed between the upper members 706, as shown in FIG. 47, is a bar 710 through which a pin 712 extends to connect an actuating cylinder 714 to the frame 678. A plunger 716 of the actuating cylinder 714 is connected to a crossbar 718, which is fixed to slide bearings 720 and 722, secured to the hopper 680. The slide bearings 720 and 722 are slidably mounted on rods 724 and 726, respectively, which are secured between the upper and lower frame members 706 and 707. Thus the actuating cylinder 714 is capable of moving the hopper 680, as shown in FIGS. 48 and 49, upwardly to a position at which lower ends 728 of the fingers 688 are above the upper surfaces of the blocks 694 and 696, and the actuating cylinder 714 is also capable of forcing the hopper 680 downwardly to a position at which the gasket 704 bears against the blocks 694 and 696, and in which position the fingers 688 are disposed between the vertical surfaces 690 and 692 of the blocks, as shown in FIG. 49.

When the fingers 688 are in this position, mortar may be placed between the surfaces 690 and 692.

Outermost fingers 688 at locations 730 and 732, as shown in FIG. 47, are disposed adjacent to sides of the concrete blocks 694 and 696. These sides 734 and 736, respectively, are normally aligned with each other when the mortar 684 is being placed therebetween.

Each one of the fingers 688 in the outermost position 730 and 732 are disposed to contain the mortar 684 and are provided with a V-shaped in cross section side 735 which may serve as a mortar strike structure when vertically moved upwardly with the hopper 680 after the mortar has been placed. The strike side 734 may be curved in cross section, or V-shaped, as desired, and the outer surface 736 of each of the members 730 or 732 may be flat and substantially in flush relationship with the surfaces 734 and 736 at the sides of the blocks 694 and 696.

While only the finger 730 is shown in FIG. 46 of the drawings, it will be obvious to those skilled in the art that the finger 732 will be located adjacent to opposite vertical sides of the concrete blocks which correspond with the vertical sides 734 and 736 shown in FIG. 46 of the drawings. Thus, a finger 730 or 732 will be disposed in position to contain and strike mortar adjacent to opposite sides of the blocks and between the vertically disposed adjacent spaced surfaces 690 and 692.

While the mortar is being placed between the surfaces 690 and 692, a resilient pad 738 is engaged with each respective finger 730 and 732 and overlaps the same, also overlapping the surfaces 690 and 692 in order to provide a seal at the vertical sides 734 and 736, and to seal around the outer flat side 736 of the respective finger 730. The resilient pad 738 may be of rubber or any other suitable seal pad material. This pad 738 is mounted on a substantially rigid plate 740 carried by shaft 742 and actuated by an air or hydraulic cylinder 744 shown in FIG. 43 of the drawings.

Another actuating cylinder 746 is provided with a plunger 748 coupled to a plate 750 carrying a seal pad 752 which is disposed at opposite sides of the blocks 694 and 696 from the pad 738, and this pad 752 is disposed to seal against the finger 732 during the vibration of the fingers 688 and the dispensation of the mortar 684 downwardly to a position between the vertical faces 690 and 692 of the blocks 694 and 696 to provide a head joint therebetween.

It will be appreciated by those skilled in the art that the pads 738 and 752 are forced tightly against the opposite sides of the blocks 694 and 696 previous to the dispensation of mortar as hereinbefore described, but subsequent to the downward movement of the hopper 680 to place the fingers 688 between the vertical faces 690 and 692 of the concrete blocks 694 and 696. After the fingers 688 have been placed as shown in FIG. 49, and when the pads 738 and 752 are firmly engaged with opposite sides of the blocks as shown in FIG. 46, then the vibration and feeding of the mortar 684 may proceed while the pads 738 and the gasket 704 seal the mortar, forming the head joint.

When the mortar has been fed into the space between the blocks and has formed a head joint, the vibration of the fingers 688 and of the hopper 680 is terminated and the hopper 680, together with the fingers 688, are moved vertically whereby the inner surfaces 734 of the fingers located at 730 and 732 precisely strike the mortar adjacent and between opposite vertical surfaces 690 and 692 and at the sides 734 and 736, all as shown best in FIG. 46 of the drawings. Thus as the hopper 680 is retracted vertically, the fingers 688 located at 730 and 732 provide a smooth strike of the mortar at the head joint between the vertical faces 690 and 692 of the blocks 694 and 696.

From the foregoing it will be appreciated that when the mortar 684 is vibrated into position between the vertical faces 690 and 692 of the blocks 694 and 696 that the blocks must be held in alignment and must be held in position to prevent them from shifting away from each other due to compaction of the mortar between the vertical end surfaces 690 and 692. Means for holding the blocks in alignment and preventing spreading thereof during vibration of the mortar therebetween to form a head joint is disclosed in FIGS. 43, 44 and 45. Accordingly, attention is directed to these fingures wherein block clamping cylinders 754, 756, 758 and 760 are mounted on a bar 762 suspended from the lower frame member 707 by plates 764 and 766. The cylinders 754, 756, 758 and 760 are hydraulic or air powered cylinders and are actuated by a control system of the invention which will be hereinafter described in detail.

The first pair of cylinders 754 and 756 are provided with plungers 768 and 770, respectively, and these plungers are connected to a straight bar 772 which is disposed to engage one side 744 of the block 694 which is opposite to the sides 734 thereof. When the plungers 768 and 770 are projected outwardly, the bar 772 at a straight edge 776 thereof engages the sides 774 of the block 694 and forces the block into engagement with a straight edge portion 778 of a stationary bar 780 secured to an angle iron member 782 fixed to the frame 678 at its lower member 707, there being a pair of these members on opposite sides of the frame which straddle a concrete block wall being laid as indicated in FIG. 43.

As the straight edge portion 776 forces the block 694 into engagement with the straight edge portion 778, the block is precisely aligned with the adjacent block 696 which is held in a similar fashion against a straight edge 784 by means of a straight edge bar 786 carried by plungers 788 and 790 of the cylinders 758 and 760. These bars 772 and 786 are independent of the seal pad 738 actuated by the cylinder 744 hereinbefore described. It will be appreciated that the pair of cylinders 754 and 756 hold the block 694 in alignment and prevent longitudinal movement thereof relative the block 696 and the cylinders 758 and 760 cooperating with the straight edge 784 hold the block 696 in alignment and prevent it from moving longitudinally away from block 694 when mortar is placed between the adjacent faces 690 and 692 of these blocks.

Similar block clamping and aligning mechanism as well as mortar joint sealing mechanism is disposed under the hopper 682. It will be seen that a pair of cylinders 792 and 794 below the hopper 682 may be connected to one bar similar to the straight edge bar 772 and that another pair of cylinders 796 and 798 may be connected to another bar similar to the straight edge bar 786 and that these cylinders below the hopper 682 projecting their straight edge bars may cause cooperation with bars similar to the fixed bars 780 and 784 as hereinbefore described in connection with the mechanism directly below the hopper 680. Additionally, a seal clamp cylinder 800 shown below the hopper 682 may correspond with one of the seal clamp cylinders 744 or 746 hereinbefore described which actuate the seal pads 738 and 752, respectively.

It will be seen that the hopper 682 is provided with fingers 802 similar to the fingers 688 which are disposed to be inserted between adjacent ends of concrete blocks for inserting mortar therebetween.

It will be noted that the fingers 688 and 802 are spaced apart a distance substantially equal to the length of three concrete blocks to be laid by the machine. Accordingly, this spacing permits the machine to lay blocks when the carriage 676 is moving in either of two directions, longitudinally of the wall being formed by concrete blocks laid therein. The spacing of the fingers 688 and 802 a distance equalling at least three blocks permits the machine to move in one direction while laying blocks and allows the fingers 688 or 802 to place mortar between adjacent ends of concrete blocks while an additional block may be laid adjacent to the opposite end of one of the blocks being provided with a mortar head joint. Thus, the mortar head joint may be concurrently formed while a block is being laid in the wall preliminary to the formation of a next subsequent mortar head joint.

Accordingly, a head joint placing mechanism and a block grasping and transfer mechanism is disposed in a plane corresponding with a location of a concrete block which is intermediate with respect to the area which corresponds with the length of three concrete blocks between the fingers 688 and 802. Referring to FIGS. 42 and 51, it will be seen that a head joint mortar hopper 804 lies and is supported in a position corresponding to an intermediate space between the fingers 688 and 802 and which would correspond with a length of a middle block corresponding to three lengths of such blocks which equals the space between the fingers 688 and 802.

The hopper 804 is adapted to contain head joint mortar 806 and this head joint mortar 806 may be of a different slump than the mortar 684 hereinbefore described in connection with FIG. 48. Thus, the mortar used for the horizontal head joint upon which each horizontal block rests may be a drier mix than that which is used to form the head joints and which is dispensed from the hopper 680 and also the hopper 682.

Coupled between a side 808 and a plate 810 of the frame 678 are slide rods 812 which are similar to the rods 404 and 406 disclosed in FIGS. 15 and 16 of the drawings. Horizontally slideably mounted on the rods 812 are a pair of slide bearings 814 supporting a platform 816 which corresponds with the platforms 412 shown in FIGS. 15 and 16. Mounted on this platform 816 is a vertical axis brush fluid cylinder 818 having a plunger which supports the platform 420 which carries a block grasping mechanism similar to that disclosed in FIGS. 15 and 16 of the drawings.

Coupled to the platform 816 is a connector plate 820 having an upstanding clip 822 connected to a plunger 824 of a pressure fluid cylinder 826 which is also mounted on the plate 810. This plate 810 being stationarily connected to the frame 678. The plate 820 being connected to the platform 816, thus, connects the plunger 824 to the slide bearings 814 and permits the platform 816 to be actuated slideably longitudinally of the rods 812 in order to carry the block grasping mechanism 418 back and forth from a position over the conveyor 124 to a position over the concrete block wall B shown in FIG. 43 of the drawings, whereby, block grasping mechanism 418 may pick up blocks 174 from the conveyor 124 and place them on the wall B being formed by the machine.

Also coupled to the plate 820 are slide bearings 828 which support a mortar transfer mechanism 830 shown in FIGS. 43, 58 and 59. Inasmuch as the mortar transfer mechanism 830 is coupled to the slide bearings 828 and the plate 820 the plunger 824 of the pressure fluid cylinder 826 moves the mortar transfer mechanism from a position below the hopper 809 to a position over the wall B for placing mortar thereon concurrently with the movement of the block grasping mechanism 418 to a position over the conveyor 129 and alternately the mortar transfer mechanism 830 is moved to a position under the hopper 804 when the block grasper mechanism 418 is moved from a position over the conveyor 129 to a position over the block wall B.

Additional details of the mortar transfer mechanism are disclosed in FIGS. 51, 52, 53, 54, 55, 56 and 57. Accordingly, attention is generally directed to these views for an understanding of the mortar transfer mechanism which transfers mortar from the hopper 804 to form a mortar bed joint between each successive vertically superimposed courses of block. It being understood that each operation of the mortar transfer mechanism 830 carries an outline pattern of mortar which provides a sufficient bed for one concrete block.

The mortar transfer mechanism 830 is carried by a plunger member 832 which is vertically telescopically mounted in a cylindrical member 834 carried by the slide bearings 828. The plunger 832 is coupled to a plunger of a hydraulic cylinder 836 mounted on a plate 838 abridging the slide bearing 828 and, thus, the mortar transfer mechanism 830 is supported in cantilever fashion by the plunger 832 which is capable for raising and lowering the mortar transfer mechanism 830 as will be hereinafter described while it is actuated longitudinally of the rods 812 by means of the plunger 824 of the cylinder 826. It will be understood that these actuating cylinders may be operated by any suitable pressure fluid as desired.

The plunger 832 is fixed to a metering plate assembly 838. This metering plate assembly 838 is composed of three spaced plates 840, 842 and 844 connected by bars 846 and 848 welded or otherwise fixed thereto. The plates 840, 842 and 844 are of a vertical thickness as shown in FIGS. 52, 53 and 54, sufficient to correspond with a desired layer of mortar to be placed on horizontal surfaces of blocks as will be hereinafter described. The bars 846 and 848 connecting the plates 840, 842 and 844 extend upwardly in a vertical disposition as shown best in FIG. 52 of the drawings. The plates 840 and 842 are provided with adjacent edges 850 and 852 respectively. These edges are spaced from each other in distance substantially equal to the width of a desired strip of mortar to be contained therebetween. The edge 852 is provided with an inwardly directed notch 854 near its middle portion corresponding with a similar notch 856 in an edge 858 of the plate 842. This edge 858 is spaced from an edge 860 of the plate 844 so that the space between the edges 858 and 860 substantially equals the space between the edges 850 and 852 while the notch portions 856 and 854 communicating with these spaces provides for a substantially overall H-shaped cavity structure having a depth equal to the thickness of the plates 840, 842 and 844. Thus, the H-shaped cavity disposed to contain mortar is substantially similar in shape to a pattern of mortar to be laid on the upper surface of a block in a wall so that a subsequent block may be laid on top of the mortar.

A valve plate 862 as shown in FIGS. 52, 53, 54, and 54a is substantially channel shaped in cross-section and is provided with upstanding sides 864 and 866 slidably disposed adjacent to opposite ends of the plates 840, 842 and 844. The upstanding sides 864 and 866 are substantially parallel to the bars 846 and 848 and are of a height substantially equal thereto. The slide valve 862 is provided with a bottom portion 868 which comprises a substantially H-shaped sloted opening 870 which substantially corresponds with the H-shaped cavity in the plate assembly 838 as hereinbefore described. It will be seen in FIGS. 52, 53, 54 and 54a that the plunger 832 hereinbefore described is rigidly fixed to the plate 840 at 872, thus, supporting the plate assembly 838 and the slide valve plate 862.

Fixed to the plate 840 are clips 874 and 876 having slots 878 in which edge portions 880 of the valve plate member 862 are slidably mounted to hold the bottom 868 of this valve assembly in contiguous relation with the bottom portions of plates 840, 842 and 844 so that the H-shaped slots in these assemblies may be brought into coincidence with each other or so that the bottom 868 of the slide valve plate 862 may be slid with respect to the clip slots 878 to shut off the H-shaped cavity in the plate assembly 838 at the bottom thereof to contain mortar therein preliminary to the depositing of the mortar on blocks as will be hereinafter described in detail.

The valve slide plate 862 is provided with an edge portion 890 opposite to the edge portion 888 and this edge portion 890 is slidably mounted in slotted portions 892 of clips 894 similar to the clips 874, thus, the clips 894 provide a slidable support for the slide valve plate 862 at its edge opposite to the edge 888 which is slidably supported in the clips 874. The clips 894 are fixed to the plate 844 of the metering plate assembly 838.

The slide valve plate 862 at its bottom portion and at its edge 888 is provided with a pair of inclined tabs 896 and 898 which are engageable with stationary rollers 900 and 902 for slidably actuating the slide valve plate 862 relative to the metering plate assembly 838 for forcing the H-shaped valve slot in the bottom 868 of the plate 862 into register with the H-shaped cavity of the metering plate assembly 838 as will be hereinafter described in detail.

It will be seen from FIGS. 43, 52, 53, 54, 58 and 59 that when the cylinder 826 retracts its plunger 824 to a stop position the slide bearings 828 traverse the rods 812 to a fixed position to dispose the cylinder 836 from a position as shown in FIG. 58 to a position as shown in FIG. 53 whereupon extension of the plunger 832 by the cylinder 836 forces the mortar transfer mechanism downwardly toward a block 274 in the wall B, thereby engaging the members 898 with the rollers 902 and causing the slide valve plate 862 to slide relative to the mortar metering assembly 838, thereby disposing the H-shaped slot in the valve plate 862 directly below the H-shaped cavity in the mortar metering assembly 838 to thereby drop an H-shaped pattern of mortar as indicated at 903 in FIG. 4 so that this pattern of mortar may lay on the uppermost block 274 until another block is subsequently placed thereon and vibrated into position as will be hereinafter described in detail.

When the mortar has thus been dispensed onto the upper surface of a block 274 to form a bed joint thereon the plunger 838 actuated by the cylinder 836 moves the mortar transfer mechanism 830 upwardly to a level as indicated in FIG. 53 which aligns it with a lower portion of the hopper 804 as will be hereinafter described.

The cylinder 826 by projection of its plunger 824 may then be operated as will be hereinafter described to slide the slide bearing members 828 toward the hopper 804 and to, thus, move the cylinder 836 and the mortar transfer mechanism 830 toward the hopper 804.

The hopper 804 is provided with a pair of adjacent inverted V-shaped in cross-section mortar gables 904 and 906 supported in the lower portion of the hopper by inverted channel members 908 and 910. These channel members are welded in place and are quite narrow in cross-section as shown in FIG. 42 of the drawings. Thus, these inverted channel members form inverted slots into which the upwardly projecting plates 846 and 848 may be slidably positioned when the mortar transfer mechanism 830 moves to a position underneath the hopper 804.

As shown in FIG. 50, the hopper 804 is provided with downwardly converging side walls 912 and 914 spaced from adjacent edges 916 and 918 of the gable structures 904 and 906. The wall 914 of the hopper 804 being spaced from adjacent side edges 920 and 922 of the gable structures 904 and 906. A space 924 between adjacent ends of the gable structures 904 and 906 intercommunicates with the spaces adjacent to walls 914 and 912, thus, forming a substantially H-shaped space downwardly through which the mortar may travel when the hopper 804 is vibrated as will be hereinafter described. Thus, the mortar is fed into the H-shaped space hereinbefore described in the metering assembly 832 above the valve plate 862 which is in a closed position relative to the H-shaped cavity of the mortar metering mechanism 832.

Below the hopper 804 are slide rails 926 and 928 on which a hopper shutoff plate 930 is disposed slidably to be moved under the H-shaped outlet at the bottom of the hopper to hold mortar therein when the mortar transfer mechanism 830 is moved to positions shown in FIGS. 53, 54 and 59.

The plate 930 is provided with a downwardly projecting pin 932 which is engaged by a loop structure 934 connected to the plate member 844 as shown best in FIG. 54a. Thus, the pin 932 is engaged by the loop 934 when the mortar transfer mechanism 830 is moved in a direction from the hopper 804 as shown in FIG. 58 to a position over the wall B as shown in FIG. 59 and when the mortar transfer mechanism moves downwardly toward the wall B as shown in FIG. 59 the loop structure 934 moves downwardly with respect to the pin 932. When the mortar transfer mechanism again moves upwardly, the loop 934 is engaged around the pin 932 and when the mortar transfer mechanism 830 subsequently moves to a position beneath the hopper 804 the slide plate 930 is moved along the rails 926 and 928 to a position beyond and out of register with the bottom of the hopper 806 so that it may feed mortar directly into the H-shaped cavity of the mortar transfer mechanism 830 as hereinbefore described.

When the mortar transfer mechanism 830 has reached the position as shown in FIG. 59 and the valve plate 862 has been moved into a position wherein the mortar is released, this plate is subsequently moved backwardly into shutoff position with respect to the mortar retaining assembly 838 as follows: As the transfer mechanism 830 moves backwardly to a position under the hopper the valve plate 862 contacts the stop members 936 above the rails 926 and 928 whereby force applied by the cylinder 826 causes the mortar retaining assembly 838 to slide with respect to the valve plate 862 and again place the valve plate 862 in a closed position with respect to the H-shaped cavity in the mortar retaining mechanism 838 so that the mortar dispensed from the hopper 804 by vibration will be retained in the H-shaped cavity of the mortar retaining assembly between the plates 840, 842 and 844.

It will be appreciated that when the mortar transfer mechanism 830 is moved to a position over the wall B as shown in FIGS. 53 and 59, that suitable stop means connected with the plunger 824 of the cylinder 826 or other stop means disposed to stop the slide bearings 828 at a certain position is provided so that the cam portions 898 of the mortar transfer mechanism are in juxtaposition above the rollers 902 in order to slide the slide valve plate 862 with respect to the mortar retaining assembly 838. When the mortar transfer mechanism 830 moves downwardly over the wall B to the position as shown in FIG. 59, the cam members 898 engage the rollers 902 and cause the H-shaped opening in the valve plate 862 to coincide with the H-shaped cavity in the mortar retaining assembly 838 and to thereby drop the mortar in an H-shaped pattern.

Reference is now directed to the disclosures of FIGS. 52, 53, 54 and 54a in which the notched portions 856 and 854 are shown. These are separated by a narrow metal section 938 shown in FIG. 54a. As shown in FIG. 55, a pivoted valve member 940 is pivotally mounted to operate below the valve plate 862 to uncover the notched portions 856 and 854 in order to drop mortar therethrough and substantially complete the H-shaped pattern of mortar dispensed by the mortar transfer mechanism 830. The valve member 940 is pivotally mounted on a bolt 942 which is screw threaded into an internally screw threaded bore 944 in the bottom 868 of the valve plate 862. Another bolt 946 is provided with screw threaded portion 948, screw threadably fixed in the middle section 938 of the plate 842. This bolt 946 passes through elongated slots 950 and 952 in the valve member 940 and the bottom 868 of the valve plate 862 respectively. Thus, when the valve plate 862 is slidably moved relative to the metering assembly 838 by contact of the cams 898 with the rollers 902, the position of the bolt 942 changes to a broken line position 943 and causes pivotal movement of the valve member 940 out of interference with the notch portions 856 and 854, thereby permitting mortar to fall outwardly from the mortar transfer mechanism 830 substantially to complete an intermediate portion of an H-shaped pattern at opposite sides of the reduced portion 938 of the plate 842.

The valve 940 moves only about 45 degrees, but is provided with notch portions 954 and 956 angularly disposed to the notches 856 and 854. This angular disposition being substantially 45 degrees so that the notches 954 and 956 permit the valve member 940 to clear the notches 856 and 854, all as indicated by broken lines 958 in FIG. 55 of the drawings.

From the foregoing it will be seen that actuation of the slide valve plate 862 by the cams 898 and the rollers 902 with the downward movement of the mortar dispensing assembly that the slide valve plate 862 at its H-shaped opening moves into registry with the H-shaped cavity in the mortar retaining assembly 838 and automatically causes a 45 degree pivotal movement of the valve member 940 to expose the notch portions 856 and 854 and to drop mortar 903 therefrom on the upper surface of a block 274 on the wall B all as shown in FIG. 59 of the drawings.

According to a modification of the invention shown in FIGS. 60, 61, 62 and 63, a means is provided for forming mortar head joints between the vertical adjacent surfaces of concrete blocks. This modification of the invention being operable in lieu of the means shown in FIGS. 48 and 49 hereinbefore described.

As shown in FIG. 60, a hopper 960 is disposed to hold mortar 962 and this hopper 960 is provided with an outlet 964 which may be closed by a slide valve 966. The hopper 960 is vibrated preliminarily until mortar 962 passes through the opening 964 and into a chamber 968 therebelow. The outlet of the chamber 968 designated 970 is surrounded by a gasket 972 which may be placed over adjacent portions of concrete blocks in a manner as shown in FIG. 49 and equivalent to the gasket 704. Thus, the gasket 972 provides a seal so that mortar in the chamber 968 may be projected between adjacent vertical spaced surfaces of concrete blocks as will be hereinafter described in detail.

When the chamber 968 is full of mortar, a cylinder 974 is provided with a plunger 976 to actuate the slide valve 966 and shut off the opening 964, whereupon compressed air may be introduced through a conduit 978 to force mortar from the chamber 968 to a position between adjacent spaced vertical surfaces of concrete blocks to form a head joint therebetween.

Suspended in the hopper 960 are vibrating fingers 980 operable by a vibrator 982 in order to efficiently feed mortar through the opening 964 to the chamber 968 preliminary to the closing of the valve 966 as hereinbefore described.

A modified mechanism shown in FIG. 63 comprises a hopper 984 having an outlet 986 and a chamber 988 having an air inlet 990. Said chamber 988 and inlet 990 operably mounted on a slide plate 992 having an opening 994 which is movable relative to the opening 986 so that when the chamber 988 is moved vertically and slidably relative to the hopper 984, that the opening 994 moves out of registry with the opening 986 subsequent to the filling of the chamber 988.

It will be seen that each of the structures shown in FIGS. 61 and 63 employ the combination of a hopper and an auxiliary chamber fed by the hopper from which mortar is projected by compressed air or other compressable fluid. This projection of mortar between concrete blocks may also be accompanied by vibration of the chamber from which the mortar is projected by compressed air. Thus, the mortar may efficiently be projected and vibrating into position between the vertical faces 690 and 692 of the blocks 694 and 696 respectively.

In a modification of the invention as shown in FIGS. 64, 65, 66 and 67, a means is provided for interrupting the operation of a head joint mortar placement mechanism when a space between the vertical faces 690 and 692 of the blocks 694 and 696 has been filled. This modified mechanism comprises a pair of electrodes held in connection with pads such as the pads 378 shown in FIG. 45, whereby concrete mortar filling the space between the blocks to form a head joint completes a circuit between such electrodes and, thus, interrupts the mechanism utilized to place the mortar in the head joint. These contacts may be coupled to means to interrupt vibration or other feeding of mortar such as a pneumatic supply disposed to exhaust mortar from a chamber 968 as shown in FIG. 61.

Referring to FIG. 64 and, also, FIG. 66, it will be seen that any means such as the chamber 968 may be disposed in place to hold a gasket 972 against concrete blocks adjacent to vertical surfaces 690 and 692. When mortar is forced between the vertical surfaces 690 and 692, a pair of contacts 996 and 998 are held by a pair of the pads 738 shown in FIG. 45. These contacts 996 and 998 are near the lower portion of the pads 738 and when mortar designated 1000 in FIG. 66 bridges the gap between the contacts 996 and 998, an electrical circuit is closed and, thereby, causing interruption of means which may vibrate the mortar into place or means which may project thereinto in other ways, as for example, pneumatic placement if desired. Coupled to the contacts 996 and 998 are conductors 1002 and 1004. These conductors are connected to a relay 1006 disposed to operate a pneumatic valve, vibrator or any other means, such as a motor used to feed mortar downwardly between the vertical surfaces 690 and 692 of the concrete blocks 694 and 696. This last mentioned means constituting a vibrator, cylinoid valve or motor is designated 1008, in FIG. 67 of the drawings and is coupled by means of conductors 1010 and 1012 with the relay 1006. A further understanding of this circuitry and control will be apparent from control features for the machine of the invention which will be hereinafter described in detail.

The concrete block laying machine of the invention is automatically controlled by a stepper switch as shown in FIG. 68 of the drawings, this stepper switch being designated 1014 and being similar in operation to the stepper switch 630 hereinbefore described.

With relation to the following description of operation, attention is called to FIGS 68, 69, 70, 71, 72 and 73, wherein various control switches, relays, limit switches, time delay devices, actuators and motors are referred to by means of appropriate abbreviations.

L.S. as hereinafter used designates a limit switch. This designation may be followed by numerical characters to distinguish the various limit switches, one from the other.

C.R. as hereinafter used, defines a control relay and such designations may be followed by numerals to distinguish one relay from another.

A.V. as used hereinafter designates an air valve or any other solenoid valve capable of conducting and/or shutting off the flow of pressure fluid. A.V. may be followed by various numerals to distinguish one valve from another.

M. as hereinafter used may designate motors and these characters may be followed by numerals to distinguish one motor from another.

T.D. as hereinafter used may designate a time delay device of conventional electrical or electronic character. These designations T.D. may be followed by various numerals to distinguish one time delay device from the other.

The stepper switch 1014 is a sequential type switch of conventional construction employing twelve positions and this switch is progressively energized so that the motor of this switch will step from one position to another, and in many instances, movement of mechanism of the machine causes limit switches to be contacted, which advance the stepper switch from one position to another. Thus, this is a conventional switch which is automatically programmed by mechanical operation of the concrete block laying machine of the invention.

For the sake of clarity, the first operation to be described herein may begin with the stepper switch in position 10, wherein a concrete block 274 is fed by the conveyor 124 to a position in which it contacts a limit switch to initiate an operating cycle of the machine as will be hereinafter described in detail, and which will in turn cause further advancement of the stepper switch progressively from one position to another in accordance with various movements of the mechanism of the machine until a complete cycle of operation has been accomplished.

When the stepper switch 1014 is in position 10 as indicated best in FIG. 71 of the drawings, the limit switch 1080 is contacted by a block 174 moving longitudinally of the conveyor 124. The limit switch 1080 is shown in FIG. 50 wherein blocks being moved on the conveyor 124 pass in the direction of arrows shown thereon and the blocks when moved to a contact position of the limit switch 1080 are in position to be picked up by the block grasping mechanism 418 as shown in FIG. 43 of the drawings.

When the limit switch 1080 is contacted by the concrete block 174, this limit switch in circuit with the stepper switch 1014 energizes a conventional electrical advancing mechanism thereof and such energization of this stepper switch moves it to position 11. In this position A.V. 1050 or A.V. 1056 is energized in electrical circuit with the stepper switch to conduct pressure fluid to either the cylinder 714 or 683 to move either the hopper 680 or 682 downwardly, depending upon which direction the block laying machine of the invention is proceeding longitudinally of the wall B being laid. As the respective head hopper 680 or 682 is moved down by the respective cylinder 714 or 683, A.V. 1048 or 1054 is energized by the stepper switch to supply pressure fluid to the cylinders 754, 756, 758 and 760 as a group or to the cylinders 792, 794, 796 and 798 as a group so that the concrete blocks between which bed joint is to be made will be clamped together as shown in FIG. 45 and as hereinbefore described, and, thus, the blocks may be held longitudinally with respect to each other and aligned during the placement of the mortar bed joint therebetween as hereinbefore described.

As the respective head hopper 680 or 682 moves downward under force of its respective actuating cylinder 714 or 683, either respective limit switch 1094 or 1096 is engaged by the respective cylinder which energizes the actuator of the stepper switch 1014 and advances it to position 12. When the stepper switch is advanced to position 12, either the air valve 1052 or 1058 is energized with respect to either of the hoppers 680 or 682 which happens to be in operation and, thus, the joint clamp cylinder 744 or 746 may be supplied pressure fluid by the air valve 1052 to clamp the clamp pads 738 as shown in FIG. 45, and as hereinbefore described. Otherwise, the air valve 1058 will supply pressure fluid to the joint clamp cylinders 800 to accomplish the same operation as disclosed in FIG. 45 and hereinbefore described. Thus, the joint clamp cylinders 800 below the hopper 682 cooperate with it in the same manner as the joint clamps cooperate below the hopper 680 as indicated and disclosed in FIG. 45.

In position 12 and concurrently with energization of the joint clamps as hereinbefore described, the head blocks hopper vibrators, either 700 or 685 are energized to feed mortar downwardly around the vibrating fingers 698 and through the outlet 686 to fill a head joint between adjacent vertical surfaces 690 and 692 of concrete blocks as disclosed in FIG. 45. At this time, the mortar transfer mechanism 830, as hereinbefore described, has been filled with mortar in the H-shaped cavity of the mortar transfer mechanism and in this position 12 of the stepper switch 1014, the air valve 1044 is energized to actuate the cylinder 836 to lower the mortar transfer mechanism 830 downwardly from a position shown in FIG. 3 of the drawings to a position shown in FIG. 59 of the drawings, whereupon mortar as hereinbefore described is dropped upon the top of a concrete block 174 by actuation of the cam members 898 against rollers 902 for opening the valve plate 862 and the valve member 940 so that an H-shaped pattern of mortar 903 may be precisely deposited upon the upper surface of a block 174 on the wall B. During this time, vibration being applied to the head hopper fingers 698, is maintained by means of a time delayed device 1069 which is energized by the stepper switch 1014 in position 12. The time delay, thus, provides for an operating circuit to the respective vibrator 700 or 685 until a sufficient head joint has been formed. As the mortar transfer mechanism 830 moves downwardly, limit switch 1098 is contacted with downward movement of this mechanism and actuation of this limit switch 1098 energizes the stepper switch 1014 to position 1 thereof. In position 1, the stepper switch energizes air valve 1020 for actuating cylinder 818 to carry the block grasper mechanism 418 downwardly to grasp a block 174. As the block grasper mechanism 418 moves downwardly, it causes actuation of limit switch 1084, which, thus, energizes the stepper switch 1014 to position 2 wherein the air valves 1022 and 1024 cause actuation of the cylinders 430 of a block grasper mechanism which causes the block 174 to be grasped at its position on the conveyor as hereinbefore described.

In position 2, the valve 1020 is actuated to permit the plunger of the cylinder 818 to raise the block grasper mechanism 418 and concurrently the air valve 1044 is energized to permit actuation of the cylinder 836 to raise the mortar transfer mechanism 830. As the block grasper mechanism 418 moves upwardly, limit switch 1086 is actuated which energizes the stepper switch 1014 to position 3. In position 3, the stepper switch energizes air valve 1026 which causes pressure fluid actuation of the cylinder 826 to move its plunger 824 and the slide bearings 814, thereby carrying the mortar transfer mechanism 830 and the block grasper mechanism 418 toward the hopper 804 so that the mortar transfer mechanism 830 will be placed below the hopper 804 and so that the block 174 carried by the block grasper 418 may be positioned directly over the wall B, all as shown best in FIG. 43 of the drawings. As the plunger 824 of the cylinder 826 is projected to its limit of travel toward the hopper 804, limit switch 1088 is actuated which thereby energizes the stepper switch 1014 to position 4. At approximately this same time, the time delay 1060 terminates its operation to complete vibration of the vibrators 700 or 785 in the forming of a head joint as described in connection with FIGS. 47, 48 and 49.

In position 4, the stepper switch causes energization of A.V. 1040 in connection with the vibrators 807 which vibrate the hopper 804 to feed mortar downwardly into the H-shaped cavity of the mortar transfer mechanism 830.

When the stepper switch is advanced to position 4, as hereinbefore described, air valve 1020 is energized to cause actuation of the cylinder 818 and to move the block grasper mechanism 418 downwardly toward the wall B, carrying a block 174 therewith, to place the block on mortar previously deposited by the mortar transfer mechanism 830 as shown best in FIG. 59 of the drawings. In position 4, the stepper switch energizes air valve 1042 which causes operation of the block grasper vibrator 528 and the block 174 is, thus, vibrated as it is moved downwardly into position on the mortar 903 previously placed by the mortar transfer mechanism 830, as shown best in FIGS. 43 and 59. In position 4, with the operation of the vibrator 528, time delay 1038 is energized to operate for about one second so that the block 174 will be efficiently and securely vibrated down onto the mortar 903 to form an efficient bed joint. In position 4, the stepper switch also operates air valves 1052 and 1058 so that the cylinders 744 and 746 and 800 may operate on a spring return basis to release the joint clamps as shown in FIG. 45 and, also, FIG. 46, and as described in connection with FIG. 43. After these cylinders have been de-energized and the spring return action thereof has caused the seal pads 738 and 752 to be retracted, the energization of either the air valve 1050 or the air valve 1056 will cause respective energization of cylinders 714 or 683 to raise the respective hopper 680 or 682. During operation when the stepper switch is in position 4 and during the time when the block grasper mechanism 418 moves downwardly under vibration to bed a block on the mortar 903, the limit switch 1082 is actuated by an arm 1083 on the block grasper mechanism platform 420. When L.S. 1082 is, thus, actuated, it initiates operation of T.D. 1078 and this time delay device 1078 operates to maintain vibration of the block grasper mechanism 418 by the vibrator 528 for approximately one second and when time delay 1078 times out and opens, it causes energization of the stepper switch 1014, thereby actuating the stepper switch to position 5. The stepper switch 1014 in position 5, actuates air valve 1020 to energize the cylinder 818 with pressure fluid to retract its plunger and to raise the block grasper mechanism 418. At this time, air valves 1048 and 1054 are energized to cause operation of the first group of cylinders 754, 756, 758 and 760, or the second group of cylinders 792, 794, 796 or 798 in correspondence with respective hoppers 680 or 682, depending on which hopper is in operation. After the block alignment clamps have been thus opened, upward movement of the block grasper mechanism 418 as hereinbefore described, causes actuation of limit switch 1086, which energizes the stepper switch 1014 to position 6 thereof.

It will be seen from FIG. 43 of the drawings, that L.S. 1086 is mounted on a platform 816 which carries the cylinder 818 and the block grasper mechanism 418 and an actuating bar 1087 carried on the platform 420 of the block grasper mechanism and which bar 1087 moves vertically and contacts a roller of arm L.S. 1086.

When L.S. 1086, is thus, actuated, and it has thus energized the stepper switch 1014 to position 6, the air valve 1026 is actuated to energize the cylinder 826 with pressure fluid to move the block grasper mechanism 418 to a position over the conveyer 124 and concurrently to move the mortar transfer mechanism 830 from a position beneath the hopper 804 to a position over the block wall B as indicated in FIGS. 53, 58 and 59.

In position 6, the stepper switch 1014 causes energization of the horizontal index motor 300 which moves the carriage of the machine longitudinally of the block wall B, a distance equal to the length of one block 174, all as hereinbefore described. And the machine is then again ready to initiate another cycle of operation in which the limit switch 1080 is actuated by another block passing along the conveyer 124.

When an end of the wall B is reached, L.S. 1064 or L.S. 1066 is actuated depending on which end of the wall is reached. These switches are normally closed and when one of them is opened, the normally closed side of control relay 1028 is energized, thus, closing the normally closed side of this relay 1028. This causes energization of the motor 118 for moving the carriage 71 upwardly as hereinbefore described.

It will be noted that the limit switches 1064 and 1066 are not disclosed mechanically in the drawings, but may be placed adjustably in position on the carriage 71 to limit movement of the block handling carriage longitudinally thereof in either direction as desired.

As the motor 118 moves the carriage 71 upwardly, the fluid switch 1062 corresponding with limit switch 359 is actuated. It will be seen that as the roller 354 moves upwardly on the incline 352, that the plunger 355 actuates the arm 357 of the limit switch 359, de-energizing the motor 118 and its electric brake, thereby permitting the roller 354 to pass slightly beyond the horizontal portion 350 of the respective buttress and, thus, the gravitational action of the carriage causes it to settle back and firmly contact the roller 354 on the horizontal surface 350 and positively vertically index the entire carriage for a successive vertically superimposed course of blocks to be laid on the wall B.

It will be obvious to those skilled in the art that various modifications of the present invention may be resorted to in a manner limited only by a just interpretation of the following claims.

We claim:

1. In a block laying machine the combination of: a frame; a main carriage vertically movably mounted on said frame; an elongated track means supported on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over an area on which blocks are to be laid; indexing means on said main carriage for moving said second carriage longitudinally along said track means intermittently and in precise increments comprising: members spaced in correspondence with said increments; a motorized crank means on said second carriage; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said second carriage longitudinally of said track means; and motor means disposed to operate said crank as each block handling and laying cycle of operation of said second carriage and said machine occurs.

2. In a block laying machine the combination of: a main frame; a main carriage vertically movably mounted on said frame; an elongated track means supported on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over an area on which blocks are to be laid; indexing means on said main carriage for moving said second carriage longitudinally along said track means intermittently and in precise increments comprising: members spaced in correspondence with said increments; a motorized crank means on said second carriage; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said second carriage longitudinally of said track means; and motor means disposed to operate said crank as each block handling and laying cycle of operation of said second carriage and said machine occurs; the dimensions of said spaced members being such that rotation of said crank means in one direction for moving said second carriage in one direction and then in an opposite direction from moving said second carriage in an opposite direction intermittently disposed said second carriage in positions intermediate its intermittent positions during its movement in said one direction whereby blocks may be laid by said carriage in superimposed courses in which ends of the blocks in one course are disposed between ends of blocks in an adjacent course therebelow.

3. In a block laying machine the combination of: a main frame; a main carriage vertically movably mounted on said frame; an elongated track means supported on said main carriage; a block conveyor mounted on said main carriage substantially parallel to said track means; a second carriage movably mounted longitudinally of said track means and said conveyor; third means on said second carriage movable in a direction laterally of said track means and said conveyor; block grasping means on said third means for engaging blocks on said conveyor and for moving them laterally relative to said conveyor and to a position over an area on which blocks are to be laid; indexing means on said main carriage for moving said second carriage longitudinally along said track means intermittently and in precise increments comprising: members spaced in correspondence with said increments; a motorized crank means on said second carriage; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said second carriage longitudinally of said track means; and motor means disposed to operate said crank as each block handling and laying cycle of operation of said second carriage and said machine occurs; the dimensions of said spaced members being such that rotation of said crank means in one direction for moving said second carriage in one direction and then in an opposite direction from moving said second carriage in an opposite direction intermittently disposes said second carriage in positions intermediate its intermittent positions during its movement in said one direction whereby blocks may be laid by said carriage in superimposed courses in which ends of the blocks in one course are disposed between ends of blocks in an adjacent course therebelow; a support for said spaced members adjustably mounted on said frame and disposed for movably adjusting the positions of said spaced members longitudinally with relation to said conveyor in increments equally one-half of said first mentioned increments so that said indexing means will dispose said second carriage to lay superimposed courses of blocks with their adjacent ends all in vertical alignment.

4. In a block laying machine the combination of: a main carriage vertically movably mounted on said frame; an elongated track means supported on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over an area on which blocks are to be laid; indexing means on said main carriage for moving said second carriage longitudinally along said track means intermittently and in precise increments comprising: members spaced in correspondence with said increments; a motorized crank means on said second carriage; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said second carriage longitudinally of said track means; and motor means disposed to operate said crank as each block handling and laying cycle of operation of said second carriage and said machine occurs; vertical index means on said frame comprising a pair of spaced column members; a plurality of vertically spaced structure portions on each column member; said main carriage vertically movably mounted on said main frame, said main carriage supporting said track means and said conveyor; and means on said main carriage disposed to traverse upwardly and to engage said structure portions to support said main frame during the laying of one horizontal course of blocks by said machine, said structure portions vertically spaced in correspondence with respective vertical dimensions of superimposed courses of blocks laid by said machine.

5. In a machine indexing mechanism the combination of: a track means; second means movable thereon; third means disposed adjacent said track means, said third means on said second means and cooperable therewith for moving said second means longitudinally along said track means intermittently and in precise increments comprising: spaced members in correspondence with said increments and located stationarily along said track means; a motorized crank means on said second means; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said said second means longitudinally of said track means; and means disposed to operate said crank about its rotary axis.

6. In a machine indexing mechanism the combination of: a track means; second means movable thereon; third means disposed adjacent said track means, said third means on said second means and cooperable therewith for moving said second means longitudinally along said track means intermittently and in precise increments comprising; spaced members in correspondence with said increments and located stationarily along said track means; a motorized crank means on said second means; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said second means longitudinally of said track means; and means disposed to operate said crank about its rotary axis; the dimensions of said spaced members such that rotation of said crank means in one direction for moving said second means in one direction and then in the opposite direction for moving said second means in an opposite direction intermittently disposes said second means in position intermediate its intermittent positions during its movement in said one direction.

7. In a machine indexing mechanism the combination of: a track means; second means movable thereon; third means disposed adjacent said track means, said third means on said second means and cooperable therewith for moving said second means longitudinally along said track means intermittently and in precise increments comprising: spaced members in correspondence with said increments and located stationarily along said track means; a motorized crank means on said second means; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said second means longitudinally of said track means; and means disposed to operate said crank about its rotary axis; the dimensions of said spaced members such that rotation of said crank means in one direction for moving said second means in one direction and then in the opposite direction for moving said second means in an opposite direction intermittently disposes said second means in position intermediate its intermittent positions during its movement in said one direction; means supporting all of said spaced members said last mentioned means adjustable longitudinally of said track means; and means in connection with said track means limiting the longitudinal movement of said second means relative thereto.

8. In a block laying machine the combination of: a main frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over an area on which blocks are to be laid; indexing means on said main carriage for moving said second carriage longitudinally along said track means intermittently and in precise increments; vertically spaced indexing means for vertically locating said main carriage vertically on said main frame in precise vertical increments corresponding to the elevations of superimposed courses of blocks.

9. In a block laying machine the combination of: a main frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means on said second carriage movable in a direction laterally of said track means and said conveyor; block grasping means on said third means for engaging blocks on said conveyor and for moving them laterally relative to said conveyor and to a position over an area on which blocks are to be laid; indexing means on said main carriage for moving said second carriage longitudinally along said track means intermittently and in precise increments; vertically spaced indexing on said main frame in precise vertical increments corremeans for vertically locating said main carriage vertically on said main frame in precise vertical increments corresponding to the elevations of superimposed courses of blocks; a first mortar dispenser on said second carriage disposed laterally of said conveyor and over said area; an open outlet structure at a lower portion of said mortar dispenser disposed to dispense mortar adjacent to blocks being laid.

10. In a block laying machine the combination of: a main frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means on said second carriage movable in a direction laterally of said track means and said conveyor; block grasping means on said third means for engaging blocks on said conveyor and for moving them laterally relative to said conveyor and to a position over an area on which blocks are to be laid; indexing means on said main carriage for moving said second carriage longitudinally along said track means intermittently and in precise increments; vertically spaced indexing means for vertically locating said main carriage vertically on said main frame in precise vertical increments corresponding to the elevations of superimposed courses of blocks; a first mortar dispenser on said second carriage disposed laterally of said conveyor and over said area; an open outlet structure at a lower portion of said mortar dispenser disposed to dispense mortar adjacent to blocks being laid; said first mortar dispenser being disposed to dispense head joint mortar between adjacent vertical surfaces of concrete blocks; and a bed joint mortar dispensing means coupled to said third means and movable to a position over said area concurrently with movement of said block grasper over said conveyor.

11. In a mortar feeding device for feeding mortar between adjacent edges of surfaces of concrete blocks the combination of: a hopper disposed to contain mortar; means forming a mortar outlet opening in said hopper, said opening means adapted to fit surfaces of concrete blocks and to communicate with a space between adjacent concrete blocks; finger means projecting beyond said opening and in directions substantially normal to said opening; said fingers disposed and projectable beyond said opening into said space between concrete blocks being mortared together; and vibrator means operable to vibrate said fingers and to cause mortar to flow outwardly of said hopper through said outlet opening and between adjacent surfaces of said blocks between which said finger means is projectable.

12. In a block laying machine the combination of: a main frame; a main carriage vertically movably mounted on said main frame; an elongated carriage track means on said main carriage; a block conveyor mounted on said main carriage substantially parallel to said track means; a second carriage movably mounted longitudinally of said track means and said conveyor; third means on said second carriage movable in a direction laterally of said track means and said conveyor; block grasping means on said third means for engaging blocks on said conveyor and for moving them laterally relative to said conveyor and to a position over an area on which blocks are to be laid; indexing means on said main carriage for moving said second carriage longitudinally along said track means intermittently and in precise increments; indexing means for vertically moving said main carriage vertically on said frame in precise vertical increments corresponding to the elevations of superimposed courses of blocks; a mortar hopper on said second carriage disposed laterally of said conveyor and over said area; an open outlet structure at a lower portion of said hopper; vertically disposed fingers projectable below said outlet portion and between adjacent ends of concrete blocks being mortared together; and vibrator means operable to vibrate said fingers and to cause mortar to flow downwardly therearound and between said adjacent ends of said blocks; said hopper and said fingers vertically movably mounted on said second carriage whereby said hopper and said fingers may be lowered to a position in which said fingers are projected between adjacent ends of concrete blocks whereupon the outlet opening of said hopper is disposed above the space between the blocks permitting subsequent vibration thereof to feed mortar outwardly of said hopper between said fingers and between said blocks to provide a head joint therebetween during vibration applied to said fingers and said mortar between said blocks.

13. In a block laying machine the combination of: a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over an area on which blocks are being laid; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; means for driving said conveyor for moving blocks thereon longitudinally of said track means; limit switch means carried by said second carriage and engageable by blocks moving on said conveyor, said limit switch electrically coupled to said means driving said conveyor whereby blocks movable on said conveyor when engaging said limit switch may stop operation of said means driving said conveyor momentarily.

14. In a block laying machine the combination of: a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over an area on which blocks are being laid; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; a second conveyor pivoted to said frame and having an end adjacent said first conveyor for feeding blocks to said first conveyor, the pivotal mounting of said second conveyor permitting one end thereof to remain at a common level while said main carriage moves upwardly relative to said floor.

15. In a block laying machine the combination of: a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over an area on which blocks are being laid; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; a second conveyor pivoted to said frame and having an end adjacent said first conveyor for feeding blocks to said first conveyor, the pivotal mounting of said second conveyor permitting one end thereof to remain at a common level while said frame moves upwardly relative to said floor; limit switch means engageable by blocks on said first mentioned conveyor for stopping operation of said second conveyor whereby delivery of blocks from said second conveyor is interrupted when said first mentioned conveyor is loaded.

16. In a block laying machine the combination of: a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over an area on which blocks are being laid; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid over said area; a mortar hopper on said second carriage; means coupling said mortar hopper and said block grasping means together with said third means whereby said block grasping means and said hopper are movable in unison laterally of said conveyor whereby said block grasping means is disposed over said conveyor for picking up a block while said mortar hopper is disposed over a block laid over said area for depositing mortar thereon.

17. In a block laying machine the combination of: a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over an area on which blocks are being laid; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid over said area; a mortar hopper on said second carriage; means coupling said mortar hopper and said block grasping means together with said third means whereby said block grasping means and said hopper are movable in unison laterally of said conveyor whereby said block grasping means is disposed over said conveyor for picking up a block while said mortar hopper is disposed over a block laid over said area for depositing mortar thereon; said mortar hopper having outlet means at its normally lower end for distributing mortar on upper surfaces of blocks; and vibrating means for feeding mortar out of said hopper onto said blocks; a hinged plate stationarily supported by said frame and disposed to be located at an end of a concrete block wall being laid by said machine, said plate having an edge adapted to abut a block laid at an end of a course of blocks for holding such a block at the end of a course in position while mortar is applied at the opposite end thereof.

18. In a block laying machine the combination of: a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over an area on which blocks are being laid; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid over said area; limit switch means carried by said frame and adjustably positioned longitudinally relative to said track means for engagement by means on said second carriage; motor means coupled to said limit switches and disposed to drive said second carriage longitudinally of said track means whereby said limit switches limit the longitudinal travel of said second carriage on said track means and correspondingly by limit the length of a block wall to be laid by said machine.

19. In a block laying machine the combination of: a frame movably supported on said floor; a main carriage vertically movably mounted on said frame; an elongated track means supported on said main carriage; a block conveyor mounted on said main carriage substantially parallel to said track means; a second carriage movably mounted longitudinally of said track means and said conveyor; third means of said second carriage movable in a direction laterally of said track means and said conveyor; a block grasping means on said third means for engaging blocks on said conveyor and for moving them laterally relative to said conveyor and to a position over an area on which blocks are to be laid; indexing means on said main carriage for moving said second carriage longitudinally along said track means intermittently and in precise increments comprising members spaced in correspondence with said increments; a motorized crank means on said second carriage; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said second carriage longitudinally of said track means; and motor means disposed to operate said crank as each block handling and laying cycle of operation of said second carriage and said machine occurs; limit switch means engageable by said crank arm at each rotating cycle thereof; said limit switch means being coupled to the motor means driving said crank for stopping it each cycle of operation and with the engagement of each one of said spaced members; switch means on said second carriage operable in response to engagement of blocks to initiate operation of said motor means driving said crank arm.

20. In a machine indexing mechanism the combination of: a track means; second means movable thereon; third means disposed adjacent said track means, said third means on said second means and cooperable therewith for moving said second means longitudinally along said track means intermittently and in precise increments comprising: spaced members in correspondence with said increments and located stationarily along said track means; a motorized crank means on said second means; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said second means longitudinally of said track means; and means disposed to operate said crank about its rotary axis; said engaging means being a roller; adjacent edges of said spaced members being spaced apart substantially equal to the diameter of said roller.

21. In a machine indexing mechanism the combination of: a track means; second means movable thereon; third means disposed adjacent said track means, said third means on said second means and cooperable therewith for moving said second means longitudinally along said track means intermittently and in precise increments comprising: spaced members in correspondence with said increments and located stationarily along said track means; a motorized crank means on said second means; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said second means longitudinally of said track means; and means disposed to operate said crank about its rotary axis; said engaging means being a roller; adjacent edges of said spaced members being spaced apart substantially equal to the diameter of said roller; limit switch means stationarily mounted on said second means; and means on said crank means for engaging said switch means to interrupt a cycle of operation of said indexing mechanism.

22. In a block laying machine the combination of: a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over an area on which blocks are being laid; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; a pair of mortar hoppers disposed on said carriage and vertically movable thereon; means for vertically moving said hoppers up and down; open outlet portions at the lower extremities of said hoppers; fingers projectable outwardly of said openings and between adjacent ends of concrete blocks; one of said hoppers adapted for feeding mortar between adjacent ends of blocks when said second carriage is movable in one direction longitudinally of said track means and the other of said hoppers being disposed to insert mortar between adjacent ends of blocks when said second carriage is movable along said track means in the opposite direction.

23. In a block laying machine the combination of: a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over an area on which blocks are to be laid; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; a pair of mortar hoppers disposed on said carriage and vertically movable thereon; means for vertically moving said hoppers up and down; open outlet portions at the lower extremities of said hoppers; fingers projectable outwardly of said openings and between adjacent ends of concrete blocks; one of said hoppers adapted for feeding mortar between adjacent ends of blocks when said second carriage is movable in one direction longitudinally of said track means and the other of said hoppers being disposed to insert mortar between adjacent ends of blocks when said second carriage is movable along said track means in the opposite direction; said fingers vertically movably mounted in the outlet openings of said hoppers and projectable between adjacent ends of blocks; and vibrators disposed to vibrate said fingers and feed mortar downwardly through the outlet opening of a respective hopper and between adjacent ends of a pair of concrete blocks.

24. In a brick laying machine the combination of: a floor; a frame movably supported on said floor; a main carriage vertically movably mounted on said frame; an elongated track means supported on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over said floor; indexing means on said main carriage for moving said second carriage longitudinally along said track means intermittently and in precise increments comprising: members spaced in correspondence with said increments; a motorized crank means on said second carriage; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said second carriage longitudinally of said track means; and motor means disposed to operate said crank as each block handling and laying cycle of operation of said second carriage and said machine occurs.

25. In a brick laying machine the combination of: a floor; a frame movably supported on said floor; a main carriage vertically movably mounted on said frame; an elongated track means supported on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over said floor; indexing means on said main carriage for moving said second carriage longitudinally along said track means intermittently and in precise increments comprising: members spaced in correspondence with said increments; a motorized crank means on said second carriage; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said second carriage longitudinally of said track means; and motor means disposed to operate said crank as each block handling and laying cycle of operation of said second carriage and said machine occurs; the dimensions of said spaced members being such that rotation of said crank means in one direction for moving said second carriage in one direction and then in an opposite direction from moving said second carriage in an opposite direction intermittently disposes said second carriage in positions intermediate its intermittent positions during its movement in said one direction whereby blocks may be laid by said carriage in superimposed courses in which ends of the blocks in one course are disposed between ends of blocks in an adjacent course therebelow.

26. In a brick laying machine the combination of: a floor; a frame movably supported on said floor; a main carriage vertically movably mounted on said frame; an elongated track means supported on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over said floor; indexing means on said main carriage for moving said second carriage longitudinally along said track means intermittently and in precise increments comprising: members spaced in correspondence with said increments; a motorized crank means on said second carriage; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said second carriage longitudinally of said track means; and motor means disposed to operate said crank as each block handling and laying cycle of operation of said second carriage and said machine occurs; the dimensions of said spaced members being such that rotation of said crank means in one direction for moving said second carriage in one direction and then in an opposite direction from moving said second carriage in an opposite direction intermittently disposes said second carriage in positions intermediate its intermittent positions during its movement in said one direction whereby blocks may be laid by said carriage in superimposed courses in which ends of the blocks in one course are disposed between ends of blocks in an adjacent course therebelow; a support for said spaced members adjustably mounted on said frame and disposed for movably adjusting the positions of said spaced members longitudinally with relation to said conveyor in increments equaling one-half of said first mentioned increments so that said indexing means will dispose said second carriage to lay superimposed courses of blocks with their adjacent ends all in vertical alignment.

27. In a brick laying machine the combination of: a floor; a frame movably supported on said floor; a main carriage vertically movably mounted on said frame; an elongated track means supported on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over said floor; indexing means on said main carriage for moving said second carriage longitudinally along said track means intermittently and in precise increments comprising: members spaced in correspondence with said increments; a motorized crank means on said second carriage; an engaging means on said crank means and spaced from the rotary axis thereof so that said engaging means moves in a circular path when said crank means is rotated; said engaging means disposed progressively to engage said spaced members and thus providing tractive action with said spaced members intermittently to propel said second carriage longitudinally of said track means; and motor means disposed to operate said crank as each block handling and laying cycle of operation of said second carriage and said machine occurs; vertical index means on said frame comprising a pair of spaced column members; a plurality of vertically spaced buttress structures on each column member; said buttress structures each comprising a lower inclined portion and an upper horizontal portion; said main carriage vertically movably mounted on said frame, said main carriage supporting said track means and said conveyor; and spring loaded buttress engaging means on said main carriage disposed to traverse upwardly on said inclined portions and to automatically engage and rest on top of said horizontal portions of said buttress structure to support said main frame duirng the laying of one horizontal course of blocks by said machine, said horizontal portions of said buttress structures vertically spaced in correspondence with respective vertical dimensions of superimposed courses of blocks laid by said machine.

28. In a brick laying machine the combination of: a floor; a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over said floor; indexing means on said main carriage for moving said second carriage longitudinally along said track means intermittently and in precise increments; indexing means for vertically moving said main carriage vertically on said frame in precise vertical increments corresponding to the elevations of superimposed courses of blocks.

29. In a brick laying machine the combination of: a floor; a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means on said second carriage movable in a direction laterally of said track means and said conveyor; block grasping means on said third means for engaging blocks on said conveyor and for moving them laterally relative to said conveyor and to a position over said floor; indexing means on said main carriage for moving said second carriage longitudinally along said track means intermittently and in precise increments; indexing means for vertically moving said main carriage vertically on said frame in precise vertical increments corresponding to the elevations of superimposed courses of blocks; a mortar hopper on said second carriage disposed laterally of said conveyor; an open outlet structure at a lower portion of said hopper; vertically disposed fingers projectable below said outlet portion and between adjacent ends of concrete blocks being mortared together; and vibrator means operable to vibrate said fingers and to cause mortar to flow downwardly therearound and between said adjacent ends of said blocks.

30. The invention, as defined in claim 11, wherein: said fingers are disposed partially in said mortar dispenser and project from the interior of said mortar dispenser through said opening.

31. In a brick laying machine the combination of: a floor; a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means on said second carriage movable in a direction laterally of said track means and said conveyor; block grasping means on said third means for engaging blocks on said conveyor and for moving them laterally relative to said conveyor and to a position over said floor; indexing means on said main carriage for moving said second carriage longitudinally along said track means intermittently and in precise increments; indexing means for vertically moving said main carriage vertically on said frame in precise vertical increments corresponding to the elevations of superimposed courses of blocks; a mortar hopper on said second carriage disposed laterally of said conveyor; an open outlet structure at a lower portion of said hopper; vertically disposed fingers projectable below said outlet portion and between adjacent ends of concrete blocks being mortared together; and vibrator means operable to vibrate said fingers and to cause mortar to flow downwardly therearound and between said adjacent ends of said blocks; said hopper and said fingers vertically movably mounted on said second carriage whereby said hopper and said fingers may be lowered to a position in which said fingers are projected between adjacent ends of concrete blocks whereupon the outlet opening of said hopper is disposed above the space between the blocks permitting subsequent vibration thereof to feed mortar outwardly of said hopper between said fingers and between said blocks to provide a head joint therebetween during vibration applied to said fingers and said mortar between said blocks.

32. In a block laying machine the combination of: a mortar hopper; template means in the bottom thereof; baffle structure of said template means disposed to cover the vertical openings in a concrete block and to permit mortar to flow from said hopper onto the upper ledge structure of a concrete block when said hopper is thereabove; foraminous means mounted to move horizontally below said template means; vibrator means disposed to cause mortar to flow downwardly around said template means and through said foraminous means; actuator means disposed to move said foraminous means horizontally to cut off a layer of fresh mortar a short distance above a concrete block on which said mortar is laid; and means adapted to operate said vibrator means and said actuator means intermittently and in respective sequence whereby said mortar is first fed by said vibrator to the top of a block and is then horizontally cut off by said foraminous means after said vibrator means has been de-energized.

33. In a block laying machine the combination of: a mortar hopper; template means in the bottom thereof; baffle structure of said template means disposed to cover the vertical openings in a concrete block and to permit mortar to flow from said hopper onto the upper ledge structure of a concrete block when said hopper is thereabove; foraminous means mounted to move horizontally below said template means; vibrator means disposed to cause mortar to flow downwardly around said template means and through said foraminous means; actuator means disposed to move said foraminous means horizontally to cut off a layer of fresh mortar a short distance above a concrete block on which saaid mortar is laid; and means adapted to operate said vibrator means and said actuator means intermittently and in respective sequence whereby said mortar is first fed by said vibrator to the top of a block and is then horizontally cut off by said foraminous means after said vibrator means has been de-energized; excess mortar removal means comprising suction conduits having open portions and supported on said second carriage to traverse said open portions closely to opposite sides of concrete blocks after they have been laid whereby excess mortar is cleaned away from mortar joints at adjacent portions of said blocks.

34. In a block laying machine the combination of: a mortar hopper; template means in the bottom thereof; baffle structure of said template means disposed to cover the vertical openings in a concrete block and to permit mortar to flow from said hopper onto the upper ledge structure of a concrete block when said hopper is thereabove; foraminous means mounted to move horizontally below said template means; vibrator means disposed to cause mortar to flow downwardly around said template means and through said foraminous means; actuator means disposed to move said foraminous means horizontally to cut off a layer of fresh mortar a short distance above a concrete block on which said mortar is laid; and means adapted to operate said vibrator means and said actuator means intermittently and in respective sequence whereby said mortar is first fed by said vibrator to the top of a block and is then horizontally cut off by said foraminous means after said vibrator means has been de-energized; excess mortar removal means comprising suction conduits having open portions and supported on said second carriage to traverse said open portions closely to opposite sides of concrete blocks after they have been laid whereby excess mortar is cleaned away from mortar joints at adjacent portions of said blocks; a collector tank communicating with said suction conduits and a screw conveyor in the bottom of said tank for removing the collected mortar from the lower portion of said tank.

35. In a brick laying machine the combination of: a floor; a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said floor; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor.

36. In a brick laying machine the combination of: a floor; a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said floor; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; means for driving said conveyor for moving blocks thereon longitudinally of said track means.

37. In a brick laying machine the combination of: a floor; a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said floor; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; means for driving said conveyor for moving blocks thereon longitudinally of said track means; limit switch means carried by said second carriage and engageable by blocks moving on said conveyor, said limit switch electrically coupled to said means driving said conveyor whereby blocks movable on said conveyor when engaging said limit switch may stop operation of said means driving said conveyor momentarily.

38. In a brick laying machine the combination of: a floor; a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said floor; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; a second conveyor pivoted to said frame and having an end adjacent said first conveyor for feeding blocks to said first conveyor, the pivotal mounting of said second conveyor permitting one end thereof to remain at a common level while said frame moves upwardly relative to said floor.

39. In a brick laying machine the combination of: a floor; a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position on said floor; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; a second conveyor pivoted to said frame and having an end adjacent said first conveyor for feeding blocks to said first conveyor, the pivotal mounting of said second conveyor permitting one end thereof to remain at a common level while said frame moves upwardly relative to said floor; limit switch means engageable by blocks on said first mentioned conveyor for stopping operation of said second conveyor whereby delivery of blocks from said second conveyor is interrupted when said first mentioned conveyor is loaded.

40. In a brick laying machine the combination of: a floor, a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movably in a direction laterally of said track means and said conveyor; block grasping means on said third means for engaging blocks on said conveyor and for carrying them laterally relative to said conveyor and to a position on said floor; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; a second conveyor pivoted to said frame and having an end adjacent said first conveyor for feeding blocks to said first conveyor; the pivotal mounting of said second conveyor permitting one end thereof to remain at a common level while said frame moves upwardly relative to said floor; limit switch means engageable by blocks on said first mentioned conveyor for stopping operation of said second conveyor whereby delivery of blocks from said second conveyor is interrupted when said first mentioned conveyor is loaded; said second conveyor movably mounted on said floor in unison with said main frame.

41. In a brick laying machine the combination of: a floor; a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said floor; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; a mortar hopper on said second carriage; means coupling said mortar hopper and said block grasping means together with said third means whereby said block grasping means and said hopper are movable in unison laterally of said conveyor whereby said block grasping means is disposed over said conveyor for picking up a block while said mortar hopper is disposed over a block laid on said floor for depositing mortar thereon.

42. In a brick laying machine the combination of: a floor; a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said floor; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; a mortar hopper on said second carriage; means coupling said mortar hopper and said block grasping means together with said third means whereby said block grasping means and said hopper are movable in unison laterally of said conveyor whereby said block grasping means is disposed over said conveyor for picking up a block while said mortar hopper is disposed over a block laid on said floor for depositing mortar thereon; said mortar hopper having outlet means at its normally lower end for distributing mortar on upper surfaces of blocks; and vibrating means for feeding mortar out of said hopper onto said blocks.

43. In a brick laying machine the combination of: a floor; a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said floor; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; a mortar hopper on said second carriage; means coupling said mortar hopper and said block grasping means together with said third means whereby said block grasping means and said hopper are movable in unison laterally of said conveyor whereby said block grasping means is disposed over said conveyor for picking up a block while said mortar hopper is disposed over a block laid on said floor for depositing mortar thereon; said mortar hopper having outlet means at its normally lower end for distributing mortar on upper surfaces of blocks; and vibrating means for feeding mortar out of said hopper onto said blocks; a hinged plate stationarily supported by said frame and disposed to be located at an end of a concrete block wall being laid by said machine, said plate having an edge adapted to abut a block laid at an end of a course of blocks for holding such a block at the end of a course in position while mortar is applied at the opposite end thereof.

44. In a brick laying machine the combination of: a floor; a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said floor; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; limit switch means carried by said frame and adjustably positioned longitudinally relative to said track means for engagement by means on said second carriage; motor means coupled to said limit switches and disposed to drive said second carriage longitudinally of said track means whereby said limit switches limit the longitudinal travel of said second carriage on said track means and corresponding limit the length of a block wall to be laid by said machine.

45. In a brick laying machine the combination of: a floor; a frame movably supported on said floor; a main carriage vertically movably mounted on said frame; an elongated track means supported on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over said floor; indexing means on said main carriage for moving said second carriage longitudinally along said track means intermittently and in precise increments comprising members spaced in correspondence with said increments; a motorized crank means on said second carriage; an engaging means on said crank means and spaced from the rotary axis thereof so that said engaging means moves in a circular path when said crank means is rotated; said engaging means disposed progressively to engage said spaced members and thus providing tractive action with said spaced members to propel said second carriage longitudinally of said track means; and motor means disposed to operate said crank as each block handling and laying cycle of operation of said second carriage and said machine occurs; limit switch means engageable by said crank arm at each rotating cycle thereof; said limit switch means being coupled to the motor means driving said crank for stopping it each cycle of operation and with the engagement of each one of said spaced members; switch means on said second carriage operable in response to engagement of blocks to initiate operation of said motor means driving said crank arm.

46. In a brick laying machine the combination of: a floor; a frame; a main carriage vertically movably mounted on said frame; an elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said floor; indexing means on said main carriage for positioning said second carriage longitudinally along said track means intermittently and in precise spaced increments; vertical indexing means for said main carriage for positioning said main carriage in various adjusted elevated positions corresponding to elevations of successive super-imposed courses of blocks laid above said floor; a pair of mortar hoppers disposed on said carriage and vertically movable thereon; means for vertically moving said hoppers up and down; open outlet portions at the lower extremities of said hoppers; said outlet portions of said hoppers spaced substantially equal to the length of a concrete block; fingers projectable outwardly of said openings and between adjacent ends of concrete blocks; one of said hoppers adapted for feeding mortar between adjacent ends of blocks when said second carriage is movable in one direction longitudinally of said track means and the other of said hoppers being disposed to insert mortar between adjacent ends of blocks when said second carriage is movable along said track means in the opposite direction.

47. In a brick laying machine the combination of: a floor; a frame; a main carriage vertically movably mounted on said frame; and elongated carriage track means on said main carriage; second means movably mounting said frame on said floor so that said frame traverses said floor in a direction laterally relative to said carriage track means; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said floor; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said floor; a pair of mortar hoppers disposed on said carriage and vertically movable thereon; means for vertically moving said hoppers up and down; open outlet portions at the lower extremities of said hoppers; said outlet portions of said hoppers spaced substantially equal to the length of a concrete block; fingers projectable outwardly of said openings and between adjacent ends of concrete blocks; one of said hoppers adapted for feeding mortar between adjacent ends of blocks when said second carriage is movable in one direction longitudinally of said track means and the other of said hoppers being disposed to insert mortar between adjacent ends of blocks when said second carriage is movable along said track means in the opposite direction; said fingers vertically movably mounted in the outlet openings of said hoppers and projectable between adjacent ends of blocks; and vibrators disposed to vibrate said fingers and feed mortar downwardly through the outlet opening of a respective hopper and between adjacent ends of a pair of concrete blocks.

48. In a block laying machine the combination of: a pallet means; a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said pallet means; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said pallet means.

49. In a block laying machine the combination of: a pallet means; a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said pallet means; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said pallet means; pallet carriage means disposed below said main carriage and movable at an angle to the longitudinal axis of said track means; pallet carriage support means movably supporting said pallet carriage on the ground at said angle to said track means.

50. In a block laying machine the combination of: a pallet means; a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said pallet means; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said pallet means; pallet carriage means disposed below said main carriage and movable at an angle to the longitudinal axis of said track means; pallet carriage support means movably supporting said pallet carriage on the ground at said angle to said track means; spaced members of said frame straddling said pallet carriage.

51. In a block laying machine the combination of: a pallet means; a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said pallet means; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said pallet means; pallet carriage means disposed below said main carriage and movable at an angle to the longitudinal axis of said track means; pallet carriage support means movably supporting said pallet carriage on the ground at said angle to said track means; elongated pallets disposed on said pallet carriage in laterally spaced relation to each other and parallel to said track means.

52. In a block laying machine the combination of: a pallet means; a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said pallet means; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said pallet means; pallet carriage means disposed below said main carriage and movable at an angle to the longitudinal axis of said track means; pallet carriage support means movably supporting said pallet carriage on the ground at said angle to said track means; elongated pallets disposed on said pallet carriage in laterally spaced relation to each other and parallel to said track means; a steam curing room near said machine and in which a portion of said pallet carriage support is disposed whereby said pallets on said pallet carriage may be laden with concrete block panels and may be moved from said machine into said curing room.

53. In a block laying machine the combination of: a pallet means; a frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for carrying them laterally relative to said conveyor and to a position over said pallet means; indexing means on said main carriage for positioning said second carriage longitudinally along said track means intermittently and in precise spaced increments; vertical indexing means for said main carriage for positioning said main carriage in various adjusted elevated positions corresponding to elevations of successive superimposed courses of blocks laid above said pallet means; pallet carriage means disposed below said main carriage and movable at an angle to the longitudinal axis of said track means; pallet carriage support means movably supporting said pallet carriage on the ground at said angle to said track means; elongated pallets disposed on said pallet carriage in laterally spaced relation to each other and parallel to said track means; a steam curing room near said machine and in which a portion of said pallet carriage support is disposed whereby said pallets on said pallet carriage may be laden with concrete block panels and may be moved from said machine into said curing room; said pallet carriage support means also extending beyond and away from said machine at a side thereof opposite to a side of said machine adjacent to said steam curing room.

54. In a mortar feeding device for forming head joints between adjacent spaced vertical surfaces of a pair of concrete blocks the combination of: a mortar dispenser having a mortar outlet disposed to dispense mortar between said spaced vertical surfaces; and means for applying vibration to said mortar to cause it to flow between said surfaces; retainer means vertically movably disposed to be positioned adjacent opposite sides of said pair of blocks and between said vertical surfaces to prevent flow of said mortar sideways and outwardly from the space between said vertical surfaces.

55. In a mortar feeding device for forming head joints between adjacent spaced vertical surfaces of a pair of concrete blocks the combination of: a mortar dispenser having a mortar outlet disposed to dispense mortar between said spaced vertical surfaces; and means for applying vibration to said mortar to cause it to flow between said surfaces; retainer means vertically movably disposed to be positioned adjacent opposite sides of said pair of blocks and between said vertical surfaces to prevent flow of said mortar sideways and outwardly from the space between said vertical surfaces; means for moving said mortar dispenser and said retainer means vertically for extracting said retainer means vertically to strike the mortar previously placed between said vertical surfaces.

56. In a mortar feeding device for forming head joints between adjacent spaced vertical surfaces of a pair of concrete blocks the combination of: a mortar dispenser having a mortar outlet disposed to dispense mortar between said spaced vertical surfaces; and means for applying vibration to said mortar to cause it to flow between said surfaces; retainer means vertically movably disposed to be positioned adjacent opposite sides of said pair of blocks and between said vertical surfaces to prevent flow of said mortar sideways and outwardly from the space between said vertical surfaces; seal pad means movably disposed to move toward and away from opposite sides of said pair of blocks and to engage and overlap said sides to cover the space between said spaced vertical surfaces; and means for holding said seal pad means against said opposite sides of said blocks when said mortar is vibrated into position between said vertical surfaces.

57. In a mortar feeding device for forming head joints between adjacent spaced vertical surfaces of a pair of concrete blocks the combination of: a mortar dispenser having a mortar outlet disposed to dispense mortar between said spaced vertical surfaces; and means for applying vibration to said mortar to cause it to flow between said surfaces; retainer means vertically movably disposed to be positioned adjacent opposite sides of said pair of blocks and between said vertical surfaces to prevent flow of said mortar sideways and outwardly from the space between said vertical surfaces; seal pad means movably disposed to move toward and away from sides of said pair of blocks and to engage and overlap said sides to cover the spaces between said spaced vertical surfaces and means for holding said seal pad means against said opposite sides of said blocks when said mortar is vibrated into position between said vertical surfaces, said seal pad means engageable with said retainer means further to prevent the leakage of mortar therearound.

58. In a mortar feeding device for forming head joints between adjacent spaced vertical surfaces of a pair of concrete blocks the combination of: a mortar dispenser having a mortar outlet disposed to dispense mortar between said spaced vertical surfaces; and means for applying vibration to said mortar to cause it to flow between said surfaces; and opposed block holding means engageable with opposite sides of said pair of blocks to hold them in alignment and in spaced relation to each other at said vertical surfaces.

59. In a mortar feeding device for forming head joints between adjacent spaced vertical surfaces of a pair of concrete blocks the combination of: a mortar dispenser having a mortar outlet disposed to dispense mortar between said spaced vertical surfaces; and means for applying vibration to said mortar to cause it to flow between said surfaces; retainer means vertically movably disposed to be positioned adjacent opposite sides of said pair of blocks and between said vertical surfaces to prevent flow of said mortar sideways and outwardly from the space between said vertical surfaces; and opposed block holding means engageable with opposite sides of said pair of blocks to hold them in alignment and in spaced relation to each other at said vertical surfaces.

60. In a mortar feeding device for forming head joints between adjacent spaced vertical surfaces of a pair of concrete blocks the combination of: a mortar dispenser having a mortar outlet disposed to dispense mortar between said spaced vertical surfaces; and means for applying vibration to said mortar to cause it to flow between said surfaces; retainer means vertically movably disposed to be positioned adjacent opposite sides of said pair of blocks and between said vertical surfaces to prevent flow of said mortar sideways and outwardly from the space between said vertical surfaces; seal pad means movably disposed to move toward and away from sides of said pair of blocks and to engage and overlap said sides to cover the spaces between said spaced vertical surfaces and means for holding said seal pad means against said opposite sides of said blocks when said mortar is vibrated into position between said vertical surfaces; and opposed block holding means engageable with opposite sides of said pair of blocks to hold them in alignment and in spaced relation to each other at said vertical surfaces.

61. In a mortar feeding device for feeding mortar between adjacent edges of surfaces of concrete blocks the combination of: a hopper disposed to contain mortar; means forming a mortar outlet opening in said hopper; finger means projecting beyond said opening; said fingers projectable into areas between concrete blocks being mortared together; means holding said fingers in operative position relative to said outlet opening; and vibrator means operable to vibrate said fingers and to cause mortar to flow outwardly of said hopper through said outlet opening and between adjacent ends of said blocks between which said finger means are projected; and opposed block holding means engageable with opposite sides of said pair of blocks to hold them in alignment and in spaced relation to each other at said vertical surfaces.

62. In a mortar feeding device for feeding mortar between adjacent edges of surfaces of concrete blocks the combination of: a hopper disposed to contain mortar; means forming a mortar outlet opening in said hopper; finger means projecting beyond said opening; said fingers projectable into areas between concrete blocks being mortared together; means holding said fingers in operative position relative to said outlet opening; and vibrator means operable to vibrate said fingers and to cause mortar to flow outwardly of said hopper through said outlet opening and between adjacent ends of said blocks between which said finger means are projected; and opposed block holding means engageable with opposite sides of said pair of blocks to hold them in alignment and in spaced relation to each other at said vertical surfaces; seal pad means movably disposed to move toward and away from sides of said pair of blocks and to engage and overlap said sides to cover the space between said spaced vertical surfaces and means for holding said seal pad means against said opposite sides of said blocks when said mortar is vibrated into position between said vertical surfaces.

63. In a mortar feeding device for feeding mortar between adjacent edges of surfaces of concrete blocks the combination of: a hopper disposed to contain mortar; means forming a mortar outlet opening in said hopper; finger means projecting beyond said opening; said fingers projectable into areas between concrete blocks being mortared together; means holding said fingers in operative position relative to said outlet opening; and vibrator means operable to vibrate said fingers and to cause mortar to flow outwardly of said hopper through said outlet opening and between adjacent ends of said blocks between which said finger means are projected; said hopper and finger means movable vertically; a pair of fingers of said finger means spaced apart and disposed to be projected into said areas between concrete blocks being mortared together and adjacent their sides whereby said last mentioned fingers when moved downwardly into such position tend to retain mortar being placed between said concrete blocks and when moved vertically upwardly away from said areas operating to strike the mortar placed between the blocks.

64. In a mortar feeding device for forming head joints between adjacent spaced vertical surfaces of a pair of concrete blocks a combination of: a mortar dispenser having a mortar outlet disposed to dispense mortar downwardly between said spaced vertical surfaces; means for applying vibration to said mortar to cause it to flow downwardly between said surfaces; spaced strike means coupled to said dispenser; means for moving said dispenser and said spaced strike means upwardly and downwardly; said vertically spaced strike means being vertically movably disposed to be positioned adjacent opposite sides of said pair of blocks and between said spaced vertical surfaces whereby they tend to retain mortar between said vertically spaced surfaces when mortar is being vibrated therebetween and tend when moved upwardly and vertically away from such positions to strike the outside of the mortar placed between the vertical surfaces of the blocks.

65. In a block laying machine the combination of: a main frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over an area on which blocks are to be laid; indexing means on said main carriage for moving said second carriage longitudinally along said track means intermittently and in precise increments; vertically spaced indexing means for vertically locating said main carriage vertically on said main frame in precise vertical increments corresponding to the elevations of superimposed courses of blocks; a mortar dispenser means movable back and forth in a direction laterally of said track means; a hopper means disposed to feed said mortar dispensing means; means for moving said mortar dispenser means from said hopper to a position over said area on which blocks are being laid for placing bed joint mortar on said blocks; said mortar dispenser means comprising cavity structure disposed to be indexed with the bottom of said hopper to be filled with mortar therefrom said cavity structure being generally of a shape comparable to the upper areas of a concrete block and of a depth equal to the amount of mortar to be placed on a horizontal surface of a concrete block; slide valve means disposed below said cavity structure and having outlet opening means corresponding to said outline shape of the upper surface of a concrete block; and means disposed to move said slide valve means into open position below said cavity means to drop said mortar in said cavity means onto the upper surface of a concrete block when said cavity means is indexed thereover.

66. In a block laying machine the combination of: a main frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over an area on which blocks are to be laid; indexing means on said main carriage for moving said second carriage longitudinally along said track means intermittently and in precise increments; vertically spaced indexing means for vertically locating said main carriage vertically on said main frame in precise vertical increments corresponding to the elevations of superimposed courses of blocks; a mortar dispenser means movable back and forth in a direction laterally of said track means; a hopper means disposed to feed said mortar dispensing means; means for moving said mortar dispenser means from said hopper to a position over said area on which blocks are being laid for placing bed joint mortar on said blocks; said mortar dispenser means comprising cavity structure disposed to be indexed with the bottom of said hopper to be filled with mortar therefrom said cavity structure being generally of a shape comparable to the upper areas of a concrete block and of a depth equal to the amount of mortar to be placed on a horizontal surface of a concrete block; slide valve means disposed below said cavity structure and having outlet opening means corresponding to said outline shape of the upper surface of a concrete block; and means disposed to move said slide valve means into open position below said cavity means to drop said mortar in said cavity means onto the upper surface of a concrete block when said cavity means is indexed thereover; means for moving said dispenser means from said hopper to a position over concrete blocks in said area comprising a means for moving said mortar dispenser means horizontally and vertically; and cam means for actuating said plate valve structure when said mortar dispenser means is moved vertically and downwardly toward an upper surface of a concrete block.

67. In a block laying machine the combination of: a main frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over an area on which blocks are to be laid; indexing means on said main carriage for moving said second carriage longitudinally along said track means intermittently and in precise increments; vertically spaced indexing means for vertically locating said main carriage vertically on said main frame in precise vertical increments corresponding to the elevations of superimposed courses of blocks; a mortar dispenser means movable back and forth in a direction laterally of said track means; a hopper means disposed to feed said mortar dispensing means; means for moving said mortar dispenser means from said hopper to a position over said area on which blocks are being laid for placing bed joint mortar on said blocks; said mortar dispenser means comprising cavity structure disposed to be indexed with the bottom of said hopper to be filled with mortar therefrom, said cavity structure being generally of a shape comparable to the upper areas of a concrete block and of a depth equal to the amount of mortar to be placed on a horizontal surface of a concrete block; slide valve means disposed below said cavity structure and having outlet opening means corresponding to said outline shape of the upper surface of a concrete block; and means disposed to move said slide valve means into open position below said cavity means to drop said mortar in said cavity means onto the upper surface of a concrete block when said cavity means is indexed thereover; means for moving said dispenser means from said hopper to a position over concrete blocks in said area comprising a means for moving said mortar dispenser means horizontally and vertically; and cam means for actuating said plate valve structure when said mortar dispenser means is moved vertically and downwardly toward an upper surface of a concrete block; a pivoted valve member coupled to said slide valve plate, said pivoted valve member normally disposed to cover bottom portions of said cavity structure and pivotal out of interference with the bottom portion of said cavity structure when said valve plate is slidably actuated thereby exposing and opening a portion of said cavity structure and permitting mortar to fall therefrom onto an upper surface of a concrete block.

68. In a mortar feeding device for forming head joints between adjacent spaced vertical surfaces of a pair of concrete blocks the combination of: a mortar dispenser having a mortar outlet disposed to dispense mortar downwardly between said spaced vertical surfaces; gasket means around said outlet disposed to be positioned upon upper surfaces of blocks in overlapping relation to a space between said vertical surfaces; seal pad means movable laterally in overlaypping relation with the sides of said blocks to seal against leakage of mortar from the sides of said space between said vertical surfaces; and means for applying pneumatic pressure ot mortar in said dispenser for forcing said mortar into a position between said vertical surfaces and said pad means.

69. In a mortar feeding device for forming head joints between adjacent spaced vertical surfaces of a pair of concrete blocks the combination of: a mortar dispenser having a mortar outlet disposed to dispense mortar downwardly between said spaced vertical surfaces; gasket means around said outlet disposed to be positioned upon upper surfaces of blocks in overlapping relation to a space between said vertical surfaces; seal pad means movable laterally in overlapping relation with the sides of said blocks to seal against leakage of mortar from the sides of said space between said vertical surfaces; and means for applying pneumatic pressure to mortar in said dispenser for forcing said mortar into a position between said vertical surfaces and said pad means; means for applying vibration to said mortar to assist the feeding thereof into said space between said vertical surfaces.

70. In a mortar feeding device for forming head joints between adjacent spaced vertical surfaces of a pair of concrete blocks the combination of: a mortar dispenser having a mortar outlet disposed to dispense mortar downwardly between said spaced vertical surfaces; means for causing said mortar to flow from said mortar dispenser and downwardly between said surfaces; and a pair of electrical contacts electrical insulation means supporting said contacts in spaced relation to each other and between said vertical surfaces; and electrically operable means disposed to be energized by said contacts when mortar forms a connection therebetween, said last mentioned means coupled to said mortar dispenser for shutting off the flow of mortar therefrom when said mortar bridges between said contacts.

71. In a block laying machine the combination of: a main frame; a main carriage vertically movably mounted on said frame; an elongated carriage track means on said main carriage; a block conveyor mounted on said main carriage substantially parallel to said track means; a second carriage movably mounted longitudinally of said track means and said conveyor; third means of said second carriage movable in a direction laterally of said track means and said conveyor; block grasping means on said third means for engaging blocks on said conveyor and for moving them laterally relative to said conveyor and to a position over an area on which blocks are to be laid; indexing means on said main carriage for moving said second carriage longitudinally along said track means intermittently and in precise increments; vertically spaced indexing means for vertically locating said main carriage vertically on said main frame in precise vertical increments corresponding to the elevations of superimposed courses of blocks; a mortar dispenser means movable back and forth in a direction laterally of said track means; a hopper means disposed to feed said mortar dispensing means; means for moving said mortar dispenser means from said hopper to a position over said area on which blocks are being laid for placing bed joint mortar on said blocks; said mortar dispenser means comprising cavity structure disposed to be indexed with the bottom of said hopper to be filled with mortar therefrom said cavity structure being generally of a shape comparable to the upper areas of a concrete block and of a depth equal to the amount of mortar to be placed on a horizontal surface of a concrete block; slide valve means disposed below said cavity structure and having outlet opening means corresponding to said outline shape of the upper surface of a concrete block; and means disposed to move said slide valve means into open position below said cavity means to drop said mortar in said cavity means onto the upper surface of a concrete block when said cavity means is indexed thereover; said hopper having an outlet in its lower end, said outlet having a shape corresponding to the shape of said cavity; and a plate coupled to said mortar dispenser and movable to shut off said outlet when said mortar dispenser is moved from said hopper to said area.

72. In a bed joint mortar transfer means for concrete block laying machines the combination of: a hopper; structure at a lower portion of said hopper forming an outlet substantially corresponding with the horizontal outline surface features of a concrete block; a mortar retaining structure movable into and out of position under said outlet for receiving mortar from said hopper, said mortar retaining structure having a cavity open at its upper side and substantially conforming in shape to said outlet, said cavity having a depth substantially equal to a layer of mortar to be placed on a concrete block; means for moving said mortar retainer structure from said outlet to a position over a concrete block wall being formed; said cavity having an open bottom; a valve plate slidably disposed over said open bottom of said cavity to hold mortar therein when it is being received from the outlet of said hopper by said cavity; valve structure forming an opening in said valve plate substantially conforming with said cavity; and first means for moving said valve plate relative to said cavity and into coincidence therewith to permit said mortar to drop from said cavity onto a concrete block.

73. In a bed joint mortar transfer means for concrete block laying machines the combination of: a hopper; structure at a lower portion of said hopper forming an outlet substantially corresponding with the horizontal outline surface features of a concrete block; a mortar retaining structure movable into and out of position under said outlet for receiving mortar from said hopper, said mortar retaining structure having a cavity open at its upper side and substantially conforming in shape to said outlet, said cavity having a depth substantially equal to a layer of mortar to be placed on a concrete block; means for moving said mortar retainer structure from said outlet to a position over a concrete block wall being formed; said cavity having an open bottom; a valve plate slidably disposed over said open bottom of said cavity to hold mortar therein when it is being received from the outlet of said hopper by said cavity; valve structure forming an opening in said valve plate substantially conforming with said cavity; and first means for moving said valve plate relative to said cavity and into coincidence therewith to permit said mortar to drop from said cavity onto a concrete block; actuator means for supporting and moving said retainer structure and valve plate downwardly toward a block, said first means comprising stationary roller means; and cam means on said valve plate for sliding it relative to said mortar retainer when moved downwardly by said actuator means.

74. In a bed joint mortar transfer means for concrete block laying machines the combination of: a hopper; structure at a lower portion of said hopper forming an outlet substantially corresponding with the horizontal outline surface features of a concrete block; a mortar retaining structure movable into and out of position under said outlet for receiving mortar from said hopper, said mortar retaining structure having a cavity open at its upper side and substantially conforming in shape to said outlet, said cavity having a depth substantially equal to a layer of mortar to be placed on a concrete block; means for moving said mortar retainer structure from said outlet to a position over a concrete block wall being formed; said cavity having an open bottom; a valve plate slidably disposed over said open bottom of said cavity to hold mortar therein when it is being received from the outlet of said hopper by said cavity; valve structure forming an opening in said valve plate substantially conforming with said cavity; and first means for moving said valve plate reltaive to said cavity and into coincidence therewith to permit said mortar to drop from said cavity onto a concrete block; a shut off plate connected to said mortar retainer and movable thereby to shut off said outlet of said hopper when said mortar retainer moves away from said hopper to a position over a concrete block wall being formed.

75. In a bed joint mortar transfer means for concrete block laying machines the combination of: a hopper; structure at a lower portion of said hopper forming an outlet substantially corresponding with the horizontal outline surface features of a concrete block; a mortar retaining structure movable into and out of position under said outlet for receiving mortar from said hopper, said mortar retaining structure having a cavity open at its upper side and substantially conforming in shape to said outlet, said cavity having a depth substantially equal to a layer of mortar to be placed on a concrete block; means for moving said mortar retainer structure from said outlet to a postion over a concrete block wall being formed; said cavity having an open bottom; a valve plate slidably disposed over said open bottom of said cavity to hold mortar therein when it is being received from the outlet of said hopper by said cavity; valve structure forming an opening in said valve plate substantially conforming with said cavity; and first means for moving said valve plate relative to said cavity and into coincidence therewith to permit said mortar to drop from said cavity onto a concrete block; vibrator means for feeding mortar from said hopper downwardly into said cavity of said mortar retainer.

76. In a bed joint mortar transfer means for concrete block laying machines the combination of: a hopper; structure at a lower portion of said hopper forming an outlet substantally corresponding with the horizontal outline surface features of a concrete block; a mortar retaining structure movable into and out of position under said outlet for receiving mortar from said hopper, said mortar retaining structure having a cavity open at its upper side and substantially conforming in shape to said outlet, said cavity having a depth substantially equal to a layer of mortar to be placed on a concrete block; means for moving said mortar retainer structure from said outlet to a position over a concrete block wall being formed; said cavity having an open bottom; a valve plate slidably disposed over said open bottom of said cavity to hold mortar therein when it is being received from the outlet of said hopper by said cavity; valve structure forming an opening in said valve plate substantially conforming with said cavity; and first means for moving said valve plate relative to said cavity and into coincidence therewith to permit said mortar to drop from said cavity onto a concrete block; a second valve member pivoted to said valve plate and said mortar retainer; said second valve member covering a portion of said opening formed by said valve structure; and menas operable in unison with said first means for pivoting said second valve member out of interference with said opening in said valve plate.

References Cited

UNITED STATES PATENTS

| | | | |
|---|---|---|---|
| 1,615,859 | 2/1927 | Wight | 52—749 |
| 1,926,415 | 9/1933 | Wertz. | |
| 1,953,452 | 4/1934 | Wertz. | |
| 2,090,959 | 8/1937 | Jackson | 94—46 X |
| 2,940,298 | 6/1960 | Joseph | 52—749 |
| 3,177,621 | 4/1965 | Demarest | 52—749 |
| 3,179,134 | 4/1965 | Sigrist | 141—67 |

FRANK L. ABBOTT, *Primary Examiner.*

P. C. FAW, M. O. WARNECKE, *Assistant Examiners.*